United States Patent
Oyama

(10) Patent No.: US 7,737,590 B2
(45) Date of Patent: Jun. 15, 2010

(54) MAGNETIC BEARING DEVICE, ROTATING MECHANISM, AND MODEL IDENTIFICATION METHOD OF ROTATING MACHINERY MAIN UNIT

(75) Inventor: Atsushi Oyama, Tokyo (JP)

(73) Assignee: Ebara Corporation, Tokyo (JP)

( * ) Notice: Subject to any disclaimer, the term of this patent is extended or adjusted under 35 U.S.C. 154(b) by 400 days.

(21) Appl. No.: 11/847,665

(22) Filed: Aug. 30, 2007

(65) Prior Publication Data

US 2008/0054741 A1    Mar. 6, 2008

(30) Foreign Application Priority Data

Aug. 30, 2006 (JP) ............................. 2006-233836
Feb. 15, 2007 (JP) ............................. 2007-035425

(51) Int. Cl.
  H02K 7/09     (2006.01)
  H02K 11/00    (2006.01)
(52) U.S. Cl. .................. 310/90.5; 310/68 B; 310/68 D; 361/143; 318/108; 318/632
(58) Field of Classification Search ............... 310/68 B, 310/68 D, 90.5; 417/423.4, 423.12; 361/143; 318/108, 625, 632
See application file for complete search history.

(56) References Cited

U.S. PATENT DOCUMENTS

| 4,245,869 | A | * | 1/1981 | Scheffer et al. ............ 310/90.5 |
| 4,392,693 | A | * | 7/1983 | Habermann et al. ........ 310/90.5 |
| 6,215,218 | B1 |   | 4/2001 | Ueyama |
| 6,288,510 | B1 |   | 9/2001 | Toyama |
| 6,731,201 | B1 | * | 5/2004 | Bailey et al. ........... 340/310.11 |
| 6,785,314 | B2 |   | 8/2004 | Ooyama et al. |
| 7,091,641 | B2 | * | 8/2006 | Kawashima et al. ....... 310/90.5 |

(Continued)

FOREIGN PATENT DOCUMENTS

JP    04-46226    4/1992

(Continued)

*Primary Examiner*—Quyen Leung
*Assistant Examiner*—David W. Scheuermann
(74) *Attorney, Agent, or Firm*—Westerman, Hattori, Daniels & Adrian, LLP

(57) ABSTRACT

Problem of the present invention is to enable elimination or reduction of a signal wire in a dedicated cable for a magnetic bearing device for supplied an electric power from a control device to a magnetic bearing main unit via the dedicated cable. A magnetic bearing device 100 according to the present invention has a magnetic bearing main unit 10 having an electromagnet 12M for magnetically levitating and rotatably supporting a magnetic rotating body 11 and functioning as a magnetic bearing, a control device 20 having a compensating circuit 25 for generating a control signal for controlling a levitation position of the magnetic rotating body 11, and an electricity supply line 30L for supplying an electric power from the control device 20 to the magnetic bearing main unit 10. The magnetic bearing main unit 10 has a modulation carrier circuit 22 for generating a modulated wave and a first alternating-current coupling section 23A for transmitting the generated modulated wave to the control device 20 by the alternating-current coupling with the electricity supply line 30L. The control device 20 has a second alternating-current coupling section 23B for separating the modulated wave alternating-current coupled from the electricity supply line 30L and a carrier wave demodulating circuit 24 for detecting the separated carrier signal wave.

27 Claims, 28 Drawing Sheets

U.S. PATENT DOCUMENTS

2008/0054741 A1 * 3/2008 Oyama .................... 310/68 A

FOREIGN PATENT DOCUMENTS

| JP | 04-62393 | 5/1992 |
| JP | 06-330885 | 11/1994 |
| JP | 09-042290 | 2/1997 |
| JP | 10-077993 | 3/1998 |
| JP | 10-122182 | 5/1998 |
| JP | 11-294454 | 10/1999 |
| JP | 11-311249 | 11/1999 |
| JP | 2001-352114 | 12/2001 |
| JP | 3382627 | 3/2003 |
| JP | 2003-148386 | 5/2003 |

* cited by examiner

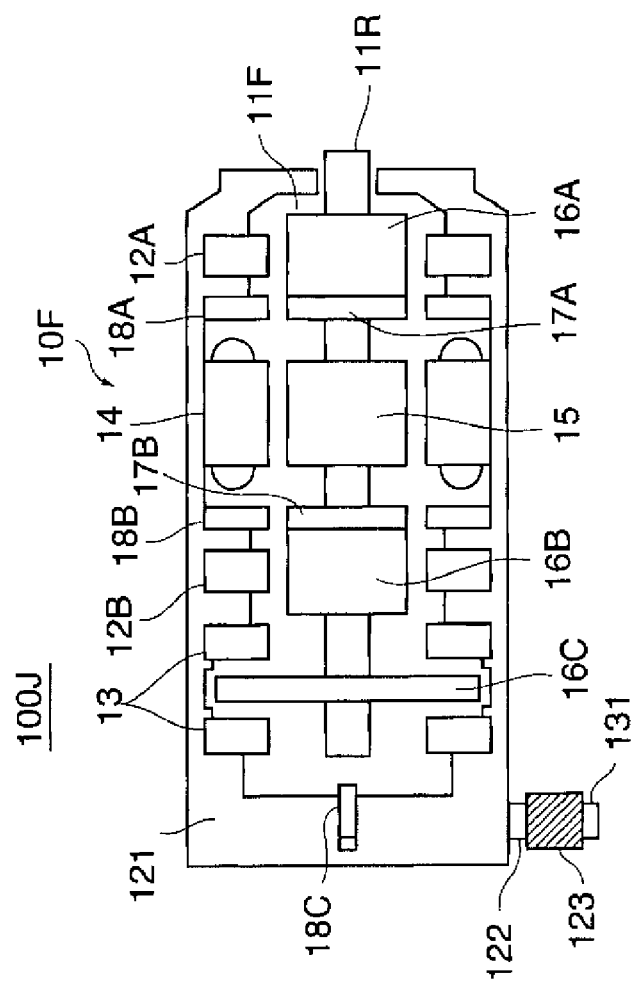
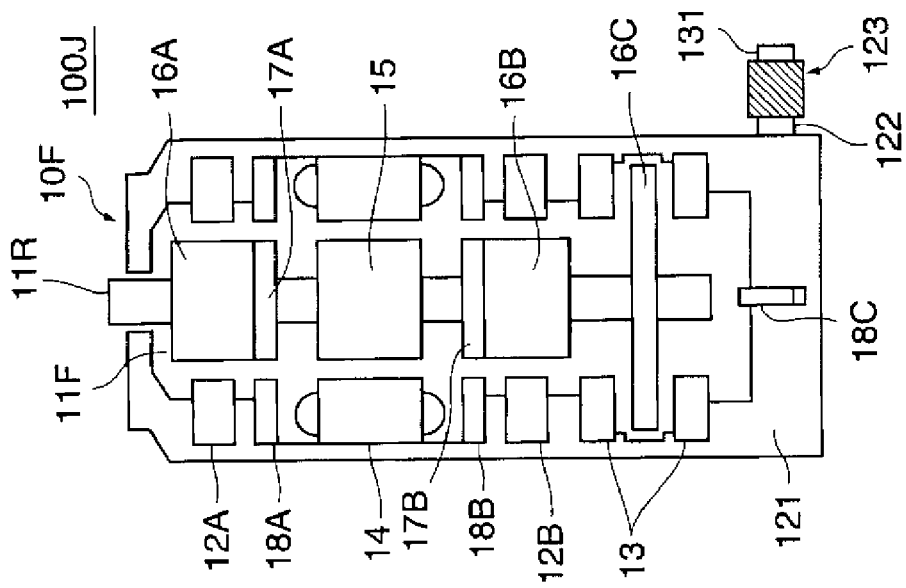

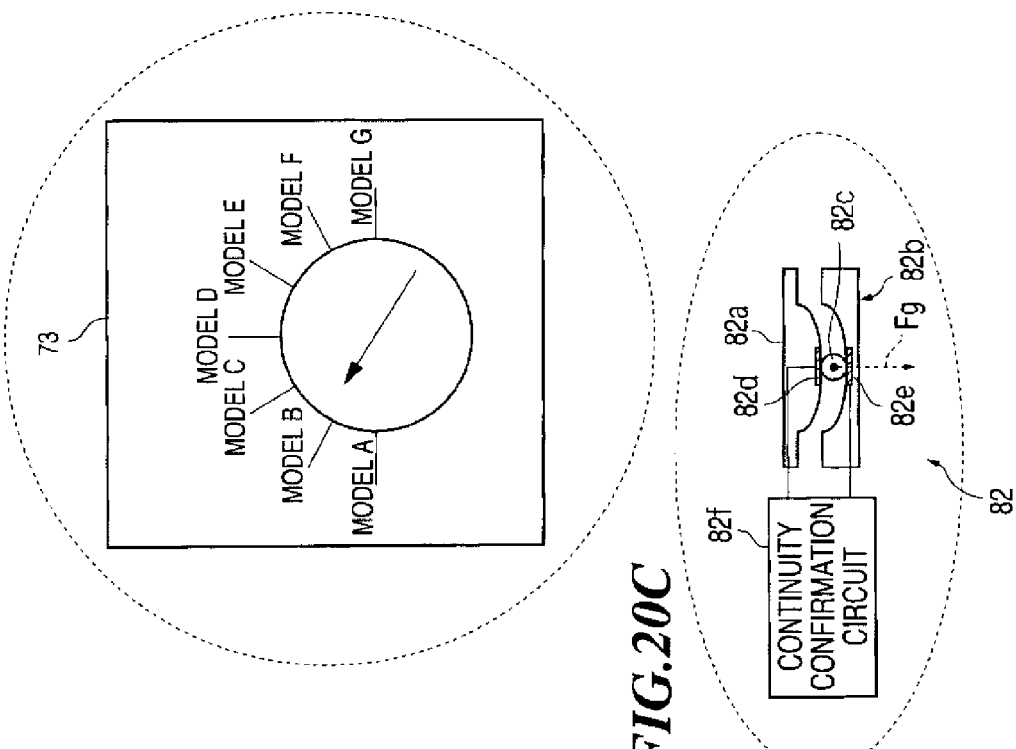
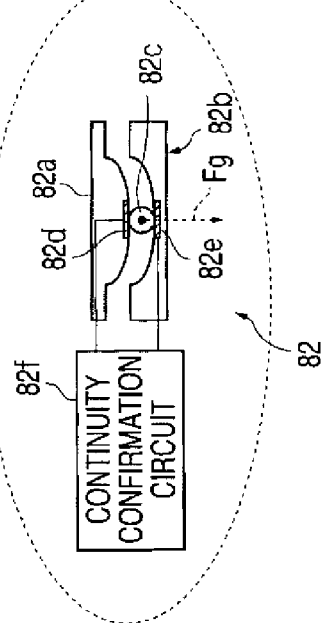
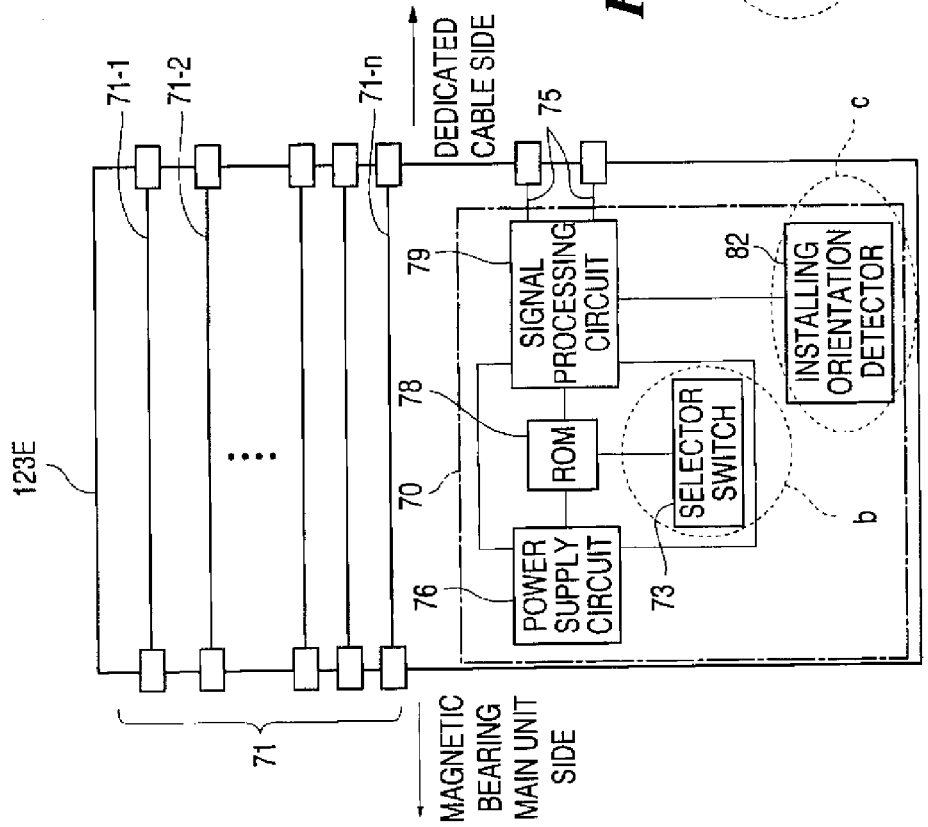
FIG.20A
FIG.20B
FIG.20C

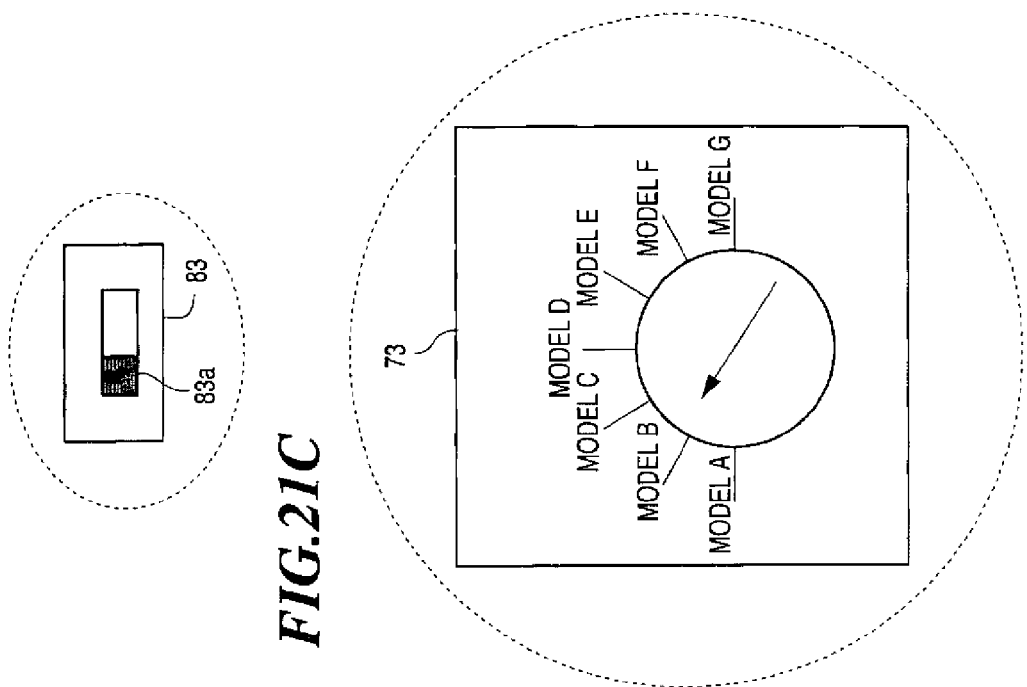
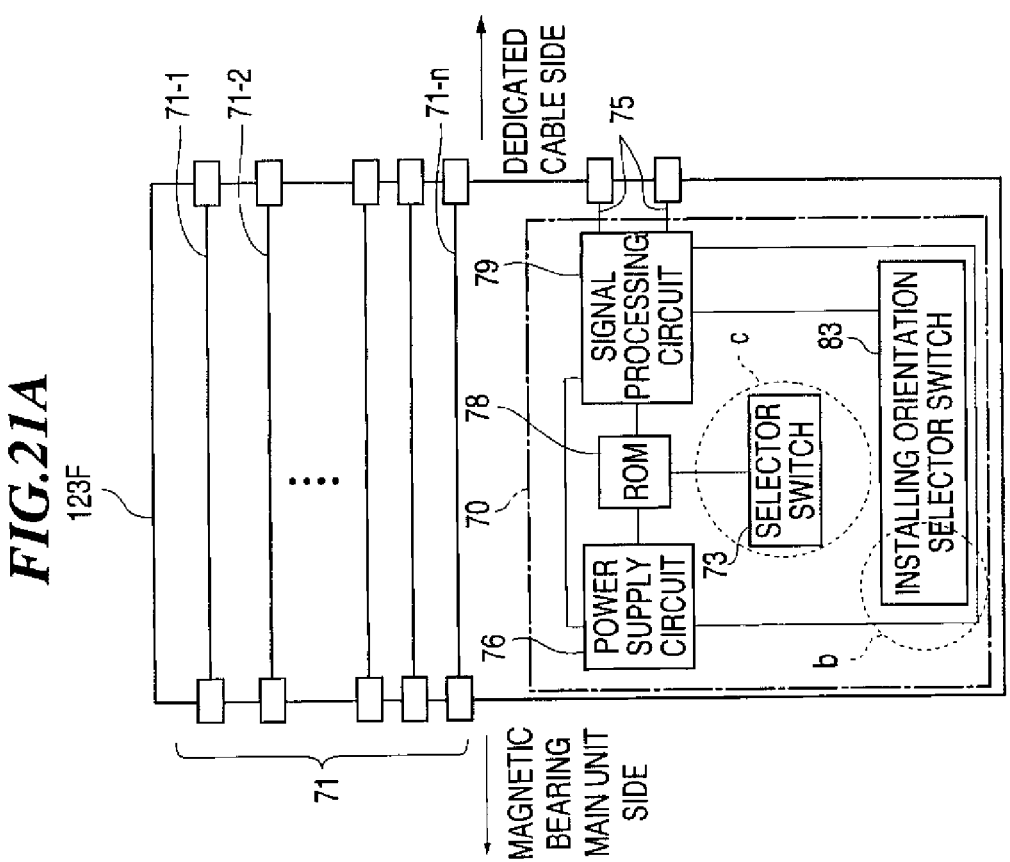

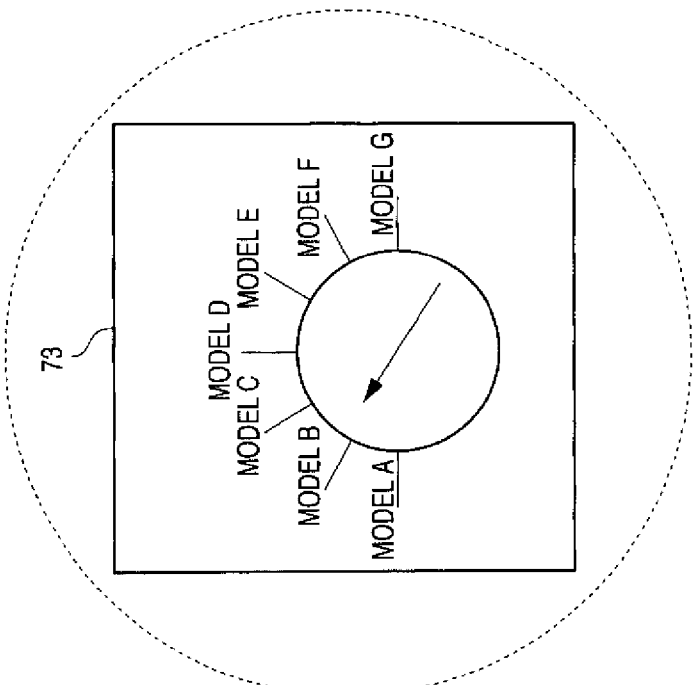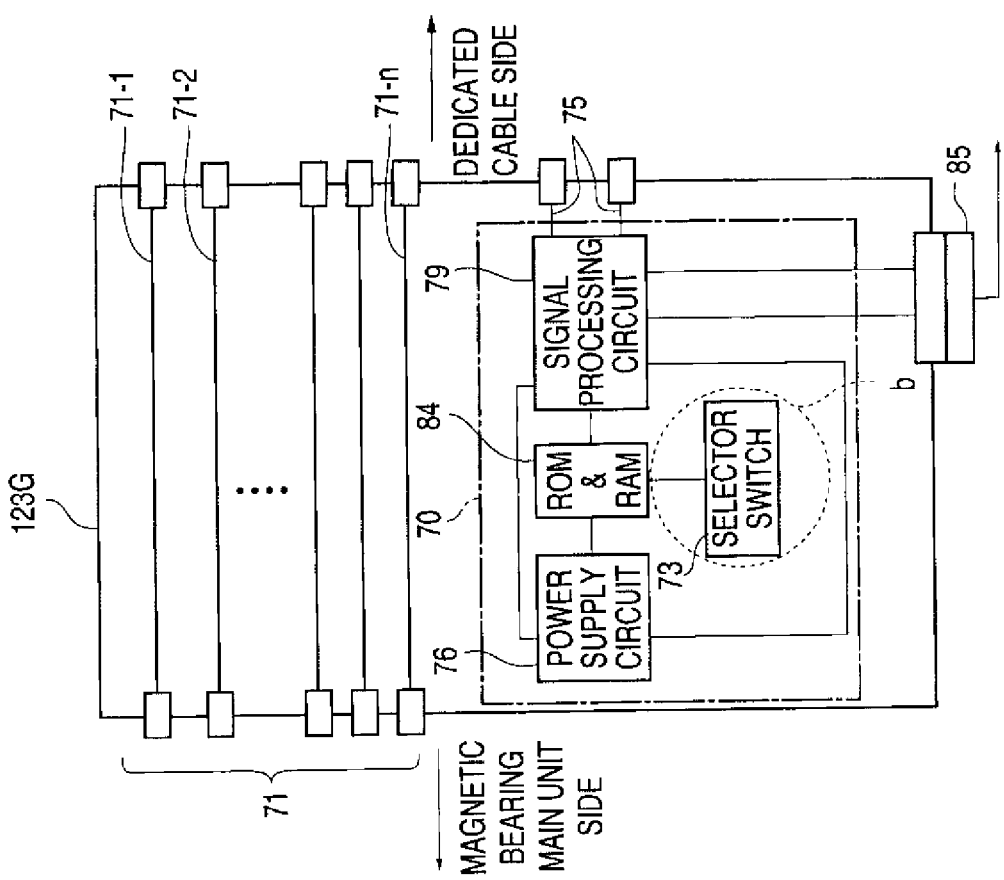
FIG.22A
FIG.22B

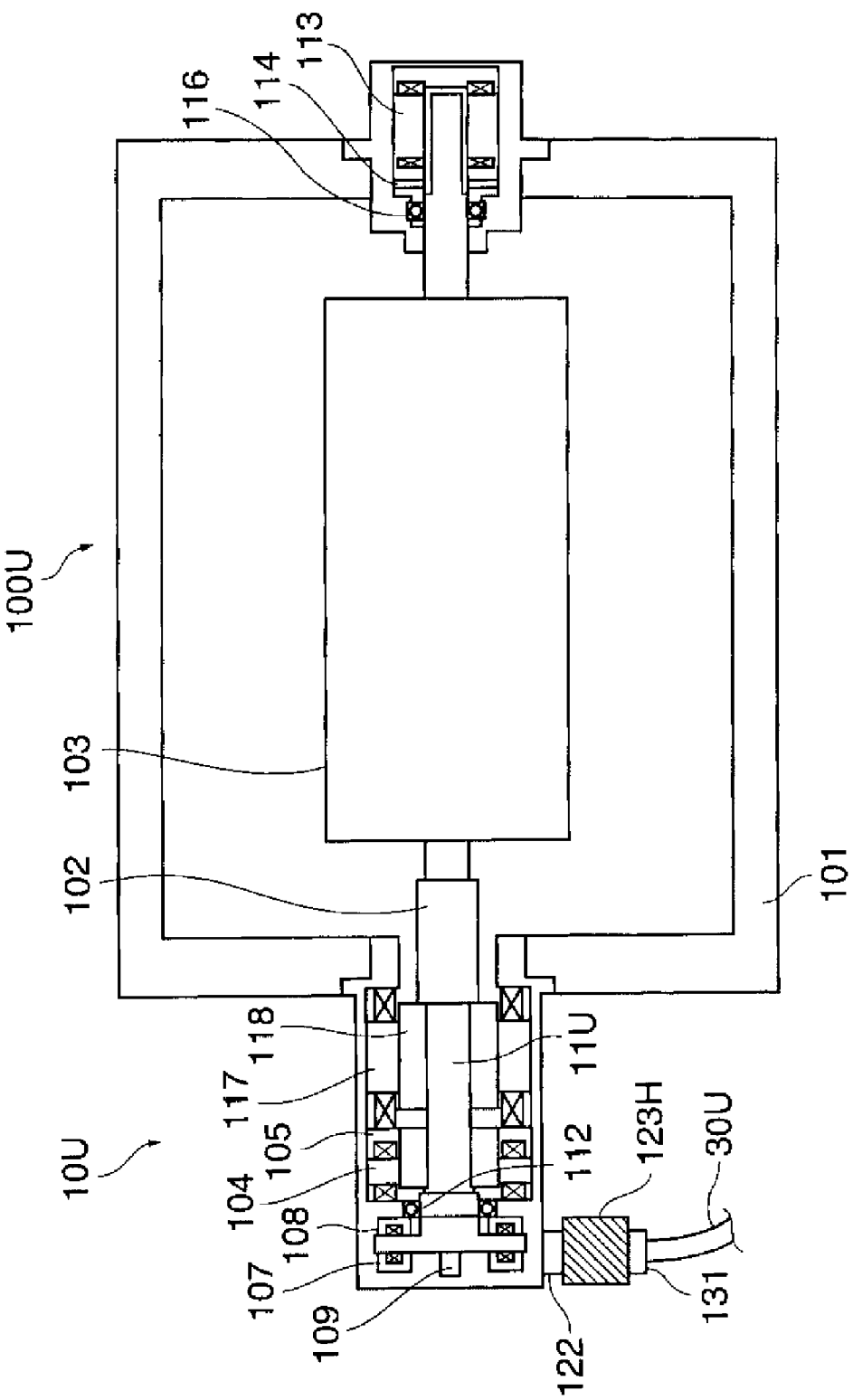

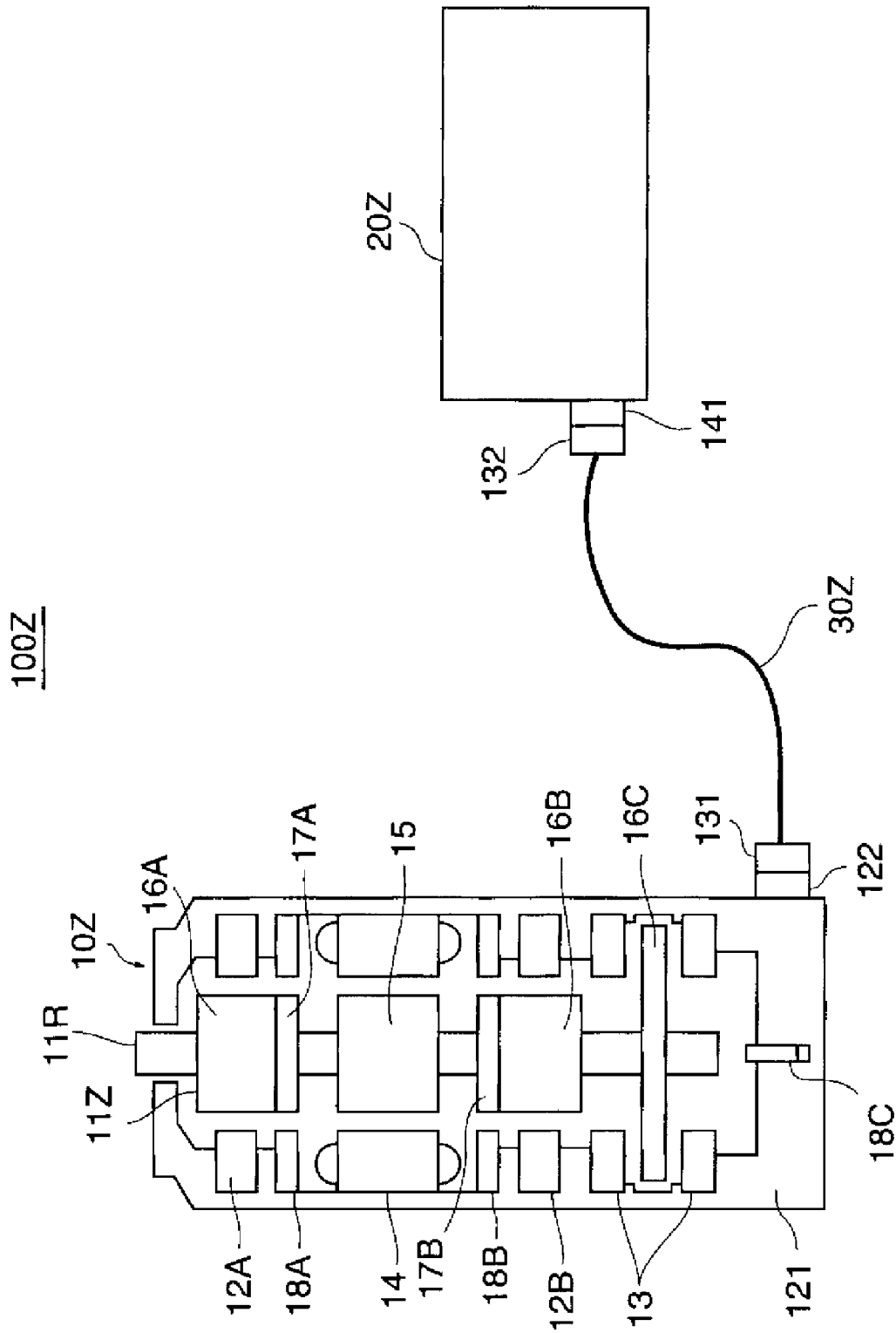

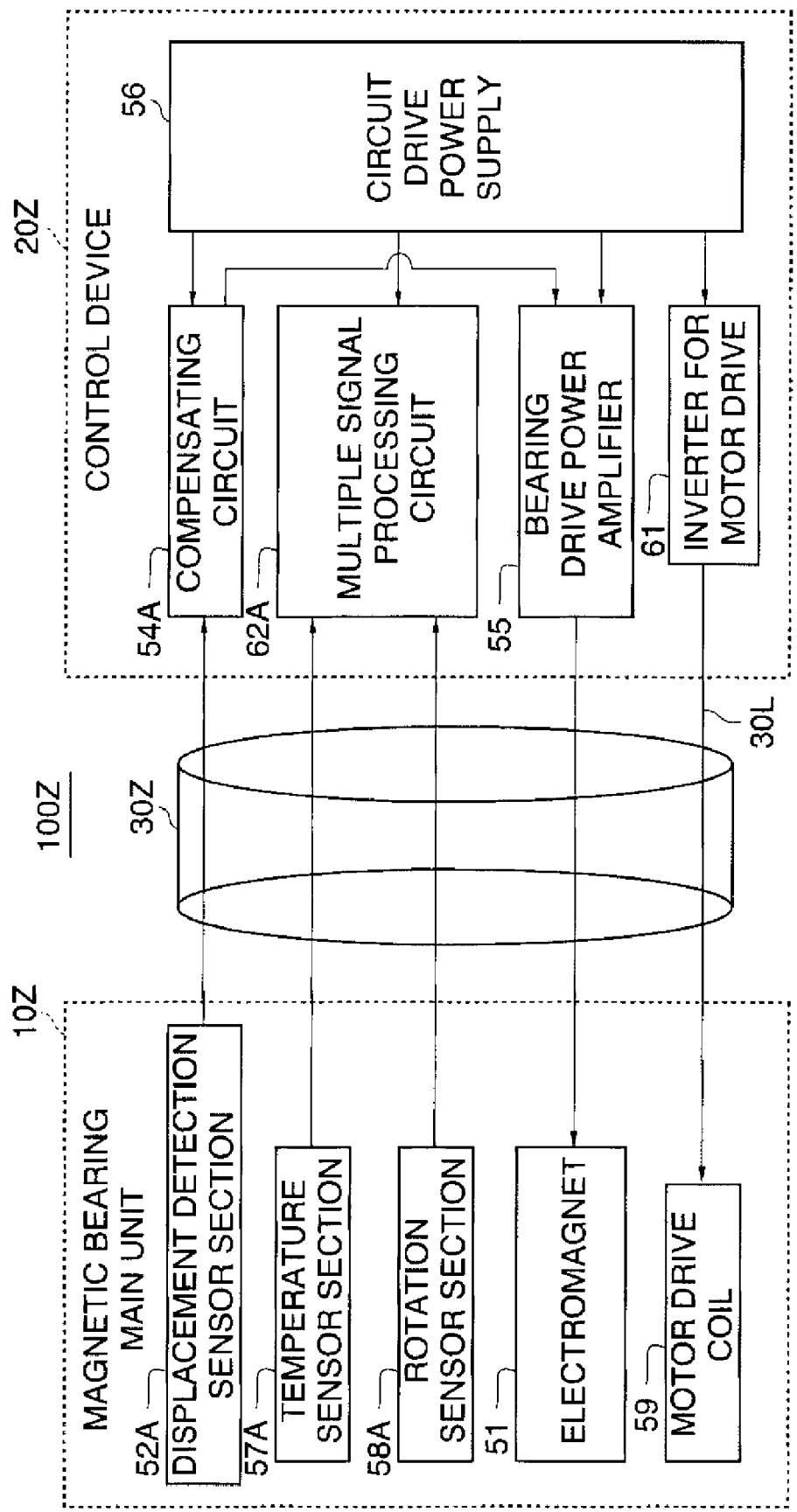

MAGNETIC BEARING DEVICE, ROTATING MECHANISM, AND MODEL IDENTIFICATION METHOD OF ROTATING MACHINERY MAIN UNIT

BACKGROUND OF THE INVENTION

1. Technical Field

The present invention relates to a magnetic bearing device, a rotating mechanism, and a model identification method of a magnetic bearing main unit or a rotating machinery main unit. More particularly, the present invention relates to the magnetic bearing device for transmitting a signal between the magnetic bearing main unit and a control device by a power line communication with an alternating-current coupling. In addition, the present invention relates to the model identification method of the magnetic bearing main unit of the magnetic bearing device or the rotating machinery main unit of the rotating mechanism of a constitution in which the control device (the control device set with a control condition optimal for each model) having a different control condition according to each model is connected via a dedicated cable with the magnetic bearing main unit or the rotating machinery main unit for supporting a rotating body by a bearing.

2. Related Art

A magnetic bearing control system has a large-scale structure as a whole in which a magnetic bearing main unit including an actuator and connected with a turbo-molecular pump and the like and a control device constituted with a displacement detection sensor, a signal processing circuit, a compensating circuit, a motor drive circuit, and so forth are integrated. As it causes a restriction of an installation location and a deterioration of a maintenance performance, the magnetic bearing main unit and the control device are generally disposed in separate places and connected by a dedicated cable in a constitution.

FIG. 25 shows a block diagram of a conventional magnetic bearing device 100X. In FIG. 25, the magnetic bearing control device 100X includes a magnetic bearing main unit 10X, a control device 20X, and a dedicated cable 30X for the connection. The magnetic bearing main unit 10X has an electromagnet 51 for magnetic bearing as well as a positional displacement detection sensor 52 and a signal processing circuit 53. The electromagnet 51 for magnetic bearing supports a rotational shaft by a magnetic levitation for example, with a magnetism between two couples of radial electromagnets facing about the rotational shaft (11R in FIG. 1) of a magnetic rotating body (11 in FIG. 1) and a magnetism between a couple of axial electromagnets and controls the position of the rotational shaft by the balance of the magnetisms between the electromagnets. The positional displacement detection sensor 52 detects the positional displacement of the rotational shaft. The signal processing circuit 53 outputs the detected positional displacement signal as a signal at an appropriate level to a compensating circuit 54 in a next step. The output of the signal processing circuit 53 is transmitted to the compensating circuit 54 of the control device 20X via a signal wire in the dedicated cable 30X. The control device 20X has the compensating circuit 54, a bearing drive power amplifier 55, and a circuit drive power supply 56. The bearing drive power amplifier 55 generates a magnetism for magnetically levitating and for rotatably supporting the magnetic rotating body in the electromagnets constituting two radial magnetic bearings and the electromagnet constituting one axial magnetic bearing. In addition, the bearing drive power amplifier 55 supplies a direct current for adjusting the displacement of the magnetic rotating body by balancing the magnetisms in the electromagnets. The compensating circuit 54 supplies to the bearing drive power amplifier 55 with the compensating current to each electromagnet for constituting magnetic bearing corresponding to the amount of the positional displacement. The circuit drive power supply 56 supplies an electric power to necessary components constituting the magnetic bearing device 10X such as the electromagnets, a motor, a sensor, and an electric circuit. The electric power is supplied from the control device 20X to the magnetic bearing main unit 10X via the dedicated cable 30X.

The inventors proposed a structure that a controlling section with a displacement detection sensor was mounted in a magnetic bearing main unit of a magnetic bearing device having a constitution in which such a magnetic bearing main unit and a control device were connected via a dedicated cable in order to transmit a displacement sensing signal to the control device via the dedicated cable, to control a drive circuit of an electromagnet for magnetic bearing via a compensating circuit, and to supply a driving electric power to the magnetic bearing main unit via the dedicated cable again. As a result, it has been made possible that a variation in individual magnetic bearing main unit is taken no account in design because of an adjustment by the controlling section. In addition, the magnetic bearing main unit and the control device are freely combined. The cost reduction of the entire system has been thus achieved. (See Patent Document 1.)

When a magnetic bearing main unit connected with a high-speed rotational body such as a turbo-molecular pump and a control device are combined, because a compensating characteristic necessary for a magnetic bearing control varies according to a structural difference of a pump side, some model identification methods of a magnetic bearing main unit have been proposed to prevent an occurrence of an abnormal control caused by a mistake of a combination. For instance, proposed methods include a method for identifying a model with the specificity of a characteristic by providing a specific element such as a resistor and an inductors to the inside of a pump, a method for identifying the specificity of a model by detecting an electric characteristic of a motor mounted to a pump, a method for identifying the specificity of a model by measuring a control characteristic of a magnetic bearing, and a method for identifying a model by mounting a mechanism for storing control characteristic data on a pump and reading the data at a start of a power supply.

FIG. 26 shows a block diagram of a magnetic bearing device 100Y for executing a conventional model identification. In FIG. 26, the magnetic bearing device 100Y includes a magnetic bearing main unit 10Y, a control device 20Y, and a dedicated cable 30Y for the connection. The magnetic bearing main unit 10Y has the electromagnet 51 for magnetic bearing as well as the positional displacement detection sensor 52, a temperature sensor 57, a rotation sensor 58, and a motor driving coil 59. The electromagnet 51 for magnetic bearing and the positional displacement detection sensor 52 function as those of the magnetic bearing control device 100X in FIG. 25. The temperature sensor 57 detects a temperature at a predefined position of the magnetic bearing main unit 10Y provided with a heater such as a turbo-molecular pump. On the other hand, the rotation sensor 58 detects the rotational speed of a rotational shaft (11R in FIG. 1) of a magnetic rotational body (11 in FIG. 1). The motor driving coil 59 is the coil for driving a motor 14, typically supplies a three-phase alternating current to three stators constituting the motor 14, and rotatably drives a magnetic rotating body 11 extended to a rotor 15. The control device 20Y has a compensating circuit 54, a bearing drive power amplifier 55, a circuit drive power supply 56, an inverter 61 for motor drive, and a multiple signal processing circuit 62. The compensating circuit 54, the bearing drive power amplifier 55, and the circuit drive power supply 56 function as those of the magnetic bearing device 100X in FIG. 25. The inverter 61 for motor drive supplies a three-phase alternating electric power to the motor driving coil 59. The multiple signal processing circuit 62 converts the rotational speed and the temperature detected by the rotation sensor 58 and the temperature sensor 57 into a signal easily processed by the inverter 61 for motor drive and a temperature control device (not shown). A signal processing circuit such as a positional displacement detection sensor section, a temperature sensor section, and a rotation sensor section may be connected with the detection signal of the positional displacement detection sensor 52, the temperature sensor 57, and the rotation sensor 58 in order to transmit a processed signal to a control device 20.

A rotating mechanism for supporting a rotating body such as a turbo molecule pump with a magnetic bearing needs an electric control compensating circuit corresponding to a property characteristic of the rotating body for executing a magnetic levitation support control of the rotating body in a predefined position. In addition, as for an inverter for driving a driving motor for rotatably driving the rotating body, an inverter having an output characteristic corresponding to the characteristic of the driving motor is necessary.

FIG. 27 is a view showing an example of a constitution of a rotating mechanism to which a control device is connected via a dedicated cable dedicated to a magnetic bearing main unit (a rotating machinery main unit) of a turbo-molecular pump as an example of a conventional rotating mechanism. The turbo-molecular pump as a rotating mechanism has a magnetic bearing main unit 10Z and a magnetic rotating body 11Z. In the magnetic rotating body 11Z, radial magnetic bearing targets 16A and 16B, radial displacement detection sensor targets 17A and 17B, an axial magnetic bearing target 16C, and the rotor 15 are fixed around a rotational shaft 11R. The constitution includes the radial magnetic bearing targets 16A and 16B, the radial displacement detection sensor targets 17A and 17B, the axial magnetic bearing target 16C, and the rotor 15. The magnetic bearing main unit 10Z is constituted with radial magnetic bearings 12A and 12B (constituted with a radial electromagnet) facing the radial magnetic bearing targets 16A and 16B, an axial magnetic bearing 13 (constituted with axial electromagnets) facing the axial magnetic bearing target 16C, and a stator of a motor 14 for driving a rotating body facing the rotor 15. The magnetic bearing main unit 10Z executes a magnetic levitation support control (a five-shaft control) for the magnetic rotating body 11Z. A rotor blade of the turbo-molecular pump (not shown) is mounted on top of the rotational shaft.

The stator faces the outer circumference of the rotor 15. As a driving current is supplied to the stator, the rotor 15 rotates, and the rotating body 11Z rotates around the rotational shaft 11R. Radial displacement sensors 18A and 18B face the radial displacement detection sensor targets 17A and 17B and detects a displacement of the radial displacement detection sensor targets 17A and 17B in the radial direction. An axial displacement detection sensor 18C faces the lower end of the rotational shaft 11R and detects the displacement of the rotational shaft 11R in the axial direction. A casing 121 of the magnetic bearing main unit 10Z is provided with a plug-in receptacle 122 with which a plug 131 mounted on one end of a dedicated cable 30Z is connected. The casing of a control device 20Z is provided with a plug-in receptacle 141 with which a plug 132 mounted on the other end of the dedicated cable 30Z is connected. The control device 20Z can be connected with the magnetic bearing main unit 10Z via the dedicated cable 30Z.

FIG. 28 is a block diagram showing a circuit constitution of the magnetic bearing main unit 10Z and the control device 20Z. The parts indicated with the same reference numerals and symbols as in FIG. 26 are the same as or similar to corresponding parts. The magnetic bearing main unit 10Z has a positional displacement detection sensor section 52A, a temperature sensor section 57A, a rotation sensor section 58A, the electromagnet 51 for magnetic bearing, and the motor driving coil 59. The control device 20Z has a compensating circuit 54A, a multiple signal processing circuit 62A, the bearing drive power amplifier 55, the inverter 61 for motor drive, and the circuit drive power supply 56.

A position displacement sensor section 52A of the magnetic bearing main unit 10Z includes the radial displacement sensors 18A and 18B and the axial displacement detection sensor 18C. The position displacement sensor section 52A is a circuit section for amplifying the output signals of the displacement sensors by a preamplifier or the like and processing the output signals into signals appropriate for transmitting to the compensating circuit 54A of the control device 20Z. A temperature sensor section 57A of the magnetic bearing main unit 10Z includes a temperature sensor 57 provided to a predefined position of the magnetic bearing main unit 10Z. The temperature sensor section 57A is a circuit section for amplifying the output signal of the temperature sensor 57 by a preamplifier or the like and processing the output signals into a signal appropriate for transmitting to the multiple signal processing circuit 62A of the control device 20Z. A rotation sensor section 58A includes the rotation sensor 58 for detecting the rotational speed of the rotating body 11Z. The rotation sensor section 58A is a circuit section for processing the output signal of the rotation sensor 58 into a signal appropriate for transmitting to the multiple signal generation circuit 62A of the control device 20Z. The electromagnet 51 for magnetic bearing of the magnetic bearing main unit 10Z is constituted with the radial magnetic bearings 12A and 12B and the axial magnetic bearing 13. The motor driving coil 59 is a coil of the rotating body drive motor 14 as a stator. The compensating circuit 54A and the multiple signal processing circuit 62A are different from the compensating circuit 54 and the multiple signal processing circuit 62 in FIG. 26 only in that a processed signal is received.

The compensating circuit 54A of the control device 20Z has a function as a control signal generating circuit. The compensating circuit 54A receives the output signals from the radial displacement sensors 18A and 18B and the axial displacement detection sensor 18C of the position displacement sensor section 52A and generates a control signal for controlling the radial magnetic bearings 12A and 12B and the axial magnetic bearing 13. The control signal generated in the compensating circuit 54A is output to the bearing drive power amplifier 55, is amplified by the bearing drive power amplifier 55, becomes a control current, and supplied to the electromagnet 51 for magnetic bearing, which includes the radial magnetic bearings 12A and 12B (the radial electromagnets) and the axial magnetic bearing 13 (the axial electromagnets). As a result, the rotating body 11Z is levitationally supported by a magnetic force generated by the radial electromagnets 12A and 12B and the axial electromagnet 13. In addition, a driving current is supplied to the stator of a motor 14 for driving the rotating body 11 from the inverter 61 for motor drive, and the rotating body 11 rotates around the rotational shaft 11R.

Recently, a control device used for a turbo-molecular pump in which a rotating body is supported by a magnetic bearing is not often individually prepared as a dedicated control device corresponding to a model of a turbo-molecular pump but often prepared as an integrated control device covering a predefined range of specifications in consideration of a balance between production cost and the number of products. Such a control device is often used by changing an internal setting (adjustment). In other words, it is preferable to drive a plurality of models of the turbo-molecular pumps by an identical control device in relation to an electric circuit design from a technical viewpoint and from a viewpoint of cost.

However, there are problems described below. As an internal setting of a constitutionally identical control device is incorrect, a turbo-molecular pump cannot be normally driven. When a control device at a site of use needs to be used for a turbo-molecular pump corresponding to a different setting from the original, the control device has to be returned inconveniently to its manufacturer for the change of the internal setting. Because of failures of a control device integration, cost reduction does not advance.

As a counter measure, it is considerable that a control device is provided with a setting function of a turbo-molecular pump to be connected for making a setting according to the model of the turbo-molecular pump when a connection is made. However, because a setting distance between a control device and a pump is long or because a wiring in a device is complex in the case of a turbo-molecular pump or the like, it is not possible to discriminate which turbo-molecular pump is connected with the control device in a use condition, so that the aforementioned conventional device is not practicable. As a result, a function for a control device to identifying a model of a connected turbo-molecular pump has been wanted as a function of a control device.

On the other hand, a magnetic bearing mechanism for supporting a rotating body by a magnetic levitation is so designed that the installing orientation of the rotating body is free in consideration of its function. However, it is understood that a stable control is executed when a magnetic bearing control characteristic for use is changed on the basis of a difference in the installing orientation of the whole turbo-molecular pump according to the weight of the rotating body and the constituent features of the magnetic bearing in consideration of practicality.

The conventional methods described below have been proposed for an identification of a model of a turbo-molecular pump main unit. According to a method, a model identification element of a resistor or the like provided in a pump main unit is determined by a signal means sent from a high hierarchy control device, and the compatibility between a turbo-molecular pump and a control device is established. According to a method, a magnetic property of a motor coil is detected on the side of a control device in order to detect a property of the turbo-molecular pump, and the compatibility between a turbo-molecular pump and a control device is established. According to a method, a DSP (Digital Signal Processor) is used for mechanically moving and vibrating a rotating body, and the model of the turbo-molecular pump is identified on the basis of the property data on the turbo-molecular pump obtained through the response. (See Patent Documents 2 to 11)

[Patent Document 1] JP-A (Patent Laid Open)-2001-352114

[Patent Document 2] JP-Patent-3382627

[Patent Document 3] JP-Patent-3457353

[Patent Document 4] JP-A-H10-77993

[Patent Document 5] JP-A-H10-122182

[Patent Document 6] JP-A-H11-294454

[Patent Document 7] JP-A-H11-311249

[Patent Document 8] JP-U (Utility Model Laid Open)-H04-46226

[Patent Document 9] JP-U-H04-62393

[Patent Document 10] JP-A-H04-42290

[Patent Document 11] JP-A-2003-148386

SUMMARY OF THE INVENTION

However, a dedicated cable supplies an electric power and a control signal for a magnetic bearing driving unit, a motor power, and so forth in a conventional structure including the structure proposed by the inventors in which a magnetic bearing main unit and a control device are separately placed. Consequently, a dedicated cable contains many internal core wires and has little flexibility because of its cable structure, and the weight of the cable increases. As a result, the workability for providing a magnetic bearing device is low.

A conventional method for identifying a specificity has such problems as described below. A dedicated wiring for a specific element needs to be additionally provided. Selection between models having similar motor characteristics is difficult. An identification function does not function under a certain condition.

A first object of the present invention is to solve the problem of workability for providing a magnetic bearing device by eliminating or reducing the number of signal wires in a dedicated cable. Another object is to provide a method for simply identifying the model of a magnetic bearing main unit by adding a small number of components without adding the number of cable core wires.

It is necessary to provide an identification element at the beginning of manufacturing of a turbo-molecular pump in the method for mounting a model identification element in a turbo-molecular pump among the conventional model identification methods of a turbo-molecular pump described above. Therefore, such a model identification function cannot be workable for an already existing turbo-molecular pump to which no identification element has been provided.

When a detecting function is operating, constant data is not collected even from a motor of the same type because of a difference caused by an error margin in manufacturing, a difference caused by a installation environment, a temperature change of a main body, and the like in the method for detecting the magnetic property of a motor coil on the side of a control device. Furthermore, when it is tried to newly operate an identification function for the motor of a turbo-molecular pump having been already provided, desired data may not be obtained because of degradation of the motor characteristic or the like. Therefore, there is a case in which identification of a model is difficult.

It is necessary to change any of mechanical dimensions according to a model in the method for mechanically moving the rotating body of a turbo-molecular pump in order to identify the model by measuring the amount of space specific to the model. Consequently, it is considerable that an influence on a model identification function is caused even by a minor dimensional change for improving a performance or the like of the same model. Since a dimensional change occurs in a turbo-molecular pump having been already used or a turbo-molecular pump having been overhauled, identification of a model is made impossible. Such practical restrictions as described above are caused.

A switching device in a shape of a dip switch or a parallel switch is wired in a system different from a cable for controlling a turbo-molecular pump and used as a model switching device in another proposed method. However, such a method requires a cable having a special structure, which restricts in practical use.

Such methods as described below have been proposed for a determination of an installing orientation of a magnetic bearing. According to a method, the direction of a mounted turbo-molecular pump is estimated from a change of a bearing coil electric current or the like, and the direction of a mounted pump is detected by providing an acceleration sensor or the like in the pump body. However, if an error of an electric current is caused by an error margin in manufacturing of a main body of a magnetic bearing coil, an accurate installing orientation is not estimated. A detection function cannot be validated for a turbo-molecular pump having been already installed which is not provided with an acceleration sensor. Each method has such a problem in practical use as described above.

A second object of the present invention is to provide a model identification method of a rotating machinery main unit in a rotating mechanism for identifying the model of the rotating machinery main unit and for setting a control device connected with the rotating machinery main unit to a control condition optimal for the model with an easy constitution and sure connection. Another objective is to provide a less expensive rotating mechanism.

The present invention relates to a magnetic bearing device and a rotating mechanism. The magnetic bearing device includes a magnetic bearing main unit, a control device, and an electricity supply line but does not contain a magnetic rotating body. The magnetic bearing main unit magnetically levitates and rotatably supports the magnetic rotating body. On the other hand, the rotating mechanism contains a rotating body in addition to a rotating machinery main unit, a control device, and an electricity supply line. The rotating body is not limited to the magnetic rotating body but may be anything which rotates with a bearing mechanism. The rotating machinery main unit is not limited to the magnetic bearing main unit but may be anything which rotatably supports a rotating body by a bearing mechanism and includes a part other than the rotating body in the rotating mechanism. Accordingly, all devices having a bearing mechanism and having a part rotating around a rotational shaft are referred to as a rotating mechanism. Such a rotating mechanism includes, for instance, a turbo-molecular pump, an excimer laser, a manipulator, and so forth and may have a mechanical bearing mechanism. However, a rotating mechanism with a magnetic bearing device is preferable when provided in a vacuum device because a frictionless rotation can be made by using a magnetic bearing.

The magnetic bearing device according to the present invention enables that an electricity supply line is used as a signal wire by an alternating-current coupling of a signal such as a displacement sensing signal of a displacement detection sensor or the signal for a model identification with the electricity supply line from a control device to a magnetic bearing main unit. Elimination or reduction of a signal wire in the dedicated cable is thus enabled.

The rotating mechanism according to the present invention provides an adapter unit between a rotating machinery main unit and a control device. The adapter unit has a model identification function for identifying a model of a rotating machinery main unit.

To solve the problem above, a magnetic bearing device 100 according to a first aspect of the present invention, as shown in FIG. 1 and FIG. 2, for example, comprises a magnetic bearing main unit 10 for generating a magnetism for magnetically levitating and rotatably supporting the magnetic rotating body 11 and having an electromagnet 12M (collectively showing a radial electromagnet 12Ax1 and so forth and an axial electromagnet 13z1 and so forth) functioning as a magnetic bearing, a control device 20 having a power supply 27 (the circuit drive power supply in FIG. 2) for supplying an electric power to the magnetic bearing main unit 10 and a control signal generation means 25 (the compensating circuit in FIG. 2) for generating a control signal for controlling a levitation position of the magnetic rotating body 11 by adjusting the magnetism, and an electricity supply line 30L for supplying an electric power from the control device 20 to the magnetic bearing main unit 10, in which the magnetic bearing main unit 10 has a carrier signal wave generation means 22 (the modulation carrier circuit in FIG. 2) for generating a carrier signal wave and a first alternating-current coupling section 23A for alternating-current coupling the carrier signal wave generated by a carrier signal wave generation means 22 with the electricity supply line 30L for transmitting the carrier signal wave to the control device 20, and the control device 20 has a second alternating-current coupling section 23B for separating the carrier signal wave alternating-current coupled from the electricity supply line 30L and a carrier signal wave detecting means 24 (the carrier wave demodulating circuit in FIG. 2) for detecting the carrier signal wave separated by the second alternating-current coupling section 23B.

The magnetic rotating body may be connected and constituted with a rotating body in a vacuum apparatus such as a turbo-molecular pump, an excimer laser device, and a manipulator. The rotatable support includes a rotatable support in a radial direction and a rotatable support in an axial direction. The electromagnet may function as a magnetic bearing in plurality of electromagnets or may function as a magnetic bearing in a plurality of types of electromagnets, for example a radial electromagnet and an axial electromagnet. In addition, the electromagnet may not only rotate a magnetic rotating body but also have a function for controlling the position of the rotational shaft. The power supply and the electricity supply line for supplying the electric power to the magnetic bearing main unit may supply the electric power to any of the parts in the magnetic bearing main unit such as an electromagnet, a motor, a sensor, and an electric circuits. The electric power may be collectively supplied or independently supplied to the parts. The electricity supply line may supply a direct current electric power or may supply a low-frequency alternating current electric power as is used for commerce. The control device may directly control the levitation position of the magnetic rotating body or may generate the control signal for controlling the levitation position indirectly. For example, the control signal for controlling the levitation position may be generated in the compensating circuit, the control signal may be sent to the magnetic bearing drive current control section (the bearing drive power amplifier), and the magnetic bearing drive current control section may be used to control the levitation position. The carrier signal wave is a wave in which a carrier wave and a signal wave are coupled but does not necessarily have to be modulated. For example, a carrier wave of a different frequency or a signal wave of a different pulse period may be used for a detecting side to detect the frequency or the period. The alternating-current coupling section may only have a function for alternating-current coupling a carrier signal wave with the electricity supply line or a function for separating a carrier signal wave alternating-current coupled from the electricity supply line. A multiplicity of types of carrier waves or a multiplicity of types of signal waves may be used with time shearing method. A multiplicity of types of carrier waves and a multiplicity of signal waves may be coupled or separated independently in a series circuit or in a parallel circuit. As for such a separation, a part may be separated. In addition, the carrier signal generation means may be a modulation carrier circuit for generating a carrier signal and for executing a modulation. The carrier signal wave detecting means may be a carrier wave demodulating circuit for detecting a carrier signal wave and for demodulating a carrier signal.

The constitution enables that the electricity supply line is used as a signal wire by alternating-current coupling the displacement sensing signal of the displacement detection sensor, the signal for a model identification, or the like with the electricity supply line from the control device to the magnetic bearing main unit. Elimination or reduction of a signal wire in the dedicated cable is thus enabled. In addition, it is possible to simply provide a method for introducing a model identification of the magnetic bearing main unit without changing the system configuration very much and without adding the number of cable core wires. As elimination of a signal wire in the dedicated cable is enabled, the dedicated cable can be slimmed down in the structure and lightened, and reduction of a copper material causing a material unit price can be reduced.

A magnetic bearing device 100B according to a second aspect of the present invention, as shown in FIG. 1 and FIG. 4, for example, comprises a magnetic bearing main unit 10 having an electromagnet 12M for generating a magnetism for magnetically levitating and rotatably supporting a magnetic rotating body 11 and for functioning as a magnetic bearing, a control device 20 having a power supply 27 (the circuit drive power supply in FIG. 4) for supplying an electric power to the magnetic bearing main unit 10 and a control signal generation means 25 (the compensating circuit in FIG. 4) for generating a control signal for controlling a levitation position of the magnetic rotating body 11 by adjusting the magnetism, and a first electricity supply line 30LA and a second electricity supply line 30LB different from each other for supplying the electric power from the control device 20 to the magnetic bearing main unit 10, the magnetic bearing main unit 10 has a first carrier signal wave generation means 22A (the first modulation carrier circuit in FIG. 4) for generating a first carrier signal wave and a first alternating-current coupling section 23A for alternating-current coupling the first carrier signal wave generated by the first carrier signal wave generation means 22A with the first electricity supply line 30LA for transmitting the first carrier signal wave to the control device 20, the control device 20 has a second alternating-current coupling section 23B for separating the first carrier signal wave alternating-current coupled from the first electricity supply line 30LA and a first carrier signal wave detecting means 24A (the first carrier wave demodulating circuit in FIG. 4) for detecting the first carrier signal wave separated by the second alternating-current coupling section 23B, the control device 20 further has a second carrier signal wave generation means 22B (the second modulation carrier circuit in FIG. 4) for generating a second carrier signal wave and a third alternating-current coupling section 23C for alternating-current coupling the second carrier signal wave generated by the second carrier signal generation means 22B with the second electricity supply line 30LB for transmitting the second carrier signal wave to the magnetic bearing main unit 10, and the magnetic bearing main unit 10 further has a fourth alternating-current coupling section 23D for separating the second carrier signal wave alternating-current coupled from the second electricity supply line 30LB and a second carrier signal wave detecting means 24B (the second carrier wave demodulating circuit in FIG. 4) for detecting the second carrier signal wave separated by the fourth alternating-current coupling section 23D.

According to the constitution, as the signals in both directions are carried in the electricity supply line from the control device to the magnetic bearing main unit, it is further possible to eliminate or reduce a signal wire in the dedicated cable.

In a magnetic bearing device 100 according to a third aspect of the present invention in the magnetic bearing device according to the first aspect, as shown in FIG. 2, for example, the magnetic bearing main unit 10 has a displacement detection sensor 18 (collectively showing 18A to 18C) for detecting the displacement of the magnetic rotating body 11, the carrier signal wave generation means has a modulation carrier circuit 22 for generating a modulated wave as the carrier signal wave by modulating a carrier wave with the detection signal from the displacement detection sensor 18, and the first alternating-current coupling section 23A alternating-current couples the modulated wave generated by the modulation carrier circuit 22 with the electricity supply line 30L for transmitting the modulated wave to the control device 20, the control device 20 has a magnetic bearing drive current control section 26 (the bearing drive power amplifier in the drawing) for adjusting the magnetism of the electromagnet 12M according to the control signal, the carrier signal wave detecting means has a carrier wave demodulating circuit 24 for demodulating the detection signal from the modulated wave separated by the second alternating-current coupling section 23B, the control signal generation means has a compensating circuit 25 for generating a compensating signal as the control signal for correcting the displacement of the magnetic rotating body 11 according to the detection signal demodulated by the carrier wave demodulating circuit 24 and for supplying the compensating signal to the magnetic bearing drive current control section 26 (the bearing drive power amplifier in the drawing), and the magnetic bearing drive current control section 26 adjusts the magnetism of the electromagnet 12M according to the compensating signal and controls the levitation position of the magnetic rotating body 11 so as to reduce the displacement.

The carrier signal wave generation means may be the modulation carrier circuit or may be constituted with the modulation carrier circuit. The carrier signal wave detecting means may be the carrier wave demodulating circuit or may be constituted with the carrier wave demodulating circuit. The control signal generation means may be the compensating circuit or may be constituted with the compensating circuit. According to the constitution, as the displacement sensing signal of the displacement detection sensor is alternating-current coupled with the electricity supply line from the control device to the magnetic bearing main unit, a signal wire for detecting the displacement can be eliminated or reduced from the dedicated cable.

In a magnetic bearing device 100 according to a fourth aspect of the present invention in the magnetic bearing device according to the third aspect, as shown in FIG. 1 and FIG. 2, for example, the electromagnet includes a radial electromagnet 12Ax1 (A, x, and 1 are interchangeable with B, y, and 2 respectively) for adjusting the position in the radial direction of the magnetic rotating body 11, the displacement detection sensor includes a radial displacement detection sensor 18Ax (A and x are interchangeable with B and y respectively) for detecting the displacement in the radial direction of the magnetic rotating body 11, and the magnetic bearing drive current control section 26 adjusts the magnetism of the radial electromagnet according to the detection signal of the radial displacement detection sensor 18Ax etc., and/or the electromagnet includes an axial electromagnet 13z1, 13z2 for adjusting the position in the axial direction of the magnetic rotating body 11, the displacement detection sensor includes an axial displacement detection sensor 18C for detecting the displacement in the axial direction of the magnetic rotating body 11, and the magnetic bearing drive current control section 26 adjusts the magnetism of the axial electromagnet 13z1, 13z2 according to the detection signal of the axial displacement detection sensor 18C.

In the case of "and" above, there are a multiplicity of the electromagnets and a multiplicity of the displacement detection sensors, the radial electromagnet and the axial electromagnet are different electromagnets, and the radial displacement detection sensor and the axial displacement detection sensor are different sensors. According to the constitution, as the magnetism of the radial electromagnet or the axial electromagnet is adjusted, the displacement of the magnetic rotating body can be efficiently adjusted.

In a magnetic bearing device 100 according to a fifth aspect of the present invention in the magnetic bearing device according to the fourth aspect, as shown in FIG. 1 and FIG. 2, for example, the electricity supply line is a wiring 30L for supplying an electric power to any of a motor 14, the radial electromagnet 12Ax1 etc., the axial electromagnet 13z1, 13z2, the radial displacement detection sensor 18Ax etc., the axial displacement detection sensor 18C, or an electric circuit 21, 22, 28.

The electric circuit may be an arbitrary electric circuit disposed in the magnetic bearing main unit 10. According to the constitution, as an existing wiring in the dedicated cable can be used for the power line communication, a signal wire can be eliminated or reduced. It is preferable that the electricity supply line to the electric circuit is selected as an electricity supply line used for the alternating-current coupling because the influence from the electromagnet and the displacement detection sensor is less.

In a magnetic bearing device according to the sixth aspect of the present invention in any of the magnetic bearing devices in the third aspect to the fifth aspect, an amplitude modulation method, a frequency modulation method, a phase modulation method, a spread spectrum modulation method, or a combination thereof is used for the modulation in the modulation carrier circuit 22.

According to the constitution, as the amount of the positional displacement detected by the displacement detection sensor is expressible by the degree of the modulation, the displacement of the magnetic rotating body can be efficiently adjusted.

In a magnetic bearing device according to the seventh aspect of the present invention in any of the magnetic bearing devices according to the third aspect to the fifth aspect, a plurality of frequency ranges is used for the carrier wave.

According to the constitution, as the signal of each displacement detection sensor is assigned to each different frequency range, it is possible to carry a multiplicity of signals by one electricity power supply line.

In a magnetic bearing device 100A according to the eighth aspect of the present invention in any of the magnetic bearing devices according to the third aspect to the seventh aspect, as shown in FIG. 3, for example, the magnetic bearing main unit 10 has an analog-to-digital converter circuit 28 for analog-to-digital converting the detection signal from the displacement detection sensor 18 and for supplying the converted signal to the modulation carrier circuit 22, and the control device 20 has a digital-to-analog converter circuit 29 for digital-to-analog converting the detection signal demodulated by the carrier wave demodulating circuit 24 and for supplying the converted signal to the compensating circuit 25.

According to the constitution, as the power line carrying is executed with the digital signal, the reliability of the carrying is high. In addition, as the digits for expressing the positional displacement are increased, the processing can be executed with a high accuracy.

In a magnetic bearing device 100, 100A according to the ninth aspect of the present invention in any of the magnetic bearing devices according to the third aspect to the seventh aspect, as shown in FIG. 2 or FIG. 3, for example, the magnetic bearing main unit 10 has a signal processing circuit 21 for processing the detection signal from the displacement detection sensor 18 and for supplying the processing signal to the modulation carrier circuit 22 or to the modulation carrier circuit 22 via the analog-to-digital converter circuit 28.

the signal processing is for example noise cutting processing, filtering processing, amplifying processing, and displacement-converting processing. According to the constitution, as an output is made after the signal processing circuit converts the signal into a level easily processed by the modulation carrier circuit or the analog-to-digital converter circuit, the processing in the next step can be executed smoothly.

In a magnetic bearing device 100C according to the tenth aspect of the present invention in any of the magnetic bearing devices according to the third aspect to the ninth aspect, as shown in FIG. 5, for example, the magnetic bearing main unit 10 detects a monitor signal such as a rotational speed or a temperature of the magnetic rotating body 11 and the modulation carrier circuit 22 modulates the carrier wave with the monitor signal and generates the modulated wave.

According to the constitution, as the power line communication can be applied also to the monitor signals of the rotational speed, the temperature, or the like, the power line can be widely used.

In a magnetic bearing device 100C according to the eleventh aspect of the present invention in the magnetic bearing devices according to the first aspect, as shown in FIG. 2, for example, the magnetic bearing main unit 10 has a displacement detection sensor 18 for detecting the displacement of the magnetic rotating body 11 and a magnetic bearing drive current control section 26 (the bearing drive power amplifier in the drawing) for adjusting the magnetism of the electromagnet 12M according to the control signal, the carrier signal wave generation means has a modulation carrier circuit 22 for generating a modulated wave as the carrier signal wave by modulating a carrier wave with the detection signal from the displacement detection sensor 18, and the first alternating-current coupling section 23A alternating-current couples the modulated wave generated by the modulation carrier circuit 22 with the electricity supply line 30L for transmitting the modulated wave to the control device 20, in the control device 20, the carrier signal wave detecting means has a carrier wave demodulating circuit 24 for demodulating the detection signal from the modulated wave separated by the second alternating-current coupling section 23B, and the control signal generation means has a compensating circuit 25 for generating a compensating signal as the control signal for correcting the displacement of the magnetic rotating body 11 according to the detection signal demodulated by the carrier wave demodulating circuit 24 and for supplying the compensating signal to the magnetic bearing drive current control section 26, and the magnetic bearing drive current control section 26 adjusts the magnetism of the electromagnet 12M according to the compensating signal and controls the levitation position of the magnetic rotating body 11 so as to reduce the displacement.

According to the constitution, as the magnetic bearing drive current control section is in the magnetic bearing main unit, the magnetic bearing and the magnetic bearing drive current control section for driving the electromagnet can be matched efficiently, so that the magnetic bearing main unit and the control device are more freely combined.

In a magnetic bearing device 100B according to the twelfth aspect of the present invention in the magnetic bearing devices according to the second aspect, as shown in FIG. 4, for example, the magnetic bearing main unit 10 has a displacement detection sensor 18 for detecting the displacement of the magnetic rotating body 11 and a magnetic bearing drive current control section 26 for adjusting the magnetism of the electromagnet 12M according to the control signal, the first carrier signal wave generation means has a first modulation carrier circuit 22A for generating a first modulated wave as the first carrier signal wave by modulating a first carrier wave with the detection signal from the displacement detection sensor 18, and the first alternating-current coupling section 23A alternating-current couples the first modulated wave with the first electricity supply line 30LA for transmitting the first modulated wave to the control device 20, in the control device 20, the first carrier signal wave detecting means has a first carrier wave demodulating circuit 24A for demodulating the detection signal from the first modulated wave separated by the second alternating-current coupling section 23B, and the control signal generation means has a compensating circuit 25 for generating a compensating signal as the control signal for correcting the displacement of the magnetic rotating body 11 according to the detection signal demodulated by the first carrier wave demodulating circuit 24A, in the control device 20, furthermore, the second carrier signal wave generation means has a second modulation carrier circuit 22B for generating a second modulated wave as the second carrier signal wave by modulating a second carrier wave with the compensating signal from the compensating circuit 25, and the third alternating-current coupling section 23C alternating-current couples the second modulated wave with the second electricity supply line 30LB for transmitting the second modulated wave to the magnetic bearing main unit 10, in the magnetic bearing main unit 10, furthermore, the second carrier signal wave detecting means has a second carrier wave demodulating circuit 24B for demodulating the compensating signal from the second modulated wave separated by the fourth alternating-current coupling section 23D and for supplying the demodulated signal to the magnetic bearing drive current control section 26, and the magnetic bearing drive current control section 26 adjusts the magnetism of the electromagnet 12M according to the compensating signal and controls the levitation position of the magnetic rotating body 11 so as to reduce the displacement.

According to the constitution, as the signals in both directions are carried in the electricity supply line from the control device to the magnetic bearing main unit, it is further possible to eliminate or reduce a signal wire in the dedicated cable.

In a magnetic bearing device 100C, 100D according to the thirteenth aspect of the present invention in the magnetic bearing devices according to the first aspect, as shown in FIG. 5 or FIG. 6, for example, in the magnetic bearing main unit 10, the carrier signal wave generation means has a high-frequency oscillation means 34 for oscillating a high-frequency signal as the carrier signal wave, and the first alternating-current coupling section 23E alternating-current couples the high-frequency signal oscillated by the high-frequency oscillation means 34 with the electricity supply line 30L as the carrier signal wave for transmitting the high-frequency signal to the control device 20, in the control device 20, the second alternating-current coupling section 23F separates the high-frequency signal alternating-current coupled from the electricity supply line 30L, and the carrier signal wave detecting means has a frequency detection circuit 38 for detecting the frequency from the high-frequency signal separated by the second alternating-current coupling section 23F, and the control device 20 has a property determination means 36 (the multiple signal processing circuit in FIG. 5 or in FIG. 6) for identifying the property of the magnetic bearing main unit 10 according to the frequency detected by the frequency detection circuit 38.

The property determination means 36 may be a signal processing circuit having a property determination function. According to the constitution, it is possible to simply provide a method for executing a model identification of the magnetic bearing main unit not by adding the number of cable core wires but by adding a small amount of components.

In a magnetic bearing device 100E according to the fourteenth aspect of the present invention in the magnetic bearing devices according to the first aspect, as shown in FIG. 7, for example, in the magnetic bearing main unit 10, in the magnetic bearing main unit 10, the carrier signal wave generation means has a pulse oscillation circuit 41 (the specific pulse oscillation circuit in FIG. 7) for oscillating a pulse signal as the carrier signal wave, and the first alternating-current coupling section 23A alternating-current couples the pulse signal oscillated by the pulse oscillation circuit 41 with the electricity supply line 30L as the carrier signal wave for transmitting the pulse signal to the control device 20, in the control device 20 the second alternating-current coupling section 23B separates the pulse signal alternating-current coupled from the electricity supply line 30L, and the carrier signal wave detecting means has a pulse period sensing means 45 (the pulse demodulation circuit in FIG. 7) for sensing the pulse period from the pulse signal separated by the second alternating-current coupling section 23B, and the control device 20 has a property determination means 36 (the multiple signal processing circuit in FIG. 7) for identifying the property of the magnetic bearing main unit 10 according to the pulse period sensed by the pulse period sensing means 45.

According to the constitution, it is possible to simply provide a method for executing a model identification of the magnetic bearing main unit not by adding the number of cable core wires but by adding a small amount of components.

In a magnetic bearing device 100C to 100E according to the fifteenth aspect of the present invention in the magnetic bearing devices according to the thirteenth aspect or fourteenth aspect, as shown in FIG. 2, for example, the electricity supply line 30L alternating-current coupled is a wiring for supplying an electric power to an electric circuit.

The electric circuit may be an arbitrary electric circuit disposed to the magnetic bearing main unit 10. The constitution is preferable because the influence from the electromagnet and the displacement detection sensor is small.

In a magnetic bearing device 100C, 100D according to the sixteenth aspect of the present invention in the magnetic bearing devices according to the thirteenth aspect, the magnetic bearing main unit 10 has a filter circuit for limiting the frequency range of the high-frequency signal from the high-frequency oscillation means 34 in a predefined range for the passage.

According to the constitution, as the frequency range of the carrier wave can be selected according to the model of the magnetic bearing main unit, a multiplicity of models can be identified by one high-frequency oscillation means.

In a magnetic bearing device 100C, 100D according to the seventeenth aspect of the present invention in the magnetic bearing devices according to the second aspect, as shown in FIG. 4 or FIG. 5, for example, in the magnetic bearing main unit 10, the first carrier signal wave generation means has a high-frequency oscillation means 34 for oscillating a high-frequency signal as the carrier signal wave, and the first alternating-current coupling section 23A (23E in FIGS. 5 and 6) alternating-current couples the high-frequency signal oscillated by the high-frequency oscillation means 34 with the first electricity supply line 30LA (30L in FIGS. 5 and 6) as the carrier signal wave for transmitting the high-frequency signal to the control device 20, in the control device 20, the second alternating-current coupling section 23B (23F in FIGS. 5 and 6) for separating the high-frequency signal alternating-current coupled from the first electricity supply line 30LA, and the first carrier signal wave detecting means has a frequency detection circuit 38 for detecting the frequency from the high-frequency signal separated by the second alternating-current coupling section 23B, and the control device 20 has a property determination means 36 for identifying the property of the magnetic bearing main unit 10 according to the frequency detected by the frequency detection circuit 38.

According to the constitution, as signals in both directions are carried in the electricity supply line from the control device to the magnetic bearing main unit, it is further possible to eliminate or reduce a signal wire in the dedicated cable.

In a magnetic bearing device 100E according to the eighteenth aspect of the present invention in the magnetic bearing devices according to the second aspect, as shown in FIG. 4 or FIG. 7, for example, in the magnetic bearing main unit 10, the first carrier signal wave generation means has a pulse oscillation circuit 41 for oscillating a pulse signal as the carrier signal wave, and the first alternating-current coupling section 23A (23E in FIG. 7) alternating-current couples the pulse signal oscillated by the pulse oscillation circuit 41 with the first electricity supply line 30LA (30L in FIG. 7) as the carrier signal for transmitting the pulse signal to the control device 20, in the control device 20, the second alternating-current coupling section 23B (23F in FIG. 7) separates the pulse signal alternating-current coupled from the first electricity supply line 30LA, and the first carrier signal wave detecting means has a pulse period sensing means 45 for sensing the pulse period from the pulse signal separated by the second alternating-current coupling section 23B, and the control device 20 has a property determination means 36 for identifying the property of the magnetic bearing main unit 10 according to the pulse period detected by the pulse period sensing means 45.

According to the constitution, as signals in both directions are carried in the electricity supply line from the control device to the magnetic bearing main unit, it is further possible to eliminate or reduce a signal wire in the dedicated cable.

In a magnetic bearing device 100C, 100D according to the nineteenth aspect of the present invention in the magnetic bearing devices according to the first aspect, as shown in FIG. 4 to FIG. 6, for example, the magnetic bearing main unit 10 has a displacement detection sensor 18 for detecting the displacement of the magnetic rotating body 11, the carrier signal wave generation means has a modulation carrier circuit 22 for generating a modulated wave as the carrier signal wave by modulating a carrier wave with the detection signal from the displacement detection sensor 18, and the first alternating-current coupling section 23A alternating-current couples the modulated wave generated by the modulation carrier circuit 22 with the electricity supply line 30L for transmitting the modulated wave to the control device 20, the control device 20 has a magnetic bearing drive current control section 26 for adjusting the magnetism of the electromagnet 12M according to the control signal, the carrier signal wave detecting means has a carrier wave demodulating circuit 24 for demodulating the detection signal from the modulated wave separated by the second alternating-current coupling section 23B, the control signal generation means has a compensating circuit 25 for generating a compensating signal as the control-signal for correcting the displacement of the magnetic rotating body 11 according to the detection signal demodulated by the carrier wave demodulating circuit 24 and for supplying the compensating signal to the magnetic bearing drive current control section 26, and the magnetic bearing drive current control section 26 adjusts the magnetism of the electromagnet 12M according to the compensating signal and controls the levitation position of the magnetic rotating body 11 so as to reduce the displacement, in the magnetic bearing main unit 10, furthermore, the carrier signal wave generation means has a high-frequency oscillation means 34 for oscillating a high-frequency signal as the carrier signal wave, and the first alternating-current coupling section 23A alternating-current couples the high-frequency signal oscillated by the high-frequency oscillation means 34 with the electricity supply line 30L as the carrier signal wave for transmitting the high-frequency signal to the control device 20, in the control device 20, the second alternating-current coupling section 23B separates the high-frequency signal alternating-current coupled from the electricity supply line 30L, and the carrier signal wave detecting means has a frequency detection circuit 38 for detecting the frequency from the high-frequency signal separated by the second alternating-current coupling section 23B, and the control device 20 has a property determination means 36 for identifying the property of the magnetic bearing main unit 10 according to the frequency detected by the frequency detection circuit 38.

The electricity supply line and the first and second alternating-current coupling sections used for the power line communication may be commonly used in relation to a multiplicity of detection signals and model identification signals or may be independently used. The constitution enables that the electricity supply line is used as a signal wire by alternating-current coupling a signal such as the displacement sensing signal of the displacement detection sensor and the signal for a model identification with the electricity supply line from the control device to the magnetic bearing main unit. Elimination or reduction of a signal wire in the dedicated cable is thus enabled.

In a magnetic bearing device 100E according to the twentieth aspect of the present invention in the magnetic bearing devices according to the first aspect, as shown in FIG. 2 and FIG. 7, for example, the magnetic bearing main unit 10 has a displacement detection sensor 18 for detecting the displacement of the magnetic rotating body 11, the carrier signal wave generation means has a modulation carrier circuit 22 for generating a modulated wave as the carrier signal wave by modulating a carrier wave with the detection signal from the displacement detection sensor 18, and the first alternating-current coupling section 23A alternating-current couples the modulated wave generated by the modulation carrier circuit 22 with the electricity supply line 30L for transmitting the modulated wave to the control device 20, the control device 20 has a magnetic bearing drive current control section 26 for adjusting the magnetism of the electromagnet 12M according to the control signal, the carrier signal wave detecting means has a carrier wave demodulating circuit 24 for demodulating the detection signal from the modulated wave separated by the second alternating-current coupling section 23B, the control signal generation means has a compensating circuit 25 for generating a compensating signal as the control signal for correcting the displacement of the magnetic rotating body 11 according to the detection signal demodulated by the carrier wave demodulating circuit 24 and for supplying the compensating signal to the magnetic bearing drive current control section 26, and the magnetic bearing drive current control section 26 adjusts the magnetism of the electromagnet 12M according to the compensating signal and controls the levitation position of the magnetic rotating body 11 so as to reduce the displacement, in the magnetic bearing main unit 10, furthermore, the carrier signal wave generation means has a pulse oscillation circuit 41 for oscillating a pulse signal as the carrier signal wave, and the first alternating-current coupling section 23A alternating-current couples the pulse signal oscillated by the pulse oscillation circuit 41 with the electricity supply line 30L as the carrier signal wave for transmitting the pulse signal to the control device 20, in the control device 20, the second alternating-current coupling section 23B separates the pulse signal alternating-current coupled from the electricity supply line 30L, and the carrier signal wave detecting means has a pulse period sensing means 45 for sensing the pulse period from the pulse signal separated by the second alternating-current coupling section 23B, and the control device 20 has a property determination means 36 for identifying the property of the magnetic bearing main unit 10 according to the pulse period sensed by the pulse period sensing means 45.

The constitution enables that the electricity supply line is used as a signal wire by alternating-current coupling a signal such as the displacement sensing signal of the displacement detection sensor and the signal for a model identification with the electricity supply line from the control device to the magnetic bearing main unit. Elimination or reduction of a signal wire in the dedicated cable is thus enabled.

In a magnetic bearing device 100C to 100E according to the twenty-first aspect of the present invention in the magnetic bearing devices according to the nineteenth aspect or twentieth aspect, the compensating circuit 25 can set a parameter according to a model on the basis of the property of the magnetic bearing main unit 10 identified by the property determination means 36 when the compensating signal is generated.

According to the constitution, as the model identification function of the magnetic bearing device and the displacement adjustment function of the magnetic rotating body are combined, the automatic setting of the parameter for generating the compensatory signal becomes possible.

A rotation system according to the twenty-second aspect of the present invention comprises the magnetic bearing device according to any one of aspect 1 to aspect 21, a magnetic rotating body 11 magnetically levitated by the magnetic bearing device for a rotation, and a rotor main unit 10 connected with the magnetic rotating body 11 for a rotation.

The rotor main unit is the magnetic rotating body of a part functioning as a turbo-molecular pump or the like in a rotating mechanism such as a turbo-molecular pump. The magnetic rotating body and the rotor main unit may be constituted together or may be independently constituted and connected by a coupling device. The rotation system refers to the rotating mechanism in the rotating machinery. According to the constitution, as it is possible to use the electricity supply line as a signal wire by using the magnetic bearing device in accordance with the present invention, elimination or reduction of a signal wire in the dedicated cable of the rotation systems can be enabled.

The turbo-molecular pump according to the twenty-third aspect of the present invention comprises the rotation system according to the twenty-second aspect.

According to the constitution, as it is possible to use the electricity supply line as a signal wire by using the magnetic bearing device in accordance with the present invention, elimination or reduction of a signal wire in the dedicated cable of the turbo-molecular pump can be enabled.

The semiconductor-production equipment according to the twenty-fourth aspect of the present invention comprises the rotation system according to the twenty-second aspect. according to the twenty-second embodiment.

According to the constitution, as it is possible to use the electricity supply line as a signal wire by using the magnetic bearing device in accordance with the present invention, elimination or reduction of a signal wire in the dedicated cable of the semiconductor-production equipment can be enabled.

To solve the problem above, in a model identification method of a rotating machinery main unit 10F in a rotating mechanism 100F according to a twenty-fifth aspect of the present invention, as shown in FIG. 9, for example, the rotating mechanism 100F comprises a rotating machinery main unit 10F supporting a rotating body 11F by using a bearing 12A, 12B, 13 and a control device 20F for controlling the rotating machinery main unit 10F, for identifying a model of the rotating machinery main unit 10F connected to the control device 20F via a dedicated cable 30F, the model is identified among a plurality of models of the rotating machinery main unit, each of the models of rotating machinery main unit 10F is corresponding to the control device 20F which can set a control condition suitable to the model of rotating machinery main unit 10F, model identification information for identifying the model of the rotating machinery main unit 10F is stored in an adapter unit 123 provided between the dedicated cable 30F and the rotating machinery main unit 10F or between the dedicated cable 30F and the control device 20F, and the model identification information is recognized from the side of the control device 20.

According to the constitution, as the model identification information for identifying the model of the rotating machinery main unit is stored in the adapter unit provided between the dedicated cable and the rotating machinery main unit or between the dedicated cable and the control device, the model identification information can be recognized from the side of the control device. Consequently, the model of the rotating machinery main unit connected by the control device can be recognized, and the control condition optimal for the rotating machinery main unit of the recognized model can be set easily and surely. In addition, as the adapter unit is mounted between the rotating machinery main unit and the dedicated cable, it is possible to easily add the model identification function of the rotating machinery main unit to the rotating mechanism having been already provided to a production facility. In addition, as the adapter unit is provided to the connecting section of the rotating machinery main unit and the dedicated cable, it is possible to confirm the model of the rotating machinery main unit and surely store (set) the model identification information in the adapter unit.

In a model identification method of a rotating machinery main unit 10F in a rotating mechanism 100F according to a twenty-sixth aspect of the present invention in a model identification method of a rotating machinery main unit in a rotating mechanism according to a twenty-fifth aspect, as shown in FIG. 9, for example, the rotating machinery main unit 10F supports the rotating body 11F by a magnetic bearing.

According to the constitution, an effect similar to that of the twenty-fifth aspect is achieved in the rotating mechanism having the rotating machinery main unit supporting the rotating body by the magnetic bearing.

In a model identification method of a rotating machinery main unit 10F in a rotating mechanism 100F according to a twenty-seventh aspect of the present invention in a model identification method of a rotating machinery main unit in a rotating mechanism according to a twenty-fifth aspect, the rotating machinery main unit 10F is a turbo-molecular pump, a gas circulating fan, or an equivalent in which a rotating body 11F is supported by a magnetic bearing 12A, 12B, 13.

According to the constitution, an effect similar to that of the twenty-fifth aspect is achieved in the rotating mechanism having the turbo-molecular pump, the gas circulating fan, or an equivalent supporting the rotating body by the magnetic bearing as the rotating machinery main unit.

To solve the problem above, a rotating mechanism 100F according to a twenty-eighth aspect of the present invention, as shown in FIG. 9 and FIG. 12, for example, comprises a rotating machinery main unit 10F supporting a rotating body 11F by using a bearing 12A, 12B, 13, and a control device 20F for controlling the rotating machinery main unit 10F, a model of the rotating machinery main unit 10F connected to the control device 20F via a dedicated cable 30F is identified among a plurality of models of the rotating machinery main unit each of the models of rotating machinery main unit 10F is corresponding to the control device which can set a control condition suitable to the model of rotating machinery main unit 10F, an adapter unit 123 is provided between the dedicated cable 30F and the rotating machinery main unit 10F or between the dedicated cable 30F and the control device 20F, a model identifying information means 70 (the model identifying information setting circuit in FIG. 12) provided with information for identifying the model of the connected rotating machinery main unit 10F is stored in the adapter unit 123, and the model identification information is recognized from the side of the control device 20F.

According to the constitution, the adapter unit is provided between the dedicated cable and the rotating machinery main unit or between the dedicated cable and the control device, the model identifying information means provided with the information for identifying the model of the rotating machinery main unit connected with the adapter unit is stored in the adapter unit, and the model identification information can be recognized from the side of the control device. Consequently, the model of the connected rotating machinery main unit can be recognized on the side of the control device, and the control condition optimal for controlling the rotating machinery main unit of the recognized model can be set easily and surely. In addition, as the adapter unit is mounted between the rotating machinery main unit and the dedicated cable, it is possible to easily add the model identification function of the rotating machinery main unit to the rotating mechanism having been already provided to a production facility. In addition, as the adapter unit is provided to the connecting section of the dedicated cable of the rotating machinery main unit, it is possible to confirm the model of the rotating machinery main unit in order to surely store (set) the model identification information in the adapter unit.

In a rotating mechanism 100F according to a twenty-ninth aspect of the present invention in a rotating mechanism according to a twenty-eighth aspect, the rotating machinery main unit 10F supports the rotating body 11F by a magnetic bearing 12A, 12B, 13.

According to the constitution, an effect similar to that of the twenty-eighth aspect is achieved in the rotating mechanism for supporting the rotating body by the magnetic bearing.

A rotating mechanism 100K according to a thirtieth aspect of the present invention in a rotating mechanism according to a twenty-ninth aspect, as shown in FIG. 24, for example, comprises the magnetic bearing main unit 10K having an electromagnet 12M (see FIG. 2) for generating a magnetism for magnetically levitating and rotatably supporting the magnetic rotating body 11 (see FIG. 1) and for functioning as a magnetic bearing, the control device 20K having a power supply 27 (see FIG. 2) for supplying an electric power to the magnetic bearing main unit 10K and a control signal generation means (the compensating circuit 25 in FIG. 24) for generating a control signal for controlling a levitation position of the magnetic rotating body 11 by adjusting the magnetism, an electricity supply line 30L for supplying the electric power from the control device 20K to the magnetic bearing main unit 10K, a signal wiring for transmitting a signal used to control or to detect the magnetic bearing main unit 10K between the control device 20K and the magnetic bearing main unit 10K, the dedicated cable 30K for storing the electricity supply line and the signal wiring provided between the control device 20K and the magnetic bearing main unit 10K, an adapter unit 123K provided between the dedicated cable 30K and the magnetic bearing main unit 10K or between the dedicated cable 30K and the control device 20K for storing model identification information for identifying the model of the magnetic bearing main unit 10K, and one or more relay wiring connected with the electricity supply line for relaying the electric power used for supplying to the magnetic bearing main unit 10K from the control device or connected with the signal wiring for relaying signal used for transmitting between the magnetic bearing main unit 10K and the control device 20K through the adapter unit 123K, the adapter unit 123K has a carrier signal wave generation means (the high-frequency oscillation circuit 34 in FIG. 24) for generating a carrier signal wave and a first alternating-current coupling section (the alternating-current coupling circuit 35 in FIG. 24) for alternating-current coupling the carrier signal wave generated by the carrier signal generation means 34 with the relay wiring 30L for transmitting the carrier signal wave to the control device 20K, and the control device 20K has a second alternating-current coupling section (the alternating-current coupling circuit 39 in FIG. 24) for separating the carrier signal alternating-current coupled from the relay wiring 30L and a carrier signal wave detecting means (the alternating-current coupling circuit 39 in FIG. 24) for detecting the carrier signal wave separated by the second alternating-current coupling section 39.

According to the constitution, the alternating-current coupling section for superposing the model identifying signal of the magnetic bearing main unit in the electric power wiring used for the power supply to the magnetic bearing main unit is provided, the model identifying signal is superposed in the electric power wiring, and the model identification information of the magnetic bearing main unit is recognized from the side of the control device. As a result, it is possible that the electricity supply line is used as a signal wire, and a signal wiring for transmitting the model identifying signal of the magnetic bearing main unit to the control device can be omitted.

In a rotating mechanism 100F according to a thirty-first aspect of the present invention in a rotating mechanism according to the twenty-ninth or thirtieth aspect, as shown in FIG. 13A and FIG. 138, for example, a relay wiring 71 for relaying a signal used for controlling the rotating machinery main unit 10F or an electric power used for supplying to the rotating machinery main unit and one or more connective wiring 75 connected with the control cable 30F on the side of the control device 20F are provided in the adapter unit 123, and the model identifying information means 70 has a passive component switching circuit 74 constituted with a passive electronic component 72 such as a resistor and an electrostatic capacity element and a switching element 73 and sets so as to select the passive electronic component 72 corresponding to the model identification information on the connected rotating machinery main unit 10F by a passive component switching circuit 74, and the model identification information on the rotating machinery main unit 10F is recognized from the side of the control device 20F.

According to the constitution, the model identifying information means has the passive component switching circuit constituted with a passive electronic component such as a resistor and an electrostatic capacity element and a switching element. The passive component switching circuit are switched, the model identification information on the connected rotating machinery main unit is set, and the model identification information of the rotating machinery main unit can be recognized from the side of the control device. As a result, an effect similar to that of the twenty-ninth aspect is achieved. In addition, the model identification information on the rotating machinery main unit can be easily stored, and the model identification information can be easily recognized from the side of the control device.

In a rotating mechanism 100F according to a thirty-second aspect of the present invention in a rotating mechanism according to the twenty-ninth or thirtieth aspect, as shown in FIG. 14A and FIG. 14B, for example, a relay wiring 71 for relaying a signal used for controlling the rotating machinery main unit 10F or an electric power used for supplying to the rotating machinery main unit and one or more connective wiring 75 connected with the control cable 30F on the side of the control device 20F are provided in the adapter unit 123A, and the model identifying information means 70 has a constant current circuit 77 to be set to an arbitrary current value and a set means 73 for setting the current value to an arbitrary value, and the model of the rotating machinery main unit 10F is recognized from the side of the control device 20F by setting the constant current value of the constant current circuit 77 to the current value corresponding to the model identification information on the connected rotating machinery main unit 10F.

A set means for setting the current value to an arbitrary value may be able to set the current value automatically in linkage with the detection signal of the displacement detection sensor or may be switched manually. According to the constitution, the model identifying information means has the constant current circuit to be set to an arbitrary current value and a set means for setting the current value to an arbitrary value, the constant current value of the constant current circuit is set to the current value corresponding to the model identification information on the connected rotating machinery main unit, and the model identification information on the rotating machinery main unit can be recognized from the side of the control device. As a result, an effect similar to that of the twenty-ninth aspect is achieved. In addition, the model identification information on the rotating machinery main unit can be easily set, and the model identification information can be easily recognized from the side of the control device.

In a rotating mechanism 100F according to a thirty-third aspect of the present invention in a rotating mechanism according to the twenty-ninth or thirtieth aspect, as shown in FIG. 15A and FIG. 15B, for example, a relay wiring 71 for relaying a signal used for controlling the rotating machinery main unit 10F or an electric power used for supplying to the rotating machinery main unit and one or more connective wiring 75 connected with the control cable 30F on the side of the control device 20F are provided in the adapter unit 123B, and the model identifying information means 70 has a data storage cell 78 storing predefined data concerning to the model of the rotating machinery main unit 10F, a communication circuit 79 (the signal processing circuit in the drawing), and a data switch means 73, and the model of the rotating machinery main unit 10F is recognized from the side of the control device 20F by setting so as to select the data stored in the data storage cell 78 to the data corresponding to the model identification information on the connected rotating machinery main unit 10F.

According to the constitution, the model identifying information means has the data storage cell for storing a predefined data concerning to the model of the rotating machinery main unit, the communication circuit, and the data switch means, the data stored in the data storage cell is set so as to select the data corresponding to the model identification information on the connected rotating machinery main unit, and the model identification information on the rotating machinery main unit can be recognized from the side of the control device. As a result, an effect similar to that of the twenty-ninth aspect is achieved. In addition, the model identification information on the rotating machinery main unit can be easily stored, and the model identification information can be easily recognized from the side of the control device.

In a rotating mechanism 100F according to a thirty-fourth aspect of the present invention in a rotating mechanism according to the thirty-third aspect, as shown in FIG. 22A and FIG. 22B, for example, operation information supplied from the control device 20F via communication can be written in the data storage cell 84 via the communication circuit 79 (the signal processing circuit in the drawing), and the written operation information can be read from the control device 20F via the communication circuit 79 or the data stored in the data storage cell 84 can be read by an external signal processing device by providing another communication circuit 85.

According to the constitution, the operation information supplied from the control device via communication can be written in the data storage cell via the communication circuit, and the operation information having been written can be read from the control device via the communication circuit or the data stored in the data storage cell from an external signal processing device can be read by providing another communication circuit. As a result, an effect similar to that of the thirty-third aspect is achieved. In addition, the firmware for the upgrade on the side of the control device can be sent from the adapter unit, and it becomes easy to optimize the control condition such as each type of setting information and the like on the side of the control device for each model of the rotating machinery main unit. In addition, the data stored in the data storage cell can be read also from the external signal processing device.

In a rotating mechanism 100F according to a thirty-fifth aspect of the present invention in a rotating mechanism according to the thirty-third aspect, as shown in FIG. 20A to FIG. 20C, for example, an installing orientation sensing element 82 for sensing the installing orientation of the adapter unit 123E in relation to the direction of the gravitational force is provided in the adapter unit 123E, an installing orientation detection signal from the installing orientation sensing element 82 is transmitted to the control device 20F with the model identifying signal, and the model and the installing orientation of the rotating machinery main unit 10 are recognized from the side of the control device 20F.

According to the constitution, the installing orientation detection signal from the installing orientation sensing element provided in the adapter unit is transmitted to the control device with the model identifying signal. As a result, an effect similar to that of the thirty-third aspect is achieved, and it becomes easy to optimize the control condition also in consideration of the installing orientation.

In a rotating mechanism 100F according to a thirty-sixth aspect of the present invention in a rotating mechanism according to the thirty-third aspect, as shown in FIG. 21A to FIG. 21C, for example, a switch means 83 for setting a predefined output signal by a manual operation according to the installing orientation of the adapter unit 123F in relation to the direction of the gravitational force is provided in the adapter unit 123F, the installing orientation signal set by the manual operation is transmitted to the control device 20F with the model identifying signal, and the model and the installing orientation of the rotating machinery main unit 10F are recognized from the side of the control device 20F.

According to the constitution, the installing orientation signal set by a manual operation is transmitted to the control device with the model identifying signal. As a result, an effect similar to that of the thirty-third aspect is achieved, and it becomes easy to optimize the control condition also in consideration of the installing orientation.

In a rotating mechanism 100J according to a thirty-seventh aspect of the present invention in a rotating mechanism according to the twenty-ninth aspect, as shown in FIG. 16, FIG. 17A and FIG. 17B, for example, a power source section 76 for driving an internal circuit and an alternating-current coupling section 80 for superposing the model identifying signal of the rotating machinery main unit 10F in any relay wiring 71 such as a signal wiring used for controlling or detecting the rotating machinery main unit 10F or an electric power wiring used for supplying an electric power are provided in the adapter unit 123C, and the model of the rotating machinery main unit 10F is recognized from the side of the control device 20F by duplicating the model identifying signal in the relay wiring 71.

According to the constitution, the alternating-current coupling section for superposing the model identifying signal of the rotating machinery main unit in either of the signal wiring used for controlling or detecting the rotating machinery main unit or the electric power wiring used for the power supply is provided. In addition, the model identifying signal is superposed in the signal wiring or the electric power wiring, and the model identification information on the rotating machinery main unit is recognized from the side of the control device. As a result, an effect similar to that of the twenty-ninth aspect is achieved, and a signal wiring for transmitting the model identifying signal of the rotating machinery main unit to the control device can be omitted.

In a rotating mechanism 100U according to a thirty-eighth aspect of the present invention in a rotating mechanism according to any one of the twenty-ninth aspect to the thirty-seventh aspect, as shown in FIG. 23, for example, the rotating machinery main unit 10U is a turbo-molecular pump, a gas circulating fan 103, or an equivalent in which a rotating body 11U is supported by a magnetic bearing 104, 107, 108.

According to the constitution, an effect similar to that of the twenty-ninth to thirty-seventh aspect is achieved in the rotating mechanism having the turbo-molecular pump, the gas circulating fan, or an equivalent supporting the rotating body by the magnetic bearing as the rotating machinery main unit.

In a rotating mechanism 100F according to a thirty-ninth aspect of the present invention in a rotating mechanism according to any one of the twenty-ninth aspect to the thirty-eighth aspect, as shown in FIG. 12, for example, the control device 20F has a control condition setting means 62A (the multiple signal processing circuit in FIG. 12) for setting a control condition to the condition optimal for a recognized rotating machinery main unit 10F after the model of the rotating machinery main unit 10F connecting to the control device is recognized.

According to the constitution, the control device has the control condition setting means for setting the control condition to the condition optimal for the recognized rotating machinery main unit after recognizing the model of the connected rotating machinery main unit connecting to the control device is recognized. As a result, it is possible to drive the rotating machinery main unit in the optimum condition, and the control for making the maximum use of the function can be executed.

According to the present invention, it is possible that the electricity supply line is used as a signal wire by alternating-current coupling a signal such as the displacement sensing signal of the displacement detection sensor or the signal for a model identification with the electricity supply line from the control device to the magnetic bearing main unit. In addition, elimination or reduction of a signal wire in the dedicated cable is enabled.

According to the preferred aspect of the present invention, it is possible to simply provide the method for executing the model identification of the magnetic bearing main unit not by adding the number of cable core wires but by adding a small amount of components.

According to the present invention, it is possible to provide the model identification method of the rotating machinery main unit in the rotating mechanism in which the model of the rotating machinery main unit can be identified and the control device connected with the rotating machinery main unit can be set to the control condition optimal for the model with an easy and less expensive constitution and sure connection. In addition, it is possible to provide the rotating mechanism with above-mentioned model identification method of the rotating machinery main unit.

This application is based on the Patent Applications No. 2006-233836 filed on Aug. 30, 2006 in Japan and No. 2007-35425 filed on Feb. 15, 2007 in Japan, the contents of which are hereby incorporated in its entirety by reference into the present application, as part thereof.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed.

BRIEF DESCRIPTION OF THE DRAWINGS

FIG. 19A shows an example of the installing orientation of the magnetic bearing main unit of the turbo-molecular pump as the rotating mechanism according to the twelfth embodiment.

FIG. 19B shows another example of the installing orientation of the magnetic bearing main unit of the turbo-molecular pump as the rotating mechanism according to the twelfth embodiment.

FIG. 20A shows an example of the internal constitution of the adapter unit of the rotating mechanism according to the twelfth embodiment.

FIG. 20B shows the details of the switching element in the adapter unit in FIG. 20A.

FIG. 20C shows the details of the installing orientation detector in the adapter unit in FIG. 20A.

FIG. 21A shows an example of the internal constitution of the adapter unit of the rotating mechanism according to the thirteenth embodiment.

FIG. 21B shows the details of the installing orientation selector switch in the adapter unit in FIG. 21A.

FIG. 21C shows the details of the switching element in the adapter unit in FIG. 21A.

FIG. 22A shows an example of the internal constitution of the adapter unit of the rotating mechanism according to the fourteenth embodiment.

FIG. 22B shows the details of the switching element in the adapter unit in FIG. 22A.

FIG. 23 shows the basic constitution of the gas circulating fan of the excimer laser device as the rotating mechanism according to the fifteenth embodiment.

FIG. 27 shows an example of the constitution for connecting the control device with the magnetic bearing main unit of the turbo-molecular pump as a conventional rotating mechanism.

FIG. 28 is a block diagram showing the circuit constitution of the magnetic bearing main unit of the turbo-molecular pump as a conventional rotating mechanism and a control device.

DETAILED DESCRIPTION OF THE PREFERRED EMBODIMENT

Figure 1:
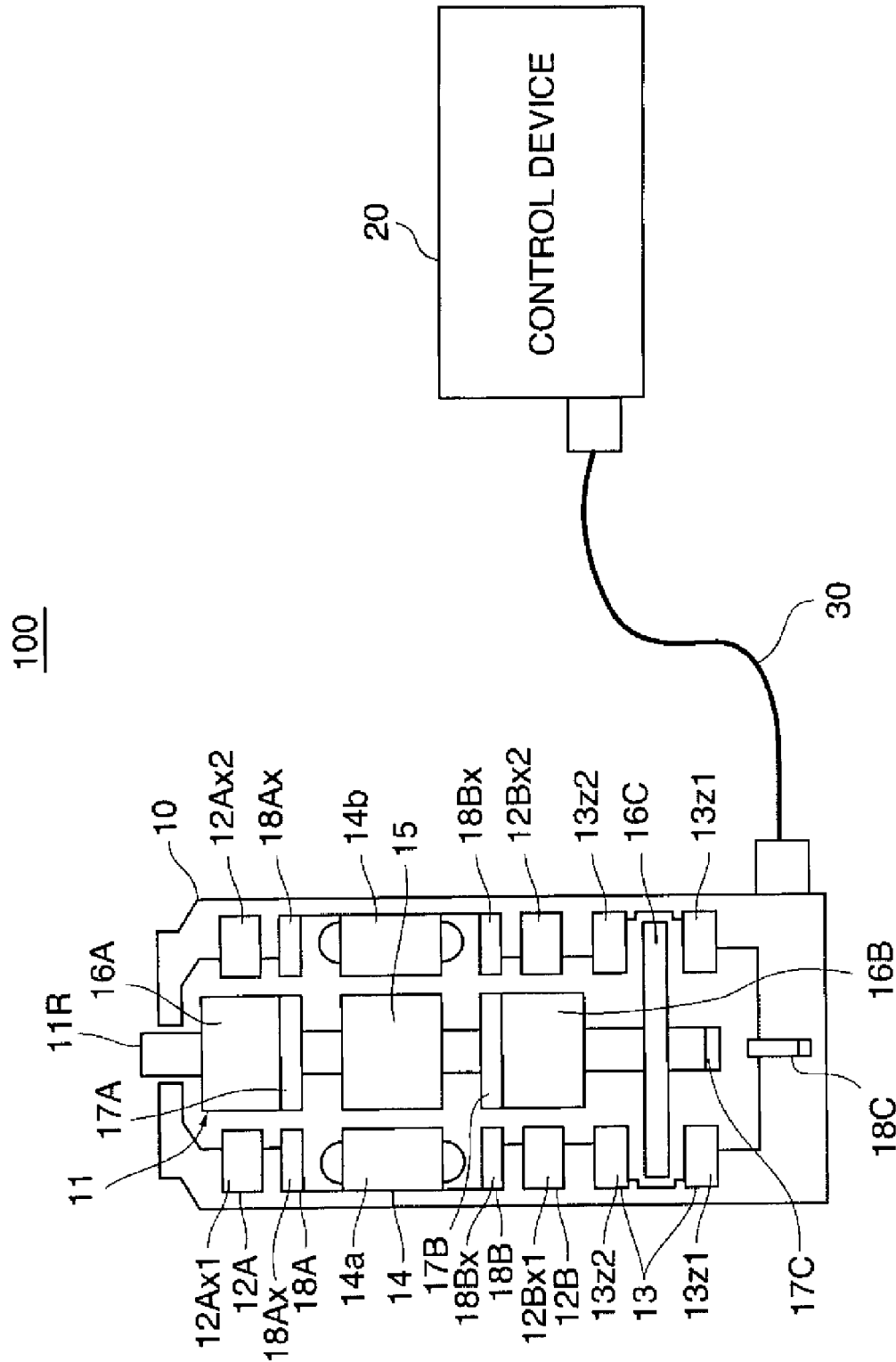
FIG. 1 shows an example of the constitution of the bearing mechanism of the magnetic bearing control system in the first embodiment.

An embodiment according to the present invention will be described hereinafter with reference to accompanying drawings. In FIG. 1 to FIG. 24 according to each embodiment, the parts indicated with the same reference numerals and symbols as in FIG. 25 to FIG. 28 show the same or equivalent parts. The parts indicated with the same reference numerals and symbols in FIG. 1 to FIG. 24 show the same or equivalent parts.

First Embodiment

FIG. 1 shows an example of the constitution of the bearing mechanism of the magnetic bearing control system according to a first embodiment. In this embodiment, an example of a power line communication with an alternating-current coupling for transmitting the amount of the positional displacement detected by the displacement detection sensor will be described. A magnetic bearing device 100 includes the magnetic bearing main unit 10, the control device 20, and a dedicated cable 30 for connecting the magnetic bearing main unit 10 and the control device 20. The magnetic bearing main unit 10 accommodates the magnetic rotating body 11 from which one end of the rotational shaft 11R projects. The magnetic rotating body 11 is supported by the magnetic levitation resulted from two radial magnetic bearings 12A and 12B constituted with radial electromagnets and one axial magnetic bearing 13 constituted with an axial electromagnet. The motor 14 for rotatably driving the magnetic rotating body 11 around the rotational shaft 11R is disposed between the radial magnetic bearings 12A and 12B. The rotor 15 constituted with a magnetic substance is fixedly disposed around the magnetic rotating body 11. Three electromagnets 14a, 14b, and 14c (not shown) disposed at an equal interval, for instance, corresponding to three-phase alternating current are provided in the motor 14 and functions as a stator for the rotor 15. The radial magnetic bearing targets 16A and 16B, the axial magnetic bearing target 16C, and displacement detection sensor targets 17A, 17B, and 17C constituted with a magnetic substance are fixedly disposed around the magnetic rotating body 11 respectively (17C is at the end). The radial displacement detection sensor targets 17A and 17B are disposed in the vicinity of the radial magnetic bearing targets 16A and 16B, respectively. The axial displacement detection sensor target 17C is disposed in the vicinity of the axial magnetic bearing target 16C. Specifically, the magnetic rotating body 11 includes the radial magnetic bearing targets 16A and 16B, the axial magnetic bearing target 16C, the displacement detection sensor targets 17A, 17B, and 17C, and the rotor 15. A rotating machine such as a molecular pump is generally connected with the end of the projecting rotational shaft 11R though not shown in the drawing. The magnetic bearing main unit 10 includes the radial magnetic bearings 12A and 12B (constituted with radial electromagnets) disposed to face the radial magnetic bearing targets 16A and 16B, the axial magnetic bearing 13 (constituted with the axial electromagnet) disposed to face the axial magnetic bearing target 16C, and the rotating body drive motor 14 including the stator disposed to face the rotor 15. The magnetic bearing main unit 10 executes a magnetic levitation support control (five-axis control) for the magnetic rotating body 11.

Assuming that the axial direction of the magnetic rotating body 11 is the Z-direction hereinafter, for example, a magnetic bearing 12A supports the rotating body 11 by the magnetic levitation resulted from the magnetism applied between the radial magnetic bearing target 16A fixedly disposed around the magnetic rotating body 11 and two couples of radial electromagnets facing the opposite sides of the magnetic rotating body 11 and facing the radial magnetic bearing target 16A. The position of the magnetic rotating body 11 in the X-direction is controlled according to the balance of the magnetism between a couple of the radial electromagnets 12Ax1 and 12Ax2. The position of the magnetic rotating body 11 in the Y-direction is controlled according to the balance of the magnetism between another couple of radial electromagnets 12Ay1 and 12Ay2 (not shown). The magnetic bearing 12B supports the rotating body 11 by the magnetic levitation resulted from the magnetism applied between the radial magnetic bearing target 16B fixedly disposed around the magnetic rotating body 11 and two couples of radial electromagnets facing the opposite sides of the magnetic rotating body 11 and facing the radial magnetic bearing target 16B. The position of the magnetic rotating body 11 in the X-direction is controlled according to the balance of the magnetism between a couple of radial electromagnets 12Bx1 and 12Bx2. The position of the magnetic rotating body 11 in the Y-direction is controlled according to the balance of the magnetism between another couple of the radial electromagnets 12By1 and 12By2. In addition, the magnetic rotating body 11 is supported by the magnetic levitation resulted from the magnetism applied between the axial magnetic bearing target 16C fixedly disposed around the magnetic rotating body 11 and a couple of the axial electromagnets $13z1$ and $13z2$ facing the opposite sides of the axial magnetic bearing target 16C. The position of the magnetic rotating body 11 in the Z-direction is controlled according to the balance of the magnetism between the axial electromagnets $13z1$ and $13z2$.

Radial displacement detection sensors 18A and 18B are respectively disposed in the vicinity of the surrounding of the radial displacement detection sensor targets 17A and 17B and detects the displacement of the magnetic rotating body 11, that is the displacement of the rotational shaft 11R. A radial displacement detection sensor 18A is constituted, for example, with two sensors 18Ax and 18Ay (not shown). The sensors 18Ax and 18Ay detect the displacement in the X- and Y-directions respectively at the position of the radial displacement sensing target 17A of the magnetic rotating body 11. The radial displacement detection sensor 18B is constituted, for example, with two sensors 18Bx and 18By (not shown) The sensors 18Bx and 18By detect the displacement in the X- and Y-directions respectively at the position of the radial displacement sensing target 17 B of the magnetic rotating body 11. The axial displacement detection sensor 18C is disposed on the axis of the shaft 11R of the magnetic rotating body 11 in the vicinity of the axial displacement detection target 17C and detects the displacement in the Z-direction at the position of the axial displacement target 17C of the magnetic rotating body 11. A noncontact displacement detection sensor using an electromagnetism technique such as a magnetic self-oscillation type may be used as the displacement detection sensor for the magnetic bearing.

Figure 2:
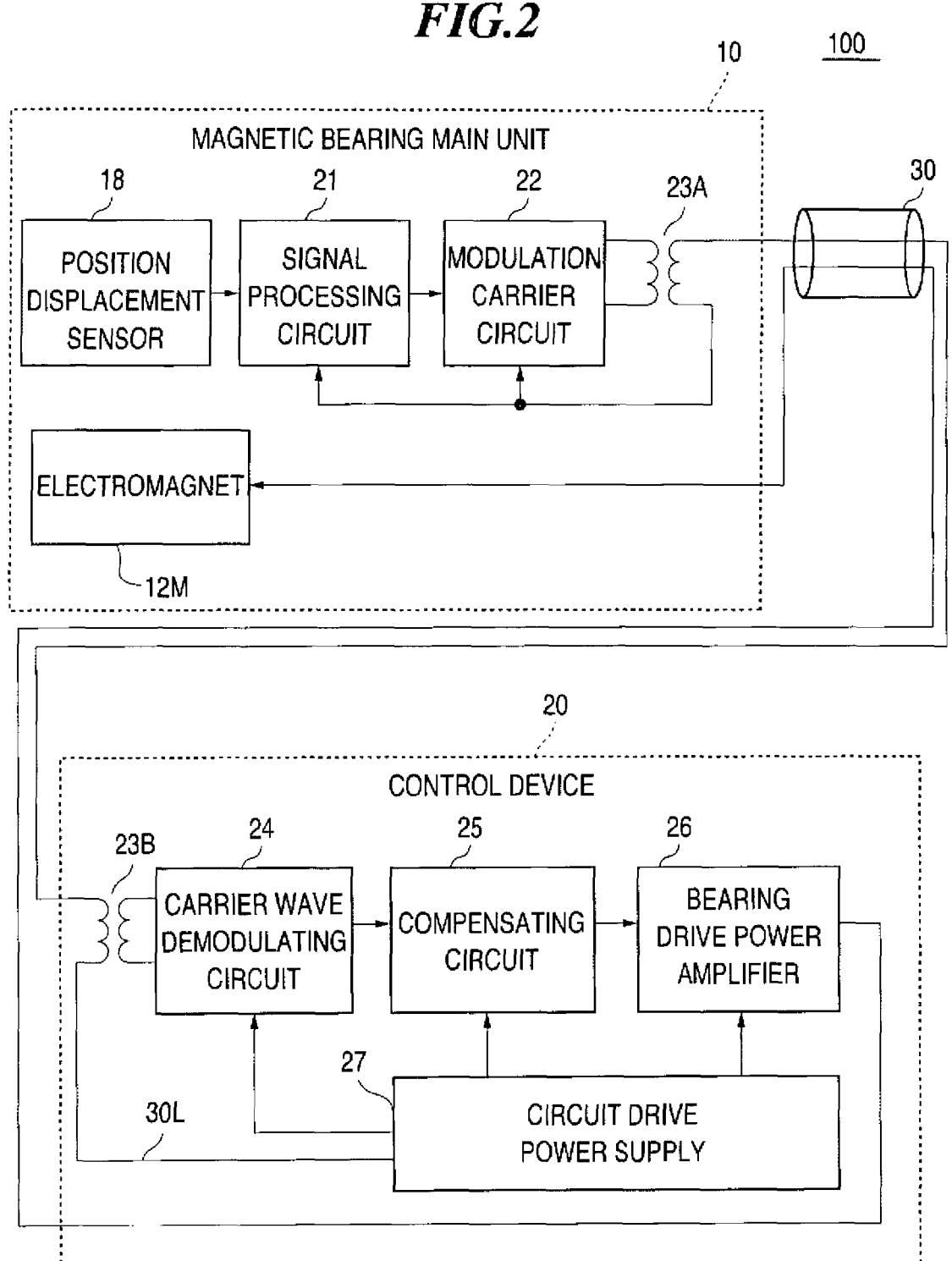
FIG. 2 shows an example of a block diagram of the magnetic bearing device according to first embodiment.

FIG. 2 shows an example of a block diagram of the magnetic bearing device 100 according to first embodiment. As shown in FIG. 2, the magnetic bearing main unit 10 has an electromagnet 12M for magnetic bearing (collectively showing the radial electromagnet 12Ax1 and so forth and the axial electromagnet $13z1$ and so forth) as well as a displacement detection sensor 18 (collectively showing 18A to 18C), a signal processing circuit 21, a modulation carrier circuit 22, and the first alternating-current coupling section 23A. The displacement detection sensor 18 has two radial displacement sensors 18A and 18B and one axial displacement detection sensor 18C. The displacement sensing signals detected by the displacement detection sensor 18 is processed by the signal processing circuit 21.

The signal processing circuit 21 is constituted, for instance, with a preamplifier section, an adding circuit section, an offset output section, and a gain adjustment circuit section and adjusts the signal to a predefined detectivity level. The detected displacement signal is once adjusted by the preamplifier section to the signal level to be easily processed, output from the preamplifier section, and added to an offset adjustment signal output from the offset output section in the adding circuit section. After the offset adjustment of the position detection signal is executed, the signal is adjusted to the signal at the predefined detectivity level by a gain adjustment circuit section as a final output adjustment and output as a signal at the appropriate level to the modulation carrier circuit 22.

The modulation carrier circuit 22 is constituted as a carrier signal wave generation means, for instance, with a signal wave generation circuit, a carrier wave generating circuit, a modulated wave generation circuit, and a modulated wave transmitter circuit. The modulation may be any of the AM modulation, the FM modulation, and the PM modulation. The signal wave generation circuit inputs the output signal of the signal processing circuit 21, and generates the signal wave, for example, of 10 kHz to 450 KHz, with the modulation factor of m1 in the AM modulation, with the modulation index of m2 in the FM modulation, or with the phase of φm in the PM modulation corresponding to the amount of the positional displacement. When the displacement of the magnetic rotating body 11 occurs, it is preferable to periodically detect the amount of the positional displacement, which normally changes a little as time elapses. Accordingly, it is preferable to periodically generate a signal wave. The carrier wave generating circuit generates the carrier wave, for example, of 1 MHz to 30 MHz, which is higher than the frequency of 50 or 60 Hz of the electricity, in order to superpose the signal in the power line. The modulated wave generation circuit modulates the carrier wave with the signal wave generated by the signal wave generation circuit for generating a modulated wave as the carrier signal wave. The modulated wave transmitter circuit transmits the modulated wave to the first alternating-current coupling section 23A. The first alternating-current coupling section 23A alternating-current couples the modulated wave generated in the modulation carrier circuit 22 with the power line. The coupling may be either of the inductive coupling or the electrostatic capacitance coupling. The coupled modulated wave is carried from the magnetic bearing main unit 10 to the control device 20 in the power line 30L accommodated in dedicated cable 30. The power line used for the alternating-current coupling may be any power line in the dedicated cable 30. However, the coupling with the common power line 30L from the circuit drive power supply 27 to electric circuits is better to avoid the influence on the electromagnet or on the sensor and the embodiment applies such constitution.

The control device 20 has the second alternating-current coupling section 23B, a carrier wave demodulating circuit 24, the compensating circuit 25, a bearing drive power amplifier 26, and the circuit drive power supply 27. The second alternating-current coupling section 23B separates the modulated wave carried from the power line 30L. Either of the inductive coupling and the electrostatic capacitance coupling may be used for the separation.

The carrier wave demodulating circuit 24 is constituted as a carrier signal wave detecting means, for instance, with a modulated wave receiver circuit, a modulated wave demodulator circuit, and a demodulated signal processing circuit. The modulated wave receiver circuit processes a noise rejection and a waveform shaping for the modulated wave separated by the second alternating-current coupling section 23B. The modulated wave demodulator circuit extracts the shaped modulated wave with a high pass transmission filter or a bandwidth transmission filter and recovers the amount of the positional displacement. For example, the extracted carrier wave is processed by an envelope processing in the envelope processing circuit to demodulate the signal wave, and the modulation factor m1 is obtained in the peak hold circuit from the demodulated signal wave in a case of the AM modulation. For example, the modulation index m2 is obtained in the frequency discriminator circuit in a case of the FM modulation. The phase difference φm between the carrier wave and the modulated wave is obtained in a case of the PM modulation. After the amount of positional displacement is recovered in each case above, the demodulated signal processing circuit excludes the offset from the recovered amount of positional displacement by the gain/offset adjustment circuit, and adjusts the signal to the predefined detectivity level to be easily processed for the compensating circuit 25.

The bearing drive power amplifier 26 as a magnetic bearing drive current control section supplies a direct current for generating a magnetism, for example, to the two radial magnetic bearings 12A (having four radial electromagnets 12Ax1, 12Ax2, 12Ay1, and 12Ay2) and 12B (having four radial electromagnets 12Bx1, 12Bx2, 12By1, and 12By2) and one axial magnetic bearing 13 (having two axial electromagnets 13z1 and 13z2) as an electromagnet for magnetic bearing for rotatably supporting the magnetic rotating body 11 with magnetically levitating and for adjusting the displacement of the magnetic rotating body 11 by balancing the magnetisms in the electromagnets.

The compensating circuit 25 as a control signal generation means has, for example, a compensating table for storing the corresponding relation between the compensating current as the control signal supplied to each radial electromagnet by the bearing drive power amplifier 26 and the amount of the positional displacement of the magnetic rotating body 11 in the X- and Y-directions and the corresponding relation between the compensating current as the control signal supplied to the axial electromagnet by the bearing drive power amplifier 26 and the amount of the positional displacement of the magnetic rotating body 11 in the Z-direction. The compensating circuit 25 compares the recovered amount of the positional displacement with the compensating table and supplies to the bearing drive power amplifier 26 with the compensating current to each electromagnet corresponding to the amount of the positional displacement. Specifically, the amount of the positional displacement detected by a radial displacement detection sensor 18Ax is converted into the compensating current to the radial electromagnets 12Ax1 and 12Ax2, the amount of the positional displacement detected by a radial displacement detection sensor 18Ay is converted into the compensating current to the radial electromagnets 12Ay1 and 12Ay2, the amount of the positional displacement detected by a radial displacement detection sensor 18Bx is converted into the compensating current to the radial electromagnet 12Bx1 and 12Bx2, the amount of the positional displacement detected by a radial displacement detection sensor 18By is converted into the compensating current to the radial electromagnets 12By1 and 12By2, and they are supplied to each radial electromagnet. In addition, the amount of the positional displacement detected by the axial displacement detection sensor 18C is converted into the compensating current to the axial electromagnets 13z1 and 13z2 and is supplied to each axial electromagnet. The displacement of magnetic rotating body 11 is not determined only by the exciting current of electromagnets forming a couple in each bearing but also affected by the exciting current of another couple of electromagnets and by the exciting current of another bearings. Therefore, the displacement is not simply determined. However, as for a minute displacement in the vicinity of a balanced state, it is possible to assume that the relation between the amount of the positional displacement of the magnetic rotating body 11 and the compensating current supplied to the electromagnet 12M for magnetic bearing is a one-to-one correspondence. Therefore, the compensating table is generated for each balanced state.

The circuit drive power supply 27 as a power supply for supplying an electric power to the magnetic bearing main unit 10 supplies an electric power to the electric circuits 21, 22, 24, 25, and 26, and other necessary parts in the magnetic bearing device 100. The circuit drive power supply 27 or a different system may supply the electric power to the motor 14 and the sensor 18 though not shown in the drawing.

The power line from the control device 20 to the magnetic bearing main unit 10 is accommodated in the dedicated cable 30. Specifically, the power lines includes twenty power lines from the bearing drive power amplifier 26 to the electromagnets 12Ax1, 12Ax2, 12Ay1, 12Ay2, 12Bx1, 12Bx2, 12By1, 12By2, 13z1, and 13z2, power lines to the motor 14 (three-phase alternating current), and the ten power lines to the displacement detection sensors 18Ax, 18Ay, 18Bx, 18By, and 18C, and one common power line from the circuit drive power supply 27 to the signal processing circuit 21 and the modulation carrier circuit 22. It is a characteristic of the embodiment the signal wire from the sensor or any other part is not accommodated in the cable.

The positions of the displacement detection sensor targets 17A, 17B, and 17C (in other words, the positions of the magnetic rotating body 11) are detected by the displacement detection sensors 18Ax, 18Ay, 18Bx, 18By, and 18C as described above, and the detection signals are processed by the compensating circuit 25 and supplied to the bearing drive power-amplifier 26. The electromagnet exciting current obtained by the bearing drive power amplifier 26 is used for controlling the magnetic attractive force or the magnetic repulsion force generated in the facing radial electromagnets 12Ax1, 12Ax2, and so forth and the magnetic attractive force or the magnetic repulsion force generated in the facing axial electromagnets 13z1 and 13z2. The radial displacement detection sensor target 17A fixed to the magnetic rotating body 11 is supported and controlled by the magnetic levitation in a predefined position such as a position between the radial electromagnets 12Ax1 and 12Ax2 without any contact, and the radial displacement detection sensor target 17B fixed to the magnetic rotating body 11 is supported and controlled by the magnetic levitation in a predefined position such as a position between the electromagnets 12Bx1 and 12Bx2 without any contact. In addition, the axial displacement detection sensor target 17C is supported and controlled by the magnetic levitation without any contact in a predefined position such as a position between the axial electromagnet 13z1 and 13z2. Each predefined position described above is, for example, a position at the middle between the electromagnets.

Second Embodiment

Figure 3:
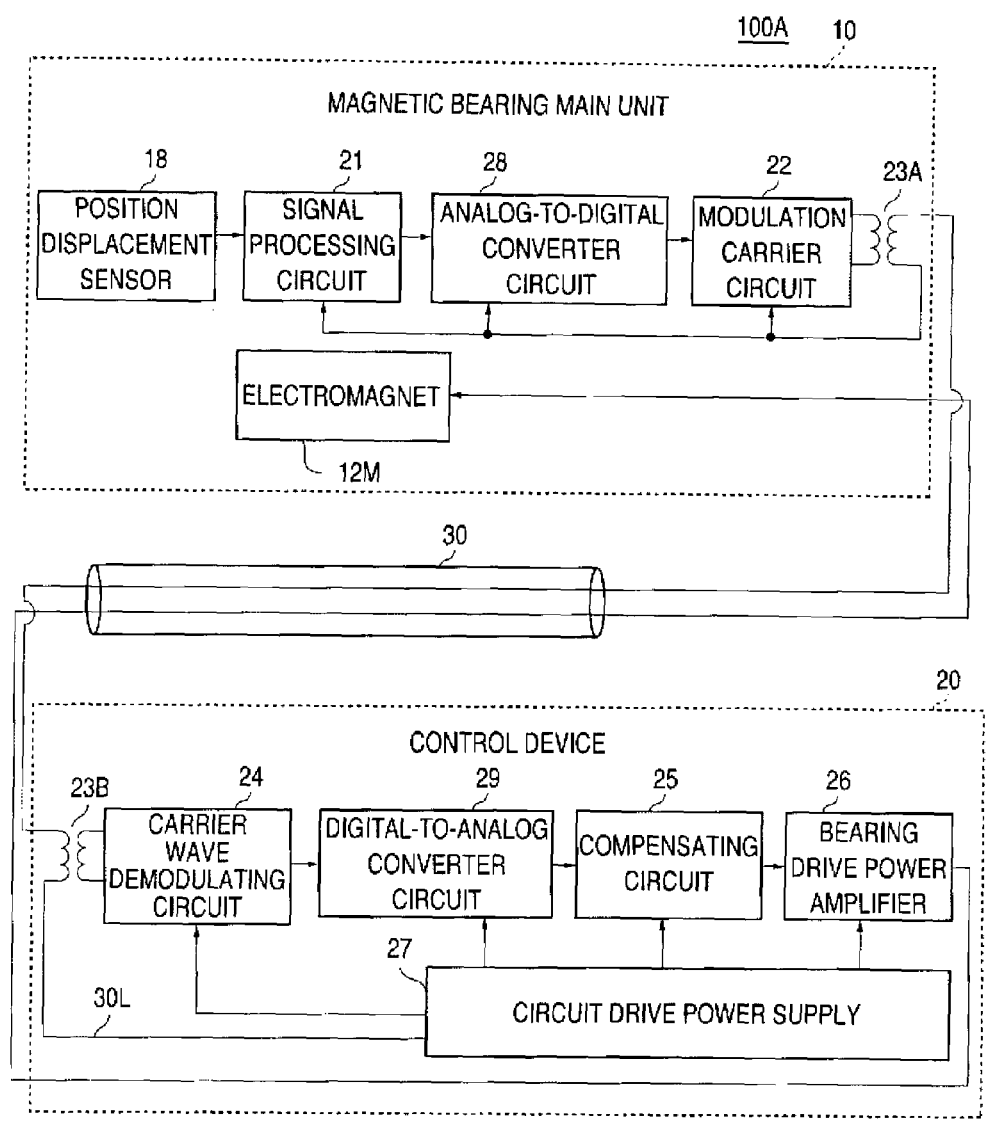
FIG. 3 shows an example of a block diagram of the magnetic bearing device according to second embodiment

FIG. 3 is an example of a block diagram of a magnetic bearing device 100A according to a second embodiment. This is an example in which an analog-to-digital converter circuit 28 and a digital-to-analog converter circuit 29 are added for processing the signal between the magnetic bearing main unit 10 and the control device section 20 in the first embodiment.

The magnetic bearing main unit 10 is provided with the analog-to-digital converter circuit 28 between the signal processing circuit 21 and the modulation carrier circuit 22. The output of the signal processing circuit 21 is converted from the analog signal into the digital signal and output to the modulation carrier circuit 22. The modulation carrier circuit 22 modulates the carrier wave with the digital signal and generates the modulated wave for carrying the digital signal. The modulated wave is coupled with the power line by the first alternating-current coupling section 23A. In the control device 20, the modulated wave separated by the second alternating-current coupling section 23B is demodulated by the carrier wave demodulating circuit 24, and the digital signal is recovered. The digital-to-analog converter circuit 29 is provided between the carrier wave demodulating circuit 24 and the compensating circuit 25. The recovered digital signal is converted into the analog signal by the digital-to-analog converter and output to the compensating circuit 25. An electric power is supplied to the analog-to-digital converter circuit 28 and the digital-to-analog converter circuit 29 via a common power line 30L from the circuit drive power supply 27.

According to the embodiment, as the digital signal is used for carrying, the reliability of the carrying is high. In addition, as the digits for expressing the positional displacement is increased, the processing can be executed with a high accuracy.

Other constitutions are similar to those of the first embodiment and an effect similar to those of the first embodiment is given.

Third Embodiment

Figure 4:
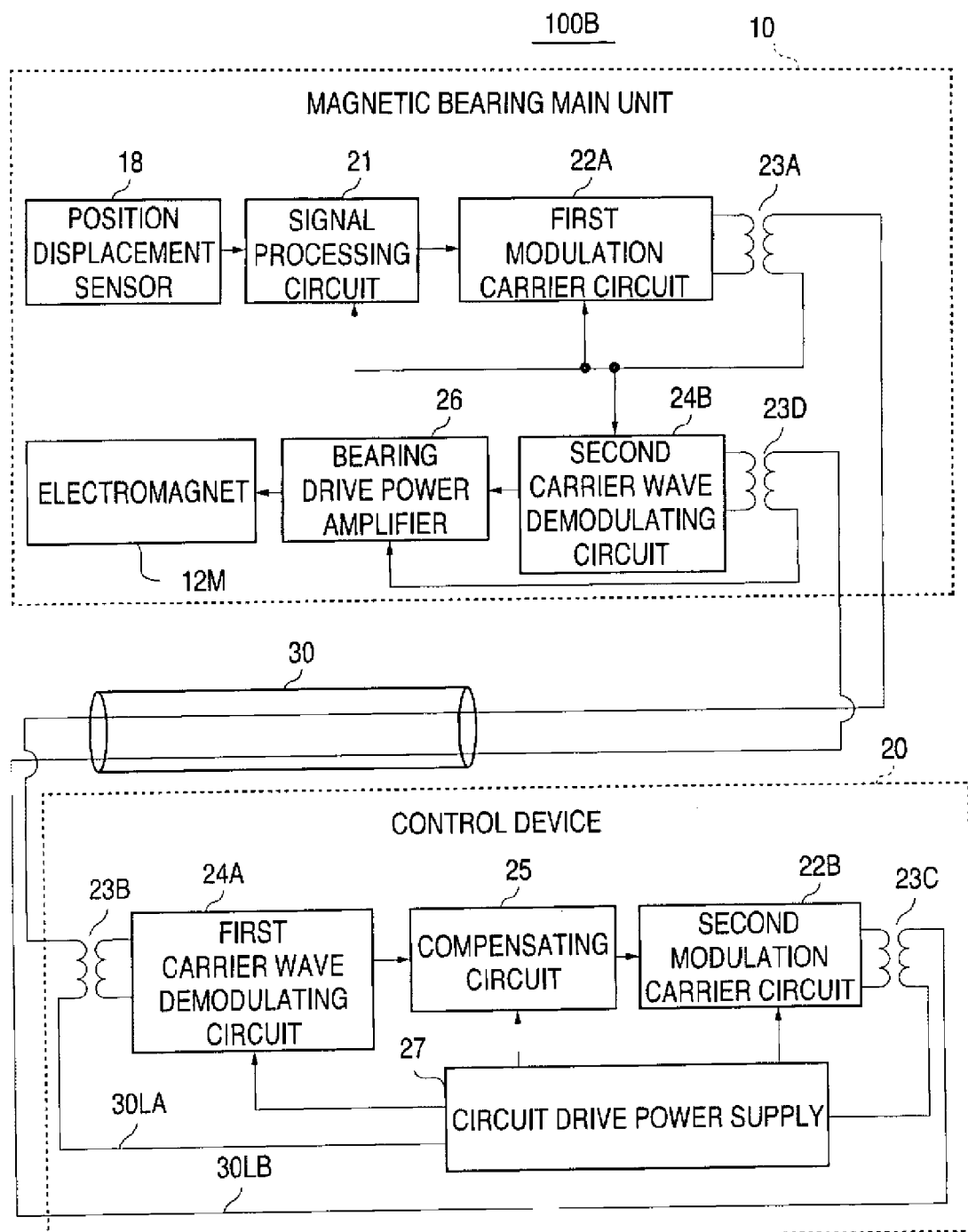
FIG. 4 shows an example of a block diagram of the magnetic bearing device according to third embodiment.

FIG. 4 shows an example of a block diagram of a magnetic bearing device 100B according to a third embodiment. The power line communication using an alternating-current coupling is processed in one direction from the magnetic bearing main unit 10 to the control device 20 in the first embodiment. In the third embodiment, an example in which the power line communication is processed in both directions between the magnetic bearing main unit 10 and the control device 20 will be described. Specifically, the magnetic bearing main unit 10 has a first modulation carrier circuit 22A and the first alternating-current coupling section 23A, the control device 20 has the second alternating-current coupling section 23B and a first carrier wave demodulation circuit 24A, and the power line communication is executed from the magnetic bearing main unit 10 to the control device 20 in a first electricity supply line 30LA. In addition, the control device 20 has a second modulation carrier circuit 22B and a third alternating-current coupling section 23C, the magnetic bearing main unit 10 has a fourth alternating-current coupling section 23D and a second carrier wave demodulation circuit 24B, and the power line communication is executed from the control device 20 to the magnetic bearing main unit 10 in a second electricity supply line 30LB. For instance, the bearing drive power amplifier 26 provided to the control device 20 in the first embodiment is provided in the magnetic bearing main unit 10, supplies the exciting current to the electromagnet 12M for magnetic bearing in the magnetic bearing main unit 10, and controls the position of the magnetic rotating body 11 in the third embodiment. In addition, the electric power from the circuit drive power supply 27 is supplied to the signal processing circuit 21, the first modulation carrier circuit 22A, and a second carrier wave demodulation circuit 24B via the first electricity supply line 30LA and to the bearing drive power amplifier 26 via the second electricity supply line 30LB. In addition, the electric power from the circuit drive power supply 27 is also supplied to the first carrier wave demodulating circuit 24A, the compensating circuit 25, and the second modulation carrier circuit 22B. In addition, the amount of the positional displacement detected by the displacement detection sensor 18 is carried by the power line communication via the signal processing circuit 21, the first modulation carrier circuit 22A, the first alternating-current coupling section 23A, the second alternating-current coupling section 23B, and the first carrier wave demodulating circuit 24A and input to the compensating circuit 25. The output signal from the compensating circuit 25 is carried by the power line communication via the second modulation carrier circuit 22B, the third alternating-current coupling section 23C, the fourth alternating-current coupling section 23D, and the second carrier wave demodulating circuit 24B and supplied to the bearing drive power amplifier 26. The first modulation carrier circuit 22A generates a first modulated wave by modulating a first carrier wave with the detection signal from the displacement detection sensor 18, and the first alternating-current coupling section 23A alternating-current couples the first modulated wave with the first electricity supply line 30LA for transmitting the first modulated wave to the control device 20, the first carrier wave demodulating circuit 24A demodulates the detection signal from the first modulated wave separated by the second alternating-current coupling section 23B, the compensating circuit 25 generates a compensating signal for correcting the displacement of the magnetic rotating body 11 according to the detection signal demodulated by the first carrier wave demodulating circuit 24A, the second modulation carrier circuit 22B generates a second modulated wave by modulating a second carrier wave with the compensating signal from the compensating circuit 25, the third alternating-current coupling section 23C alternating-current couples the second modulated wave with the second electricity supply line 30LB for transmitting the second modulated wave to the magnetic bearing main unit 10, and the second carrier wave demodulating circuit 24B demodulates the compensating signal from the second modulated wave separated by the fourth alternating-current coupling section 23D and for supplying the demodulated signal to the magnetic bearing drive current control section 26.

In this case, the number of the power supply lines from the control device 20 to the bearing drive power amplifier 26 mounted in the magnetic bearing main unit 10 is about two to three. The number of the wiring in the dedicated cable can be decreased very much in comparison with about twenty cables in the case of the driving electric power to the electromagnet 12M mounted in the magnetic bearing main unit 10 from the bearing drive power amplifier 26 mounted in the control device 20.

As for each type of abnormal detection signals other than the displacement detection sensor 18 mounted in the magnetic bearing main unit 10 not shown in the drawing, an abnormal signal can be supplied to the side of the control device by mounting an appropriate signal processing amplifier in the magnetic bearing device and by executing the power line communication via the first and second modulation carrier circuits 22A and 22B, the alternating-current coupling sections 23A to 23D, and the carrier wave demodulating circuits 24A and 24B even when any special wiring is not added to the dedicated cable 30

Fourth Embodiment

Examples in which the amount of the positional displacement detected with the displacement detection sensor is processed by the power line communication with the alternating-current coupling from the magnetic bearing main unit 10 to the control device 20 are described concerning the magnetic bearing device according to the first to third embodiments. In the fourth embodiment, an example in which a model identifying signal of the magnetic bearing main unit 10 is processed by the power line communication from the magnetic bearing main unit 10 to the control device 20 will be described.

According to the embodiment, it is possible to simply provide a method for executing the model identification of the magnetic bearing main unit not by adding the number of cable core wires but by adding a small amount of components.

Figure 5:
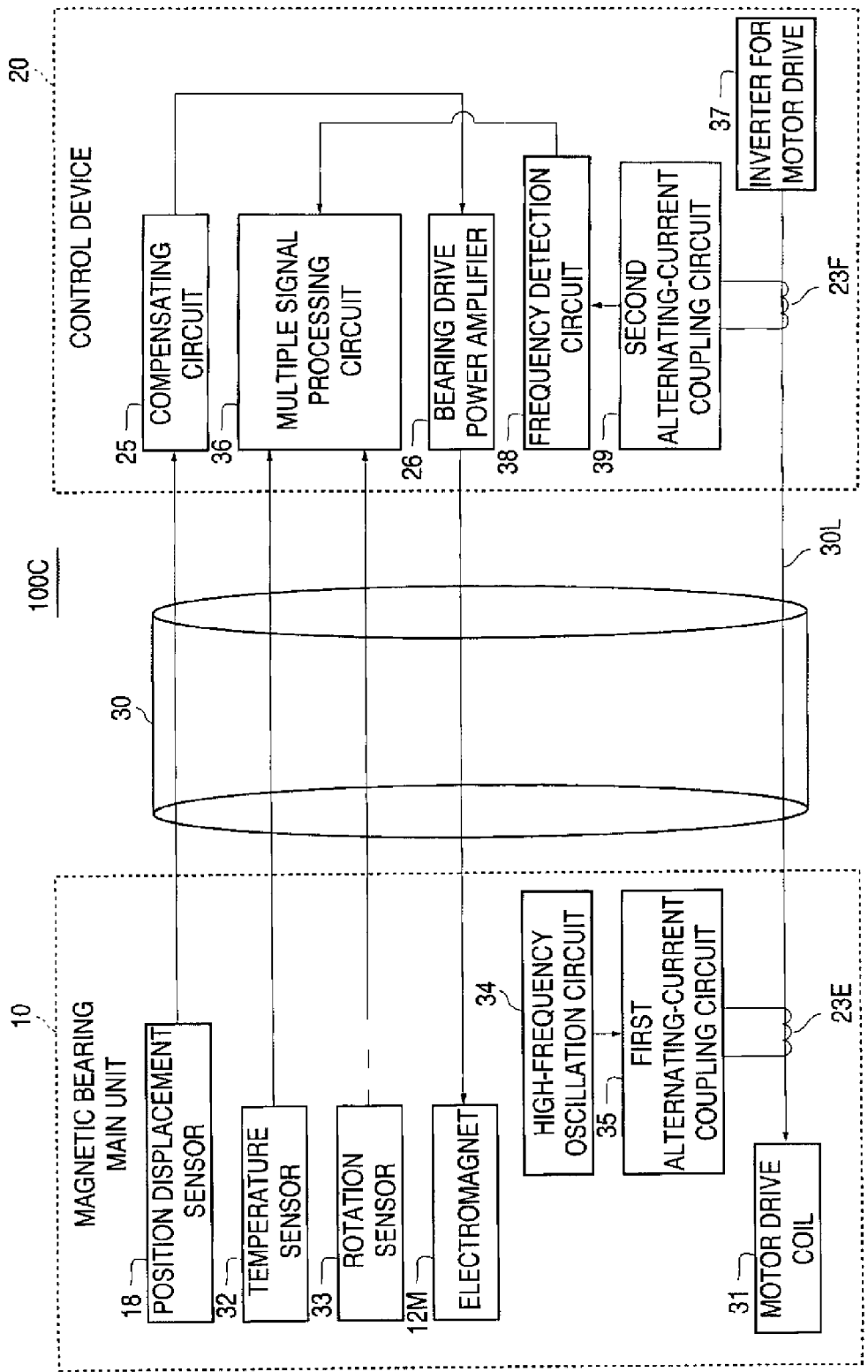
FIG. 5 shows an example of a block diagram of the magnetic bearing device according to fourth embodiment.

FIG. 5 shows an example of a block diagram of a magnetic bearing device 100C according to the fourth embodiment. The constitution of the bearing mechanism of the magnetic bearing main unit 10 according to the fourth embodiment is similar to that in FIG. 1. As shown in FIG. 5, the magnetic bearing main unit 10 has the electromagnet 12M for magnetic bearing, a driving coil 31 for driving the motor 14 (see FIG. 1), the displacement detection sensor 18, a temperature sensor 32, and a rotation sensor 33. In addition, the magnetic bearing main unit 10 has a high-frequency oscillation circuit 34, a first alternating-current coupling circuit 35 (including a first alternating-current coupling section 23E) and alternating-current couples a signal from the high-frequency oscillation circuit 34 with the electricity supply line 30L for transmitting to the motor driving coil 31 for driving the motor 14. In addition, the control device 20 has the bearing drive power amplifier 26 and the compensating circuit 25, a multiple signal processing circuit 36, an inverter 37 for motor drive for supplying an electric power to the motor driving coil 31, a frequency detection circuit 38, and a second alternating-current coupling circuit 39 (including a second alternating-current coupling section 23F). Also, the control device 20 detects the signal of the high-frequency oscillation circuit 34 by the alternating-current coupling from the electricity supply line 30L for supplying an electric power from the inverter 37 for motor drive to the motor driving coil 31 for driving the motor 14.

The functions of the electromagnet 12M for magnetic bearing, the motor 14, and the displacement detection sensor 18 in the magnetic bearing main unit 10 are similar to those of the first embodiment. In addition, the function of the first alternating-current coupling section 23E is similar to the function of the first alternating-current coupling section 23A in the first embodiment. The motor driving coil 31 is the coil for driving the motor 14, supplies the three-phase alternating current to three stators, and rotatably drives the magnetic rotating body 11 including a rotor. The temperature sensor 32 detects the temperature at a predefined position, for example, of the magnetic bearing main unit 10 provided with the heater such as a turbo-molecular pump. The rotation sensor 33 detects the rotational speed of the magnetic rotating body 11. For example, the temperature sensor 32 is provided with a thermal sensing element such as a thermistor on the side of the stator. In addition, the rotation sensor 33 has a mechanism, for example, in a shape of an encoder. A target section of the rotation sensor 33 is on the side of the magnetic rotating body 11 loaded in the magnetic bearing main unit 10. On the side of the stator of the magnetic bearing main unit 10, a target material of the target section is monitored by noncontact monitoring, specifically, the mark such as a groove formed in the target material is detected, and a signal processing is executed with the pulse concerning to the number of rotations. The high-frequency oscillation circuit 34 generates the high frequency signal of 100 kHz to 30 MHz which is higher, for example, than the alternating current frequency of 50 to 60 Hz. The first alternating-current coupling circuit 35 supplies the high frequency signal generated by the high-frequency oscillation circuit 34 to the first alternating-current coupling section 23E for the alternating-current coupling with the electricity supply line 30L, so that the carrying of the high frequency signal is executed in the electricity supply line 30L. As the oscillation frequency of the high-frequency signal is changed according to the model of the magnetic bearing main unit 10, it is able to couple the high frequency signal as it is with the electricity supply line 30L. That is to say, it is able to omit executing the AM modulation, the FM modulation, the PM modulation, or the like. In addition, as the filter circuit for limiting the frequency range of the high-frequency signal in a predefined range for the passage is used, the frequency range of the carrier wave can be selected according to the model of the magnetic bearing main unit. As a result, a multiplicity of models can be identified by one high-frequency oscillation means 34.

The functions of the bearing drive power amplifier 26 and the compensating circuit 25 in the control device 20 are similar to those of the first embodiment. In addition, the function of the second alternating-current coupling section 23F is similar to the function of the second alternating-current coupling section 23B in the first embodiment. The inverter 37 for motor drive supplies an electric power to the motor driving coil 31. The second alternating-current coupling circuit 39 separates the high-frequency signal alternating-current coupled from the electricity supply line 30L by a second alternating-current coupling section 23F and supplies the high frequency signal separated to the frequency detection circuit 38. The frequency detection circuit 38 detects the frequency of the high-frequency signal supplied from the second alternating-current coupling circuit 39. The multiple signal processing circuit 36 converts the rotational speed and the temperature detected by the rotation sensor 33 and the temperature sensor 32 into the signals easily processed by a inverter 37 for motor drive and a temperature control device not shown in the drawing. In addition, the multiple signal processing circuit 36 identifies the model of the magnetic bearing main unit 10 form the frequency detected by the frequency detection circuit 38.

The means of the alternating-current coupling in the first alternating-current coupling section 23E and the second alternating-current coupling section 23F may be an inducement type or may be a capacitive coupling type. However, an inducement type is used in the embodiment.

According to the embodiment, it is possible to simply provide a method for executing the model identification of the magnetic bearing main unit not by adding the number of cable core wires but by adding a small number of components such as the high-frequency oscillation circuit 34, the frequency detection circuit 38, the first and second alternating-current coupling circuits 35 and 39, and the property determination means 36 (the multiple signal processing circuit).

Fifth Embodiment

Figure 6:
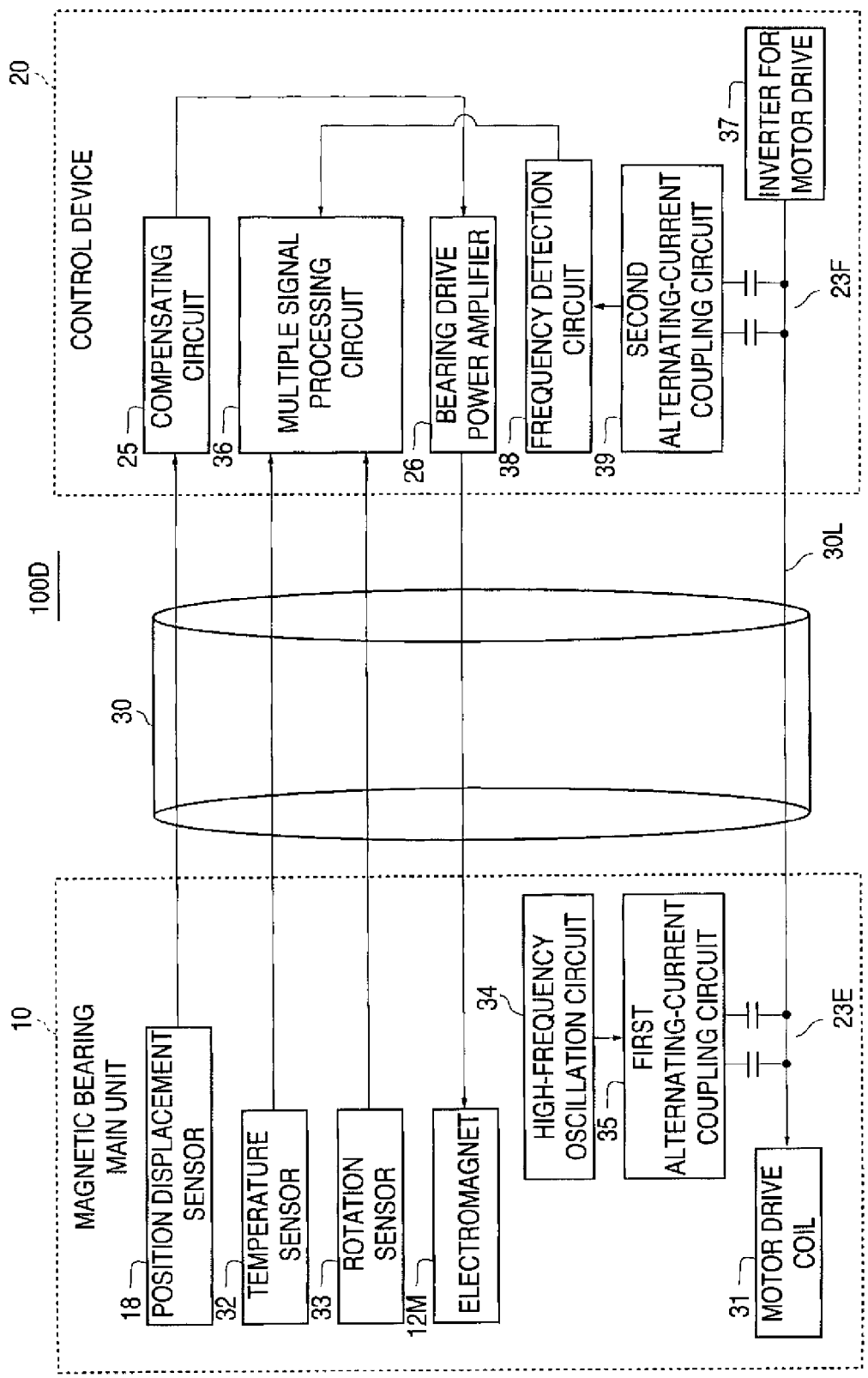
FIG. 6 shows an example of a block diagram of the magnetic bearing device according to fifth embodiment.

FIG. 6 shows an example of a block diagram of a magnetic bearing device 100D according to a fifth embodiment. The example in which the alternating-current coupling is of the inductive coupling type is described in the fourth embodiment. In the fifth embodiment, an example of the electrostatic capacity type will be described. Which of the inductive coupling type and the electrostatic capacity type is advantageous depends on the condition on the side of the connected power line. For instance, because the main power source is supplied to the circuit on the side of the power line in the case of the inductive coupling type, a sufficient current-carrying capacity for the main power source is necessary. On the other hand, the voltage capacity of the usable coupling device is limited by the level of the main power source supplied to the power line in the case of the electrostatic capacity type.

Other constitutions are similar to those of the fourth embodiment and an effect similar to those of the fourth embodiment is given.

Sixth Embodiment

Figure 7:
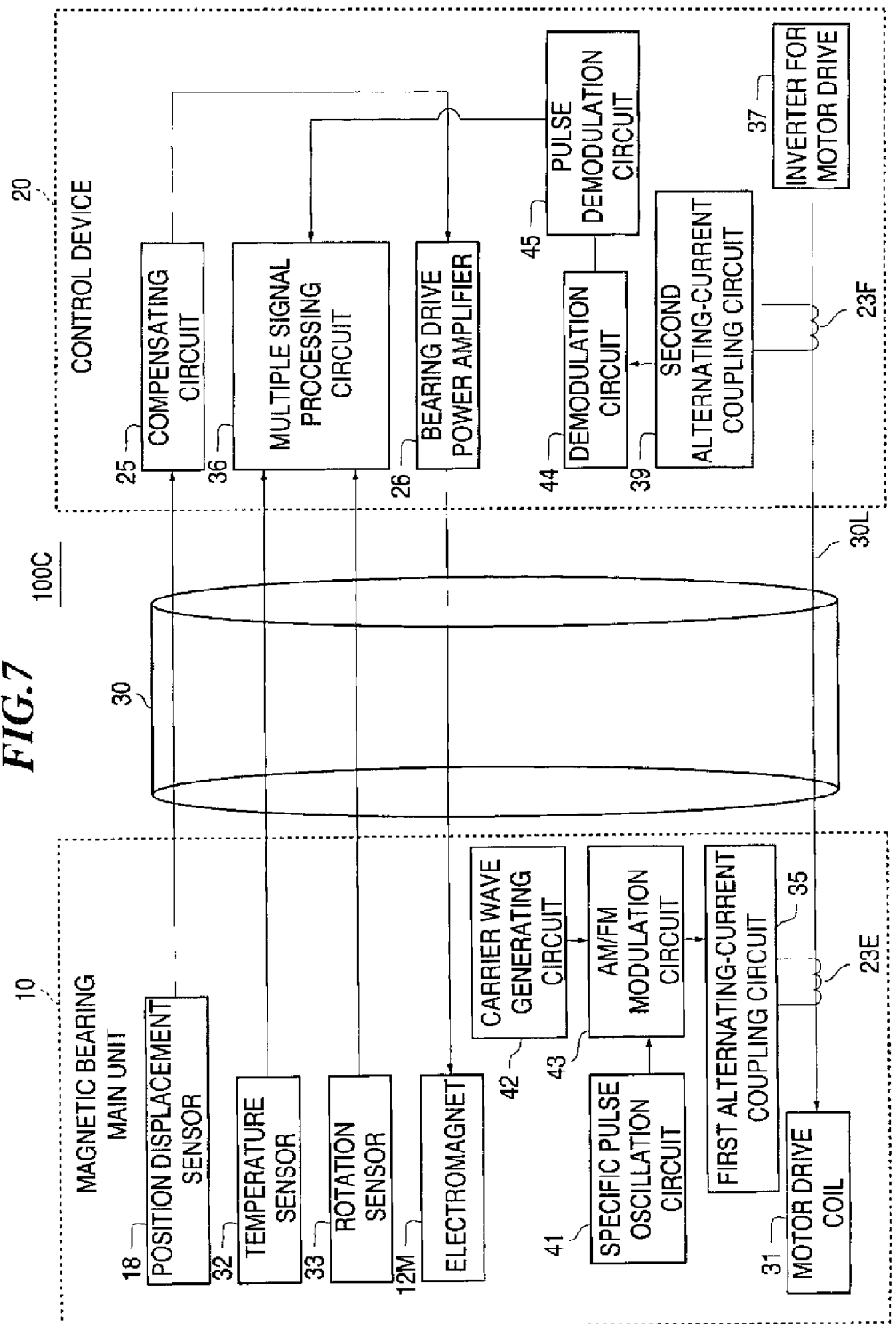
FIG. 7 shows an example of a block diagram of the magnetic bearing device according to sixth embodiment.

FIG. 7 is an example of a block diagram of a magnetic bearing device 100E according to a sixth embodiment. The example in which the high-frequency signal is immediately coupled with the electricity supply line is described in the fourth embodiment. In the sixth embodiment, an example in which a pulse signal is used as the signal wave will be described.

In this embodiment, a specific pulse oscillation circuit 41, a carrier wave generating circuit 42, and an AM/FM modulation circuit 43 are provided in stead of the high-frequency oscillation circuit 34 in the fourth embodiment. In addition, a demodulation circuit 44 and a pulse demodulation circuit 45 are provided in stead of the frequency detection circuit 38 in the fourth embodiment. The specific pulse oscillation circuit 41 as the pulse oscillation circuit oscillates a pulse having a specific period as the signal wave. The carrier wave generating circuit 42 generates the carrier wave and functions in the same manner as the carrier wave generating circuit of the first embodiment. The AM/FM modulation circuit 43 modulates the carrier wave with the signal wave by the AM modulation or the FM modulation, so that the modulated wave is transmitted to the first alternating-current coupling circuit 35. In this case, the modulation enables the identification of the model of the magnetic bearing main unit 10, for example, by changing the modulation factor or the modulation index according to the model. The demodulation circuit 44 separates the carrier wave and the pulse signal from the modulated wave transmitted by the power line communication and finds the modulation factor or the modulation index. The pulse demodulation circuit 45 as the pulse period sensing means finds the pulse period from the pulse signal separated by the demodulation circuit 44. The modulation factor or the modulation index, and the pulse period are transmitted to the multiple signal processing circuit 36, and the model is identified by the multiple signal processing circuit 36. In other words, the multiple signal processing circuit 36 has the function as the property determination means. The embodiment includes the following three types: the model is identified (a) with the pulse signal, (b) with the carrier wave, and (c) with the combination of the two.

Figure 8:
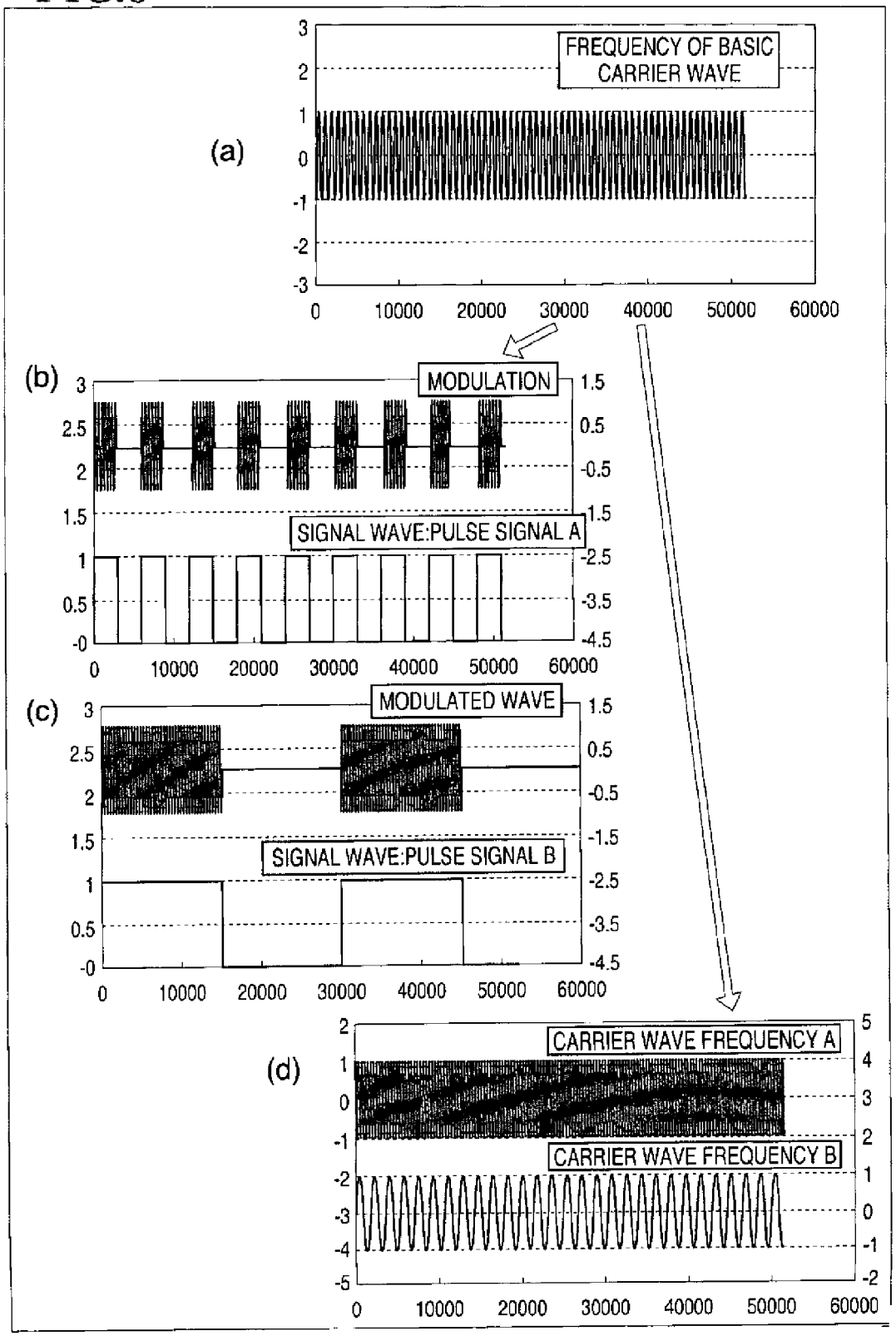
FIG. 8 shows an example of the carrier wave and the pulse signal in the sixth embodiment.

FIG. 8 shows an example of the carrier wave and the pulse signal according to the sixth embodiment. FIG. 8(a) shows a basic carrier wave. The horizontal axis represents time (ns) and the frequency of the basic carrier wave is about five MHz. FIGS. 8(b) and (c) show the same carrier wave and an example in which the period of the pulse signal as the signal wave is changed. The period of a pulse signal A is about 250 kHz in FIG. 8(b), and the period of a pulse signal B is about 33 kHz in FIG. 8(c). The period of the pulse signal is changed as shown, and the period is detected by the pulse demodulation circuit 45, so that the model of the magnetic bearing main unit can be determined. On the other hand, when the carrier wave is modulated with the signal wave by the AM modulation, because the pulse intensity changes, the model of the magnetic bearing main unit can be determined by detecting the pulse intensity in the pulse demodulation circuit 45. FIG. 8(d) is an example in which the frequency of the carrier wave changed. The change of the carrier frequency is executed by the FM modulation. A carrier frequency A is about 5 MHz, and a carrier frequency B is about 500 kHz. As the carrier frequency is changed as shown, the model of the magnetic bearing main unit can be determined by detecting the carrier frequency in the demodulation circuit 44. Furthermore, by modulating the carrier wave of the same oscillation frequency with the pulse signal specific to each model or by changing the frequency of the carrier wave according to each model with an unchanged pulse signal, it is possible to identify a plurality of models by limiting the frequency range corresponding to each model within a narrow range in the signal processing circuit.

Seventh Embodiment

An example in which an adapter unit is provided between the rotating machinery main unit and the control device having the model identification function for identifying the model of the rotating machinery main unit in the rotating mechanism will be described in the seventh embodiment as well as embodiments hereafter. An example in which the rotating mechanism is a turbo-molecular pump, the rotating body is the rotating part of the turbo-molecular pump and the magnetic rotating body connected with the rotating part, and the rotating machinery main unit is a part excluding the rotating part of the turbo-molecular pump and the magnetic bearing main unit will be described in the embodiment. All devices having a bearing mechanism and having a part rotating around a rotational shaft are referred to as a rotating mechanism. Such a rotating mechanism includes, for instance, a turbo-molecular pump, an excimer laser, a manipulator, and so forth, and may have a mechanical bearing mechanism. When provided in a vacuum device, a rotating mechanism with a magnetic bearing device is preferable because a frictionless rotation can be made by using a magnetic bearing.

Figure 9:
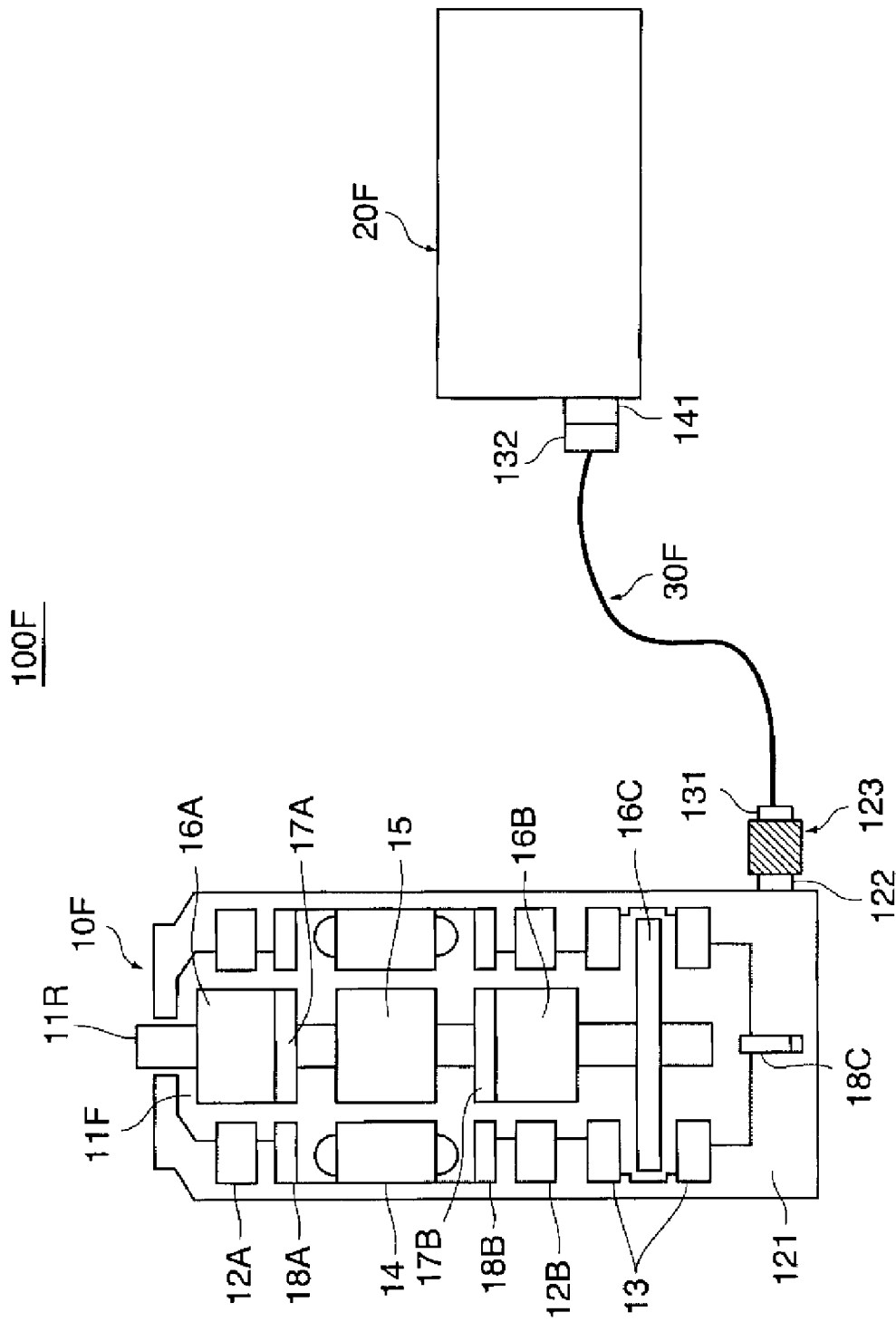
FIG. 9 shows an example of the constitution for connecting the control device with the magnetic bearing main unit of the turbo-molecular pump as the rotating mechanism according to seventh embodiment.

FIG. 9 shows an example of the constitution in which a control device 20F is connected with a magnetic bearing main unit 10F in the rotating mechanism 100F as a turbo-molecular pump. Specifically, FIG. 9 shows the magnetic bearing main unit 10F, the control device 20F, and a part of a dedicated cable 30F excluding the part for functioning as the turbo-molecular pump. In FIG. 9, reference numeral 123 is an adapter unit provided with a model identifying information means 70 (see FIG. 12) for identifying the model of the turbo-molecular pump as the rotating mechanism 100F having the magnetic bearing main unit 10F. The adapter unit 123 is provided between the magnetic bearing main unit 10F and a dedicated cable 30F. Specifically, the adapter unit 123 is provided between the plug 131 provided at one end of the dedicated cable 30F and the plug-in receptacle 122 provided to the casing 121 of the magnetic bearing main unit 10F.

The control device 20F connected with the magnetic bearing main unit 10F via the dedicated cable 30F is the control device of an integrated type for driving a multiplicity of turbo-molecular pumps by the same control device. A control condition optimal for each model of the turbo-molecular pump having the magnetic bearing main unit 10F can be set. The model identification information enabling an identification of a model of the turbo-molecular pump having the magnetic bearing main unit 10F is stored (set) in the model identifying information means 70 (the model identifying information setting circuit in FIG. 12) of the adapter unit 123. Accordingly, the model identification information can be recognized from the control device 20F. The control device 20F recognizes the model identification information on the connected turbo-molecular pump, sets the control condition optimal for controlling the turbo-molecular pump of the model, and controls the magnetic bearing main unit 10F.

The identification information stored in the model identification means of the adapter unit 123 includes the number of patterns sufficient for specifying the turbo-molecular pump. An example will be described below.

If the model identification means of the adapter unit 123 is an identification unit for keeping the output of a digital signal of about four bits and has a function for switching to eight types of digital signals by switching the switch, it is possible to match eight types of turbo-molecular pumps. The control device 20F distinguishes eight types of turbo-molecular pumps according to the digital signal and automatically switches the rotational speed setting and so forth. In this case, "the identification information is a four-bit digital signal."

If the model identification means of the adapter unit 123 is an identification unit for outputting an analog signal of about 4 to 20 mA, an infinite number of levels of switch signals can be generated by switching the switch. When the turbo-molecular pump model is specified in relation to a predefined current value, and the identification of the turbo-molecular pump corresponding to the current signal is executed in the control device 20F, the rotational speed setting and so forth are automatically switched. In this case, "the identification information is an electric current signal of 4 to 20 mA."

A CPU and a memory are mounted in the adapter unit 123, the model setting data necessary for the control device 20F is transmitted from the adapter unit 123 to the control device 20F, and a communication method such as RS485 or RS232 is available as a method for transmitting data. In this case, the identification information is not a signal but a set value of the control device 20F.

The control device 20F may have the setting switching information according to the identifying signal in a case, or the setting information itself may be transmitted from the adapter unit 123 in a case. It is only necessary that the "identifying signal" different for each type of the turbo-molecular pump is output from the adapter unit 123.

Figure 10:
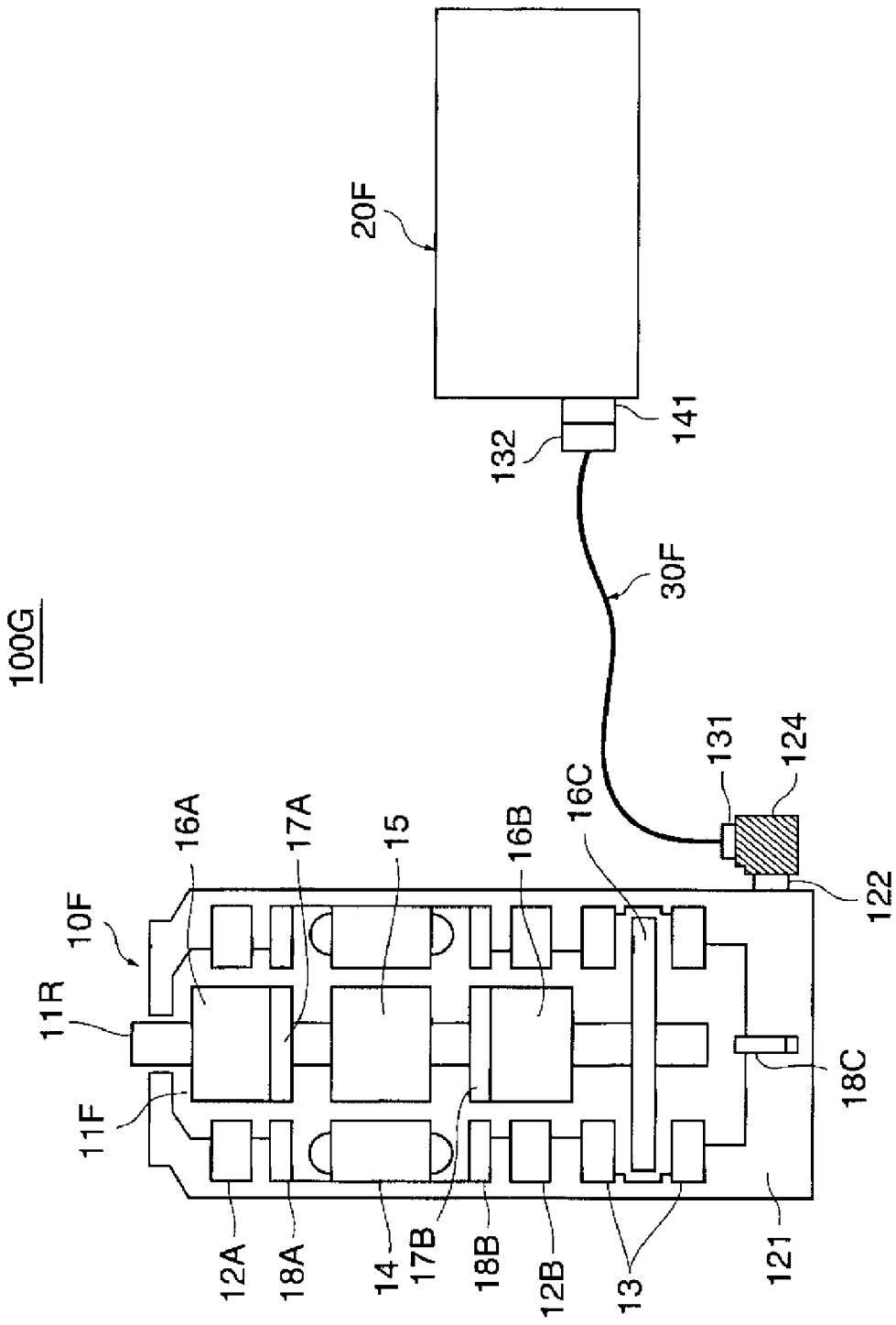
FIG. 10 shows another example of the constitution for connecting the control device with the magnetic bearing main unit of the turbo-molecular pump as the rotating mechanism according to the seventh embodiment.

FIG. 10 shows an example of a rotating mechanism 100G for using another adapter unit 124. Namely, another example of the constitution in which the control device 20F is connected with the magnetic bearing main unit 10F of the turbo-molecular pump is shown. The adapter unit 124 in a shape different from that of the adapter unit 123 is provided between the magnetic bearing main unit 10F and the dedicated cables 30F. Specifically, the adapter unit 124 in which the direction of insertion of the plug 131 is differ from the adapter unit 123 is provided between the plug 131 provided at one end of the dedicated cable 30F and the plug-in receptacle 122 provided to the casing 121 of the magnetic bearing main unit 10F.

Figure 11:
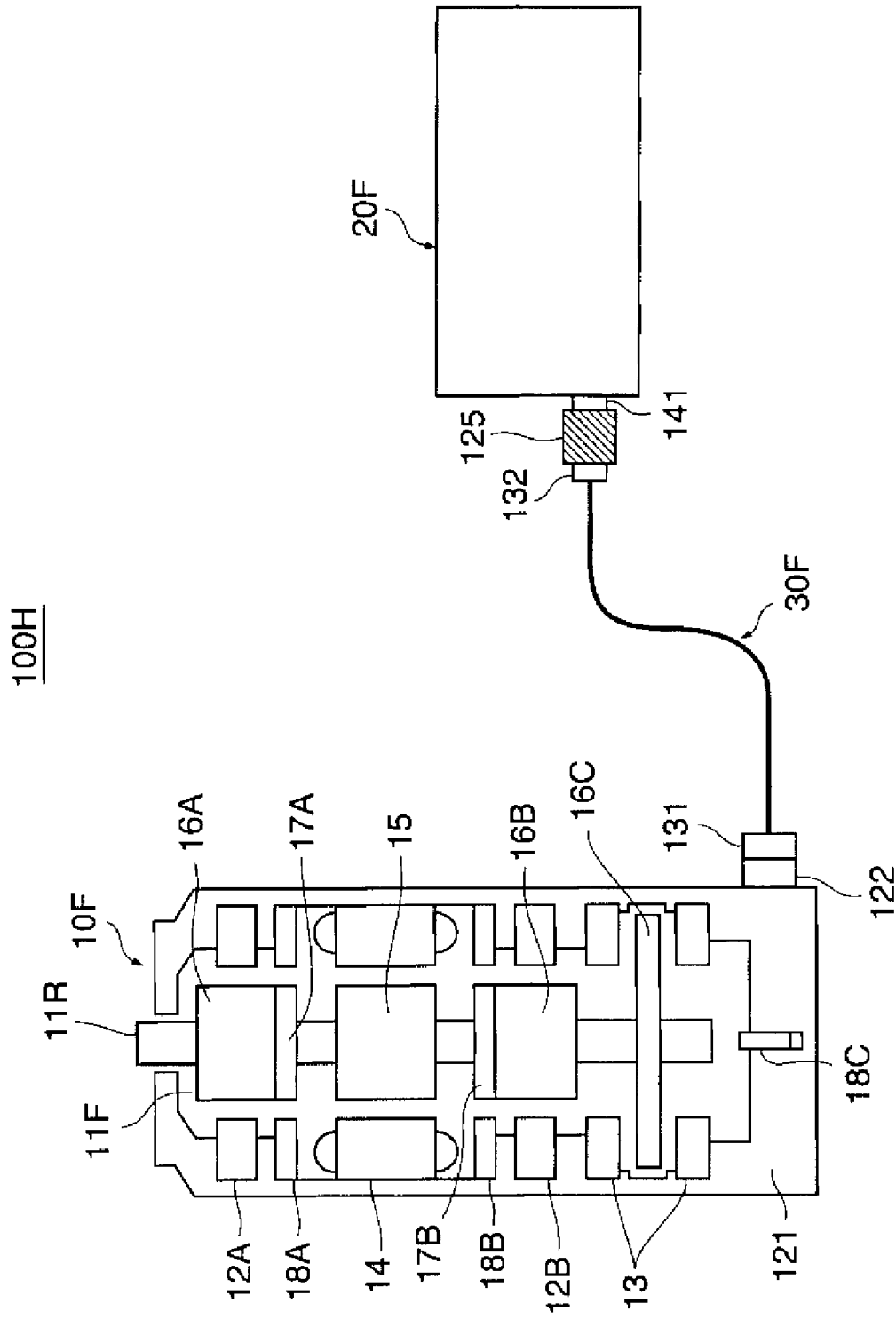
FIG. 11 shows another example of the constitution for connecting the control device with the magnetic bearing main unit of the turbo-molecular pump as the rotating mechanism according to seventh embodiment.

FIG. 11 further shows an example of a rotating mechanism 100H using another adapter unit 125. Namely, another example of the constitution in which the control device 20F is connected with the magnetic bearing main unit 10F of the turbo-molecular pump is shown. As shown in FIG. 11, the adapter unit 125 may be provided between the control device 20F and the dedicated cable 30F. Specifically, the adapter unit 125 may be provided between the plug 132 provided at the other end of the dedicated cable 30F and the plug-in receptacle 141 provided to the casing of the control device 20F.

Figure 12:
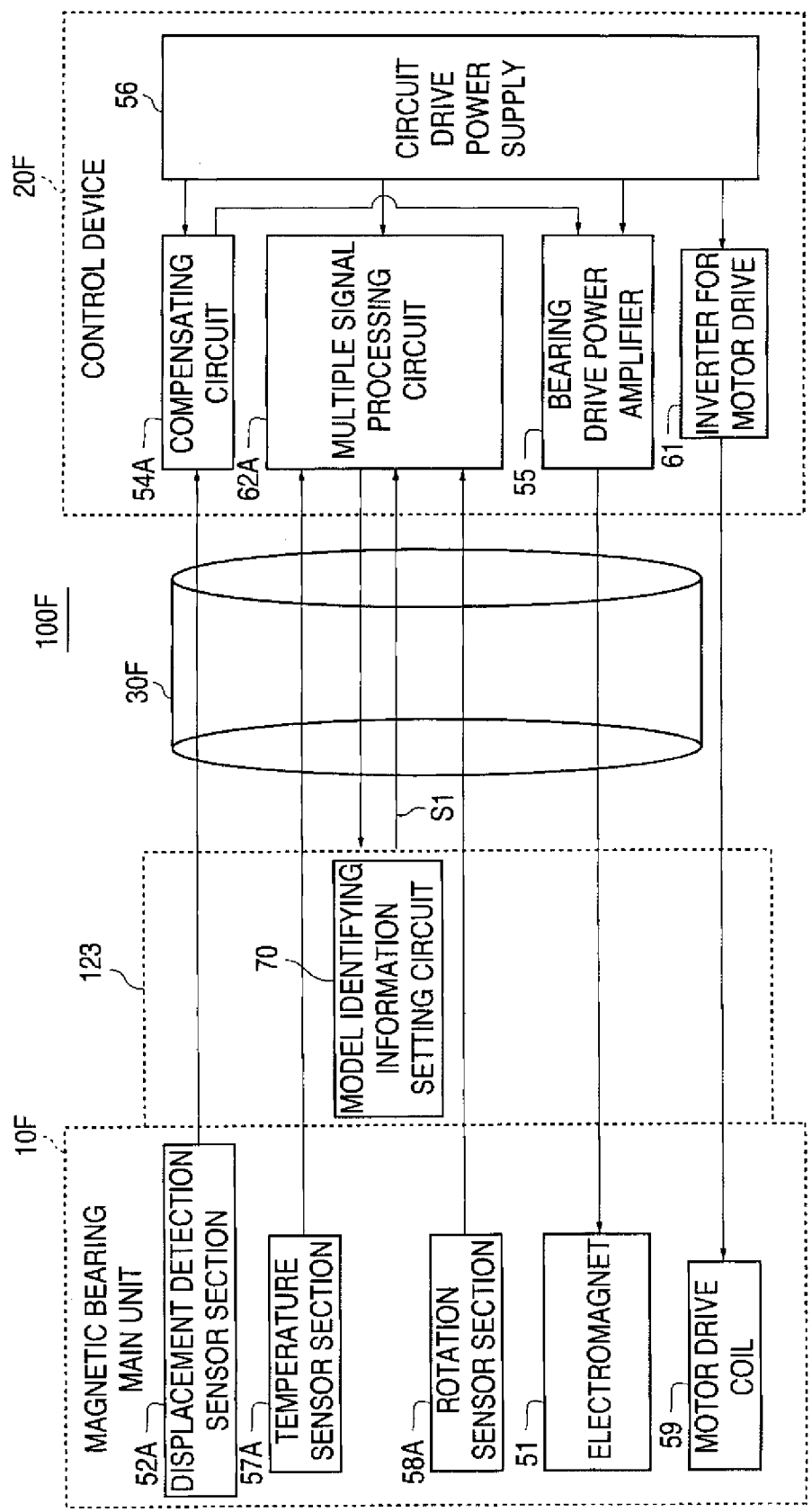
FIG. 12 is a block diagram showing an example of the circuit constitution of the rotating mechanism according to the seventh embodiment.

FIG. 12 is a block diagram showing the circuit constitution of the rotating mechanism 100F in FIG. 9. A model identifying information setting circuit 70 as the model identifying information means is provided to the adapter unit 123 as shown in the drawing. Model identification information S1 set in the model identifying information setting circuit 70 is transmitted to the multiple signal processing circuit 62A of the control device 20F via the wiring in the dedicated cable 30F. As a result, the control device 20F surely recognizes the model identification information S1 set in the model identifying information setting circuit 70, and can recognize the model of the turbo-molecular pump having the magnetic bearing main unit 101F connected to the control device 20F. On the other hand, the control device 20F has the data for setting the control condition optimal for each model of the turbo-molecular pump and also has a control condition setting means 62A (the multiple signal processing circuit in the drawing) for setting the optimum control condition according to the model of the connected turbo-molecular pump on the basis of the data. As described above, after the model of the connected turbo-molecular pump is recognized by recognizing the model identification information S1, the control condition is optimally set. As a result, the turbo-molecular pump can be driven with the optimum control condition, and it is possible to make the best use of the function of the turbo-molecular pump.

Figure 13B:
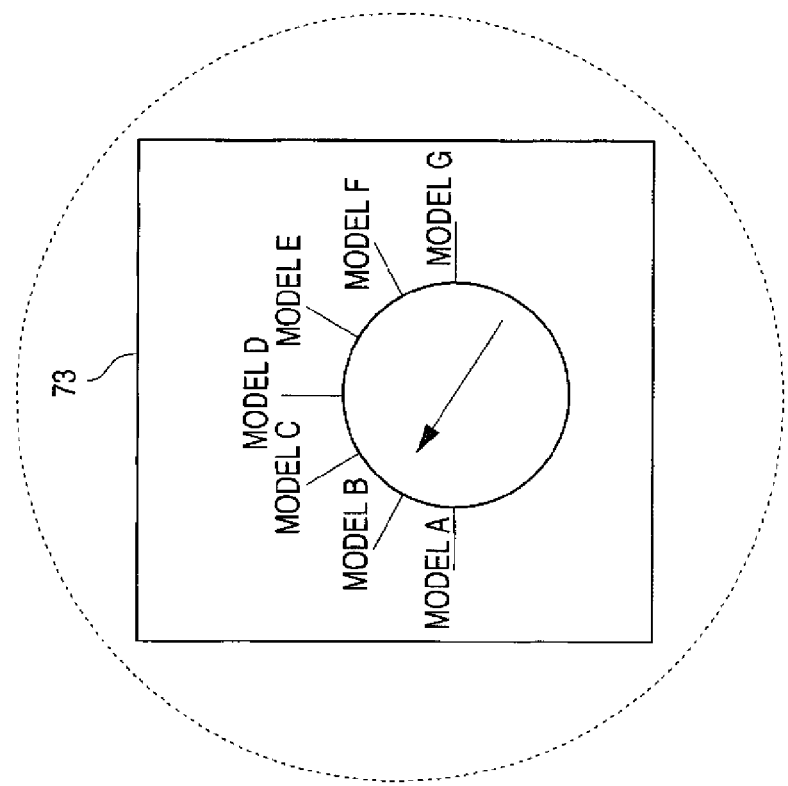
FIG. 13B shows the details of the switching element in the adapter unit in FIG. 13A.
Figure 13A:
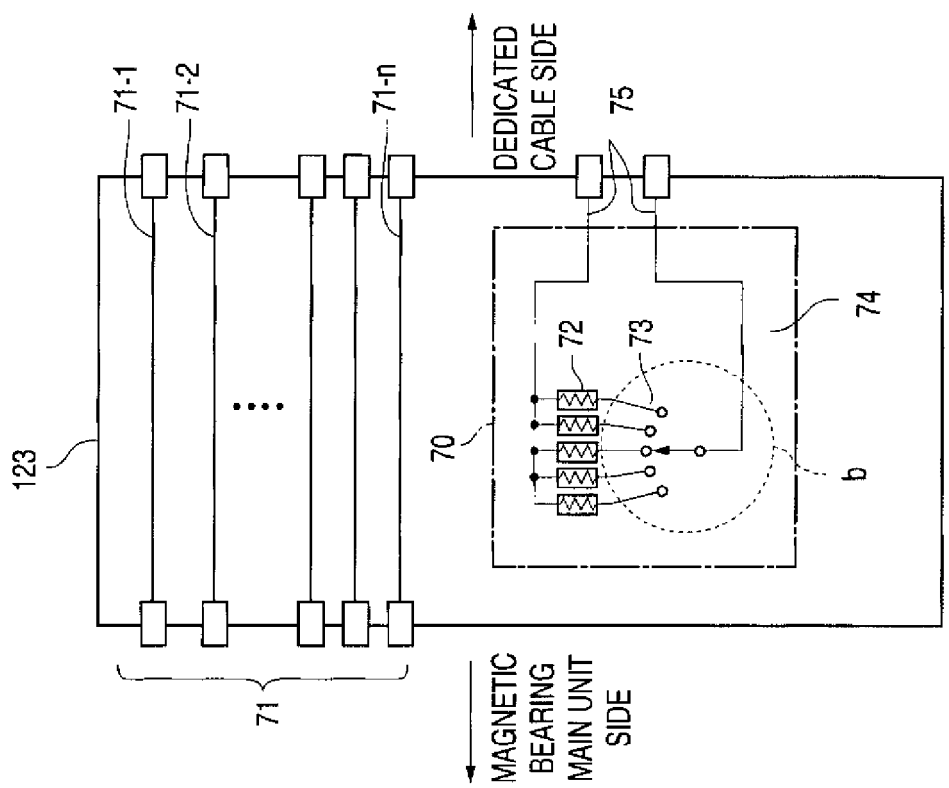
FIG. 13A shows an example of the internal constitution of the adapter unit of the rotating mechanism according to the seventh embodiment.

FIG. 13A shows an example of the internal constitution of an adapter unit 123 of the rotating mechanism in the seventh embodiment, and FIG. 13B shows the details of the switching element in the adapter unit 123 in FIG. 13A. The model identifying information setting circuit 70 and a relay wiring 71 are provided as shown in FIG. 13A in the adapter unit 123. The relay wiring 71 (71-1 to 71-$n$) is constituted with a plurality of wirings 71-1 to 71-$m$ (1<m<n) for relaying signals used for transmitting between the magnetic bearing main unit 10F and the control device 20F and a plurality of wirings 71-$m$+1 to 71-$n$ for relaying the electric power used for supplying an electric power to the magnetic bearing main unit 10F from the control device 20F. The wirings 71-1 to 71-$n$ are connected with the dedicated cable 30F on the side of the control device 20F. On the other hand, the model identifying information setting circuit 70 is provided with a passive component switching circuit 74 constituted with a passive electronic component 72 such as a resistor or an electrostatic capacity element and a switching element 73 (a selector switch). The switching element 73 can switch models A, B, C, D, E, F, and G as shown in FIG. 13B. By selecting a model, the passive electronic component 72 representing the corresponding model identification information to the selected model can be selected.

The passive component switching circuit 74 is connected with the dedicated cable 30F via a connective wiring 75, and the model identification information represented by the passive electronic component 72 selected can be read from the control device 20F. As a result, the model identification information on the turbo-molecular pump provided with the magnetic bearing main unit 11F can be set easily and accurately by the passive component switching circuit 74 of a simple constitution. The control device 20F reads the model identification information set, recognizes the model, and can set the control condition optimal for the model in the multiple signal processing circuit 62A (see FIG. 12).

Eighth Embodiment

Figure 14A:
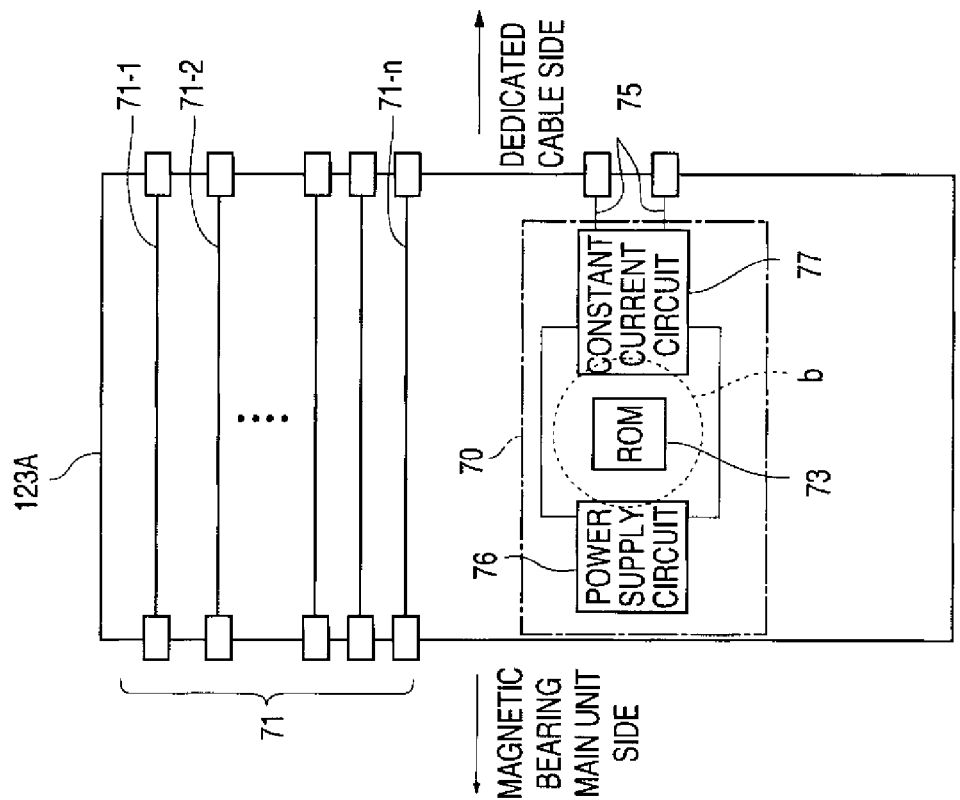
FIG. 14A shows an example of the internal constitution of the adapter unit of the rotating mechanism according to the eighth embodiment.
Figure 14B:
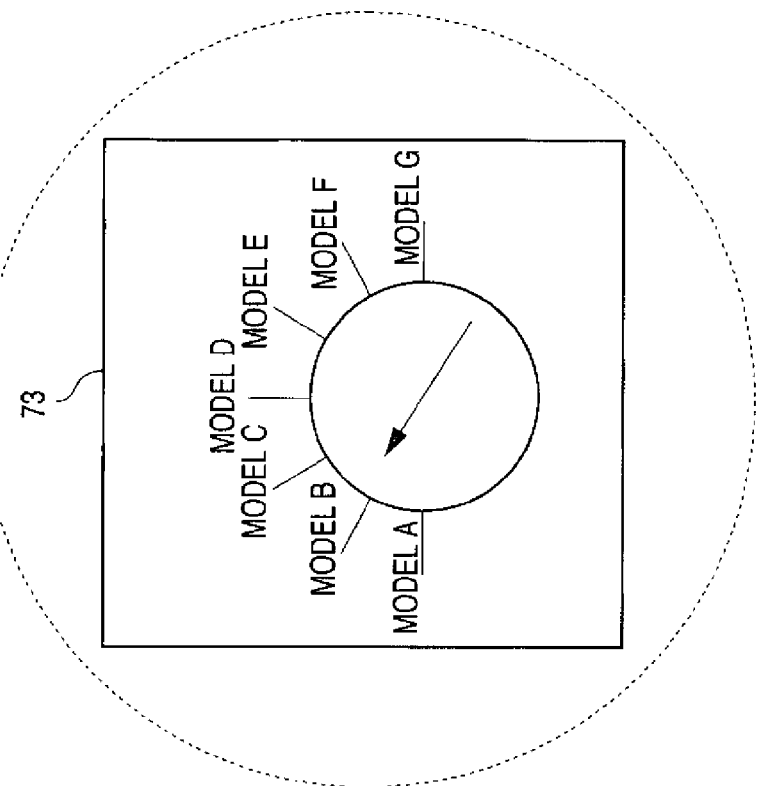
FIG. 14B shows the details of the switching element in the adapter unit in FIG. 14A.

FIG. 14A shows an example of the internal constitution of an adapter unit 123A of the rotating mechanism in the eighth embodiment, and FIG. 14B shows the details of the switching element in the adapter unit 123A in FIG. 14A. The model identifying information setting circuit 70 and a multiplicity of the relay wirings 71 are provided as shown in FIG. 14A in the adapter unit 123A. The model identifying information setting circuit 70 is constituted with the switching element 73 (the selector switch), a power supply circuit 76, and a constant current circuit 77. The switching element 73 switches the models A, B, C, D, E, F, and G as shown in FIG. 14B. By selecting a model, the constant current of the constant current circuit 77 can be set at the level (the current value) for representing the model identification information corresponding to the selected model.

The constant current circuit 77 is connected with the dedicated cable 30F via the connective wiring 75, and the constant current set in the constant current circuit 77 can be read by the control device 20F. As a result, the model identification information on the turbo-molecular pump provided with the magnetic bearing main unit 11F can be set easily and accurately by the constant current circuit 77 and the switching element 73 of a simple constitution. The control device 20F reads the model identification information set, recognizes the model, and can set the control condition optimal for the model by the multiple signal processing circuit 62A. Other constitutions are the same as those of the seventh embodiment, and the same effect is provided.

Ninth Embodiment

Figure 15A:
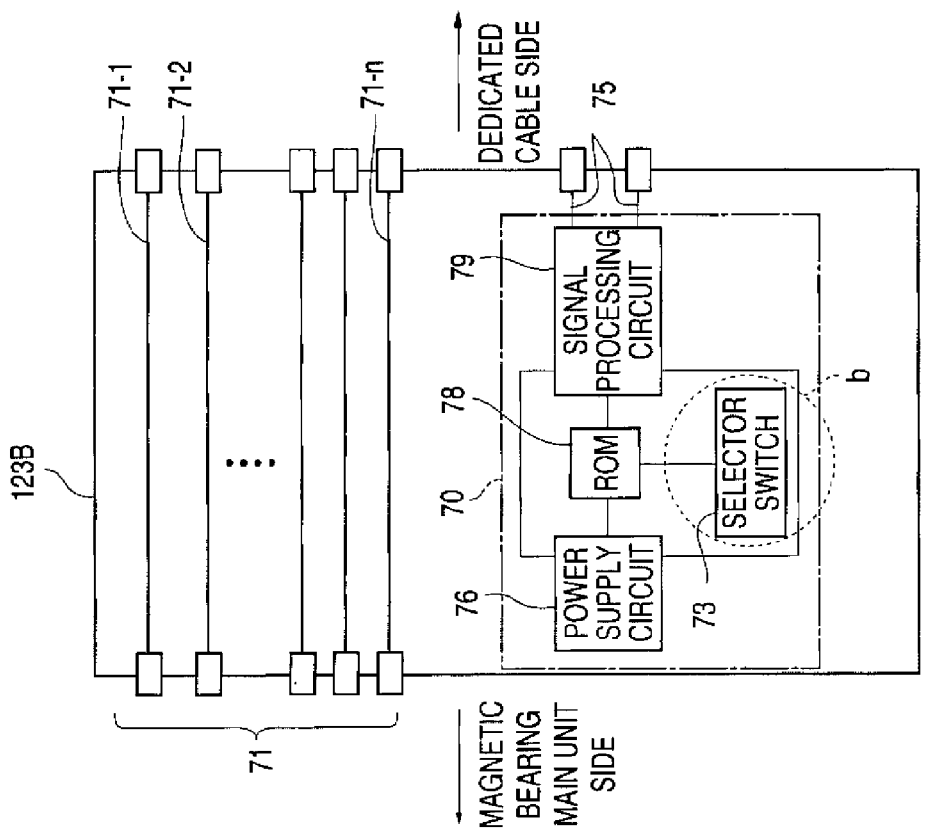
FIG. 15A shows an example of the internal constitution of the adapter unit of the rotating mechanism according to the ninth embodiment.
Figure 15B:
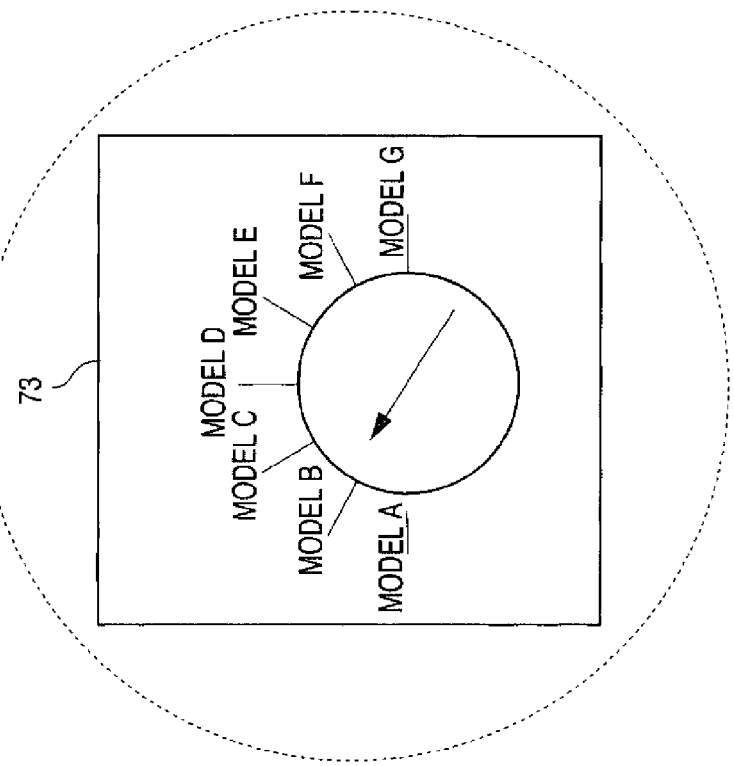
FIG. 15B shows the details of the switching element in the adapter unit in FIG. 15A.

FIG. 15A shows an example of the internal constitution of an adapter unit 123B of the rotating mechanism in a ninth embodiment, and FIG. 15B shows the details of the switching element in the adapter unit 123B in FIG. 15A. The model identifying information setting circuit 70 and a multiplicity of the relay wirings 71 are provided as shown in FIG. 15A in the adapter unit 123B. The model identifying information setting circuit 70 is constituted with the switching element 73 (the selector switch), the power supply circuit 76, a data storage cell 78 (ROM), and a signal processing circuit 79. The switching element 73 can switch the models A, B, C, D, E, F, and G as shown in FIG. 15B. A plurality of data (model data) concerning the model of the turbo-molecular pump having the magnetic bearing main unit 10F is stored in the data storage cell 78. The model data corresponding to the model can be selected by selecting the model with the switching element 73. The signal processing circuit 79 is a circuit (a communication circuit) for processing the selected model data into the signal appropriate for transmitting to the control device 20F.

The signal processing circuit 79 is connected with the dedicated cable 30F via the connective wiring 75, and it transmits the selected model data to the control device 20F. As a result, the model data is selected corresponding to the model of the turbo-molecular pump having the magnetic bearing main unit 10F with the model identifying information setting circuit 70 of a simple constitution including the data storage cell 78 (ROM) storing the model data, the switching element 73, and the signal processing circuit 79. In addition, the model identification information can be set easily and accurately. The control device 20F receives the model identification information and can set the control condition optimal for the model in the multiple signal processing circuit 62A. Other constitutions are the same as those of the seventh embodiment, and the same effect is provided.

Tenth Embodiment

Figure 16:
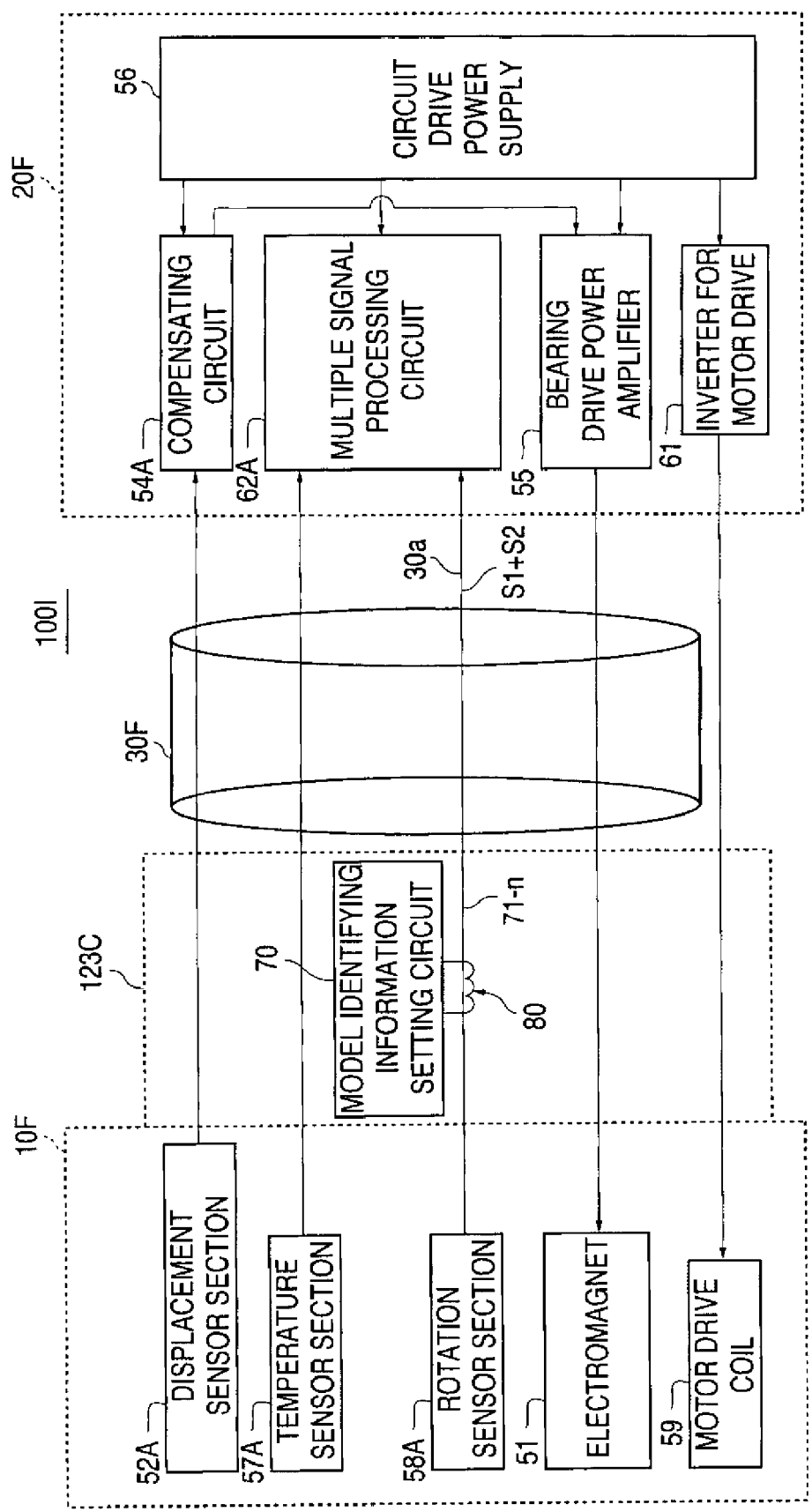
FIG. 16 is a block diagram showing an example of the circuit constitution of the rotating mechanism according to the tenth embodiment.

FIG. 16 is a block diagram showing an example of the circuit constitution different from the seventh embodiment (FIG. 12) of a rotating mechanism 100I. The model identifying information setting circuit 70 as the model identifying information means is provided to an adapter unit 123C as shown in the drawing. The model identification information S1 set in the model identifying information setting circuit 70 is connected with the wiring 71-$n$ relaying a signal S2 from the rotation sensor section 58A in the relay wiring 71 to one wiring 30$a$ (a core fiber) in the dedicated cable 30 via an alternating-current coupling section 80. As a result, the signal S2 and the model identification information S1 from the rotation sensor section 58A are superposed in the wiring 30$a$ of the dedicated cable 30F and transmitted to the multiple signal processing circuit 62A of the control device 20F. The signal processing circuit 62A separates the model identification information S1 to recognize the model and optimally sets the control condition for the recognized model.

Figure 17A:
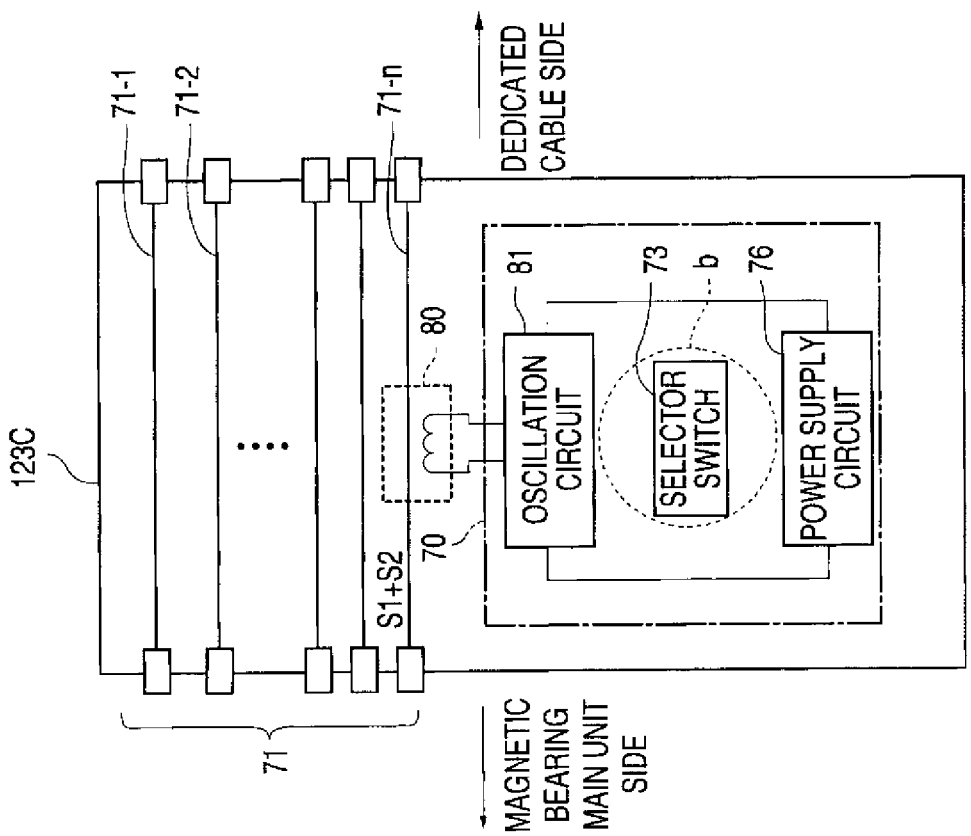
FIG. 17A shows an example of the internal constitution of the adapter unit of the rotating mechanism according to the tenth embodiment.
Figure 17B:
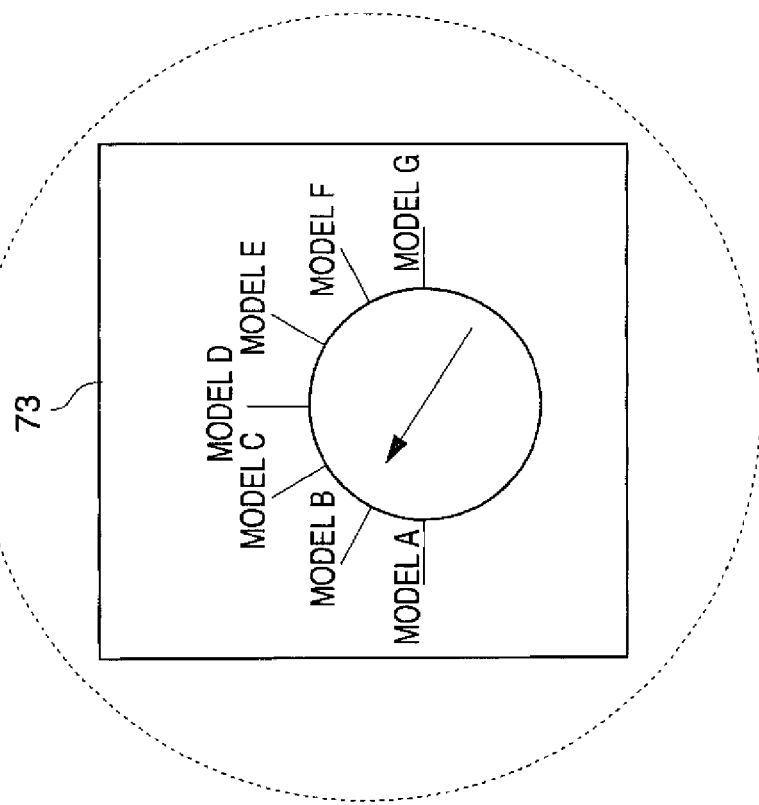
FIG. 17B shows the details of the switching element in the adapter unit in FIG. 17A.

FIG. 17A shows an example of the internal constitution of the adapter unit 123C of the rotating mechanism 100I in the tenth embodiment, and FIG. 17B shows the details of the switching element in the adapter unit 123C in FIG. 17A. The model identifying information setting circuit 70 and the alternating-current coupling section 80 are provided as shown in FIG. 17A in the adapter unit 123C. The model identifying information setting circuit 70 has the power supply circuit 76, the switching element 73 (the selector switch), and an oscillation circuit 81. The oscillation circuit 81 generates the model identification information S1 of the frequency-corresponding to the model set by the switching element 73. The alternating-current coupling section 80 couples the model identification information S1 of the frequency with one wiring 71-$n$ in the relay wiring 71 by alternating-current coupling. The switching element 73 can switch the models A, B, C, D, E, F, and G as shown in FIG. 17B. By selecting a model, the oscillation circuit 81 generates the model identification information of the frequency corresponding to the selected model.

The oscillation circuit 81 generates the high frequency signal of 100 kHz to 30 MHz higher than the commercial frequencies (of 50 or 60 Hz), uses a multiplicity of filter circuits for limiting the frequency range of the high-frequency signal in a predefined pass band, and by selecting a model with the switching element 73, the oscillation circuit 81 selects the filter circuits. As a result, the model identification signal S1 in the frequency range corresponding to the model of the turbo-molecular pump having the magnetic bearing main unit 10F is generated. By receiving the model identification number S1, the multiple signal processing circuit 62A of the control device 20F recognizes the model of the turbo-molecular pump having the magnetic bearing main unit 11F connected to the control device from the frequency range of the model identification number S1 and can set the control condition optimal for the model. Other constitutions are the same as those of the seventh embodiment, and the same effect is provided.

Eleventh Embodiment

Figure 18B:
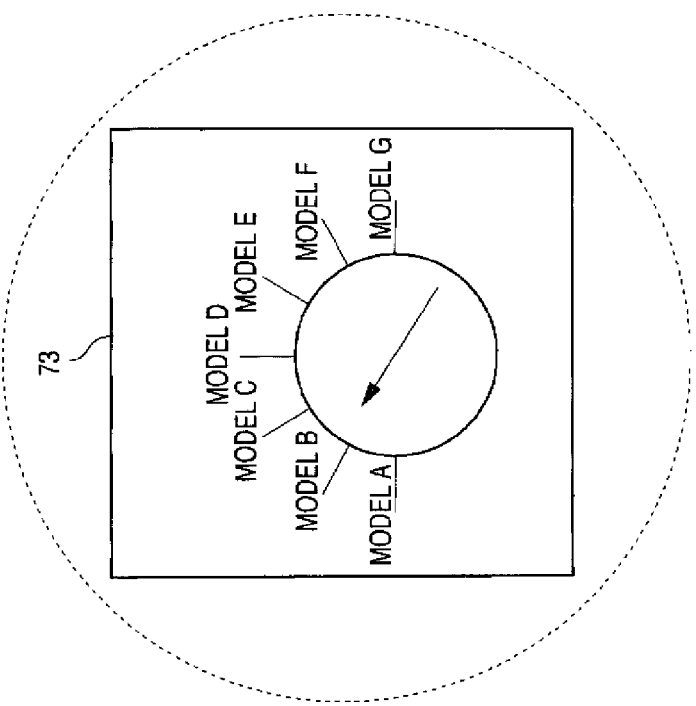
FIG. 18B shows the details of the switching element in the adapter unit in FIG. 18A.
Figure 18A:
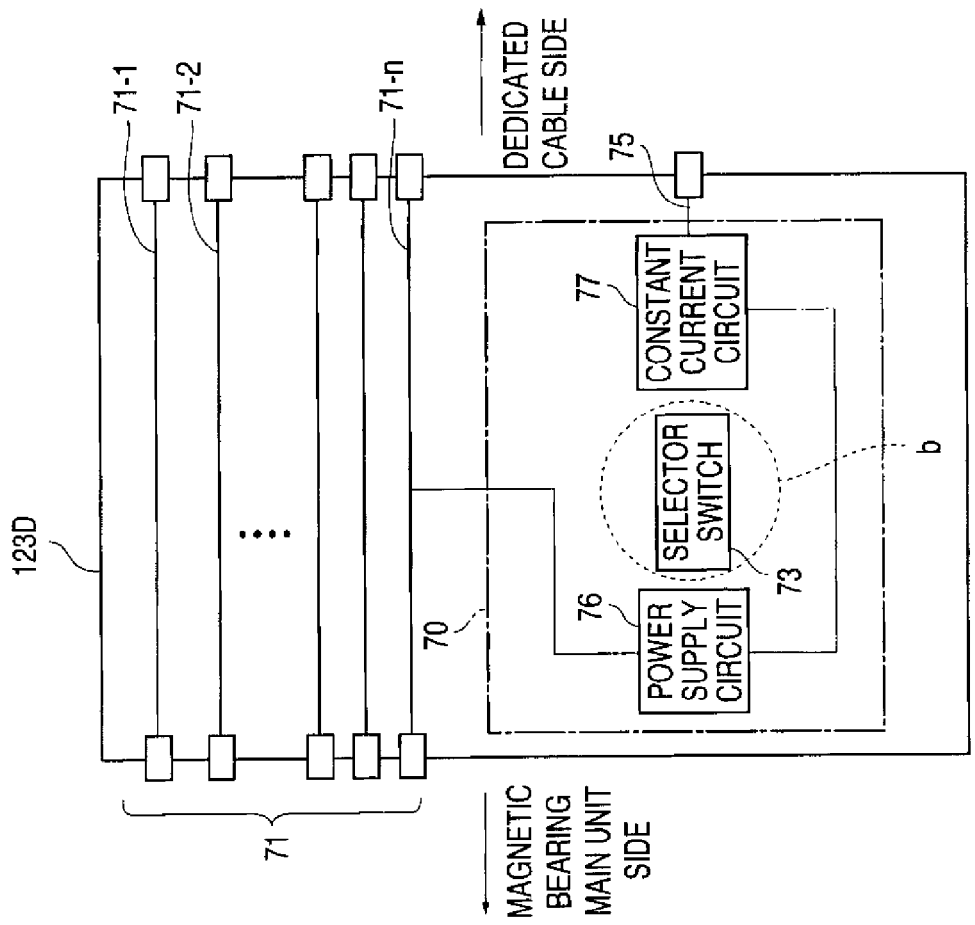
FIG. 18A shows an example of the internal constitution of the adapter unit of the rotating mechanism according to the eleventh embodiment.

FIG. 18A shows an example of the internal constitution of an adapter unit 123D of the rotating mechanism in the eleventh embodiment, and FIG. 18B shows the details of the switching element in the adapter unit 123D in FIG. 18A. The model identifying information setting circuit 70 constituted with the switching element 73 (the selector switch), the power supply circuit 76, and the constant current circuit 77 is provided in the adapter unit 123D as shown in FIG. 18A. The switching element 73 selects one of the models A, B, C, D, E, F, and G as shown in FIG. 18B. As a result, the constant current of the constant current circuit 77 can be set at the level (the current value) for representing the model identification information corresponding to the model.

The constant current circuit 77 is connected to the dedicated cable 30 via one connective wiring 75 and the power supply circuit 76 supplying a power to the constant current circuit 77 is connected to the ground line via the relay wiring 71-$n$. As a result, the constant current representing the model identification information set by the constant current circuit 77 passes in the connective wiring 75. As the connective wiring 75 is connected to the multiple signal processing circuit 62A of the control device 20F via the wiring in the dedicated cable 30F, the model of the turbo-molecular pump having the magnetic bearing main unit 11F can be recognized. As described above, as the constant current of the constant current circuit 77 is set to a predefined value with switching element 73, the model identification information on the turbo-molecular pump having the magnetic bearing main unit 11F can be set. As a result, the model identification information can be set easily and accurately. A control device 40 recognizes the model and can set the optimum control condition in the multiple signal processing circuit 62A according to the constant current representing the model identification information. Other constitutions are the same as those of the seventh embodiment, and the same effect is provided.

Twelfth Embodiment

FIG. 19A and FIG. 19B show examples of the installing orientation of the magnetic bearing main unit of the turbo-molecular pump as a rotating mechanism 100J. The magnetic bearing main unit 11F is designed to be mounted in an arbitrary installing orientation concerning a rotating body 11R in consideration of its function and, specifically, can be mounted in an arbitrary installing orientation including the vertical direction as shown in FIG. 19A and the horizontal direction as shown in FIG. B. However, it has been understood that the magnetic bearing main unit 10F is more stably controlled when used by changing the magnetic bearing control characteristic corresponding to the difference of the installing orientation of the entire turbo-molecular pump according to the weight of the rotating body 11R and the constituent features of the magnetic bearing for practicality.

FIG. 20A shows an example of the internal constitution of an adapter unit 123E of the rotating mechanism 100J in the twelfth embodiment, FIG. 20B shows the details of a switching element in the adapter unit in FIG. 20A, and FIG. 20C shows the details of an installing orientation detector in the adapter unit in FIG. 20A. As shown in FIG. 20A, an installing orientation detector 82 for detecting the installing orientation of the magnetic bearing main unit 10F is provided in the model identifying information setting circuit 70 in the adapter unit 123E besides the switching element 73, the power supply circuit 76, the data storage cell 78 (the ROM), and a signal processing circuits 79. The installing orientation detection signal is detected by the installing orientation detector 82, processed with the signal processing circuit 79, and transmitted to the multiple signal processing circuit 62A (see FIG. 16) of the control device 20F with the model data selected from data storage cell 78 by switching element 73. Accordingly, the model of the turbo-molecular pump having the magnetic bearing main unit 11F is recognized, and the installing orientation of the magnetic bearing main unit 10F is recognized, so that a magnetic bearing part 11F can be controlled by setting the control condition optimal for the model in consideration of the installing orientation.

The installing orientation detector 82 has an electrical conductive ball 82$c$ as a breechblock between a pair of guide cases 82$a$ and 82$b$ vertically provided as shown in FIG. 20C. When an adapter unit 123E is installed horizontally (with the magnetic bearing main unit 10 in the vertical direction) as shown in FIG. 19A, an electrode 82$d$ provided at the middle part of the guide case 82$a$ and an electrode 82$e$ provided at the middle part of the guide case 82$b$ are conducted via the ball 82$c$, which is detected by a continuity confirmation circuit 82$f$. Consequently, the fact that the adapter unit 123E is installed horizontally, or in the direction perpendicular to the direction of a gravitational force Fg, is detected. On the other hand, when the adapter unit 123E is installed vertically (with the magnetic bearing main unit 10 in the horizontal direction) as shown in FIG. 19B, the ball 82$c$ detached from the electrode 82$d$ and the electrode 82$e$. Consequently, the fact that the adapter unit 123E is installed vertically is detected. The installing orientation detector 82 may be mounted so that the electrode 82$d$ and the electrode 82$e$ are conducted by the ball 82c when the magnetic bearing main unit 10F is installed horizontally or vertically. Other constitutions are the same as those of the seventh embodiment, and the same effect is provided.

Thirteenth Embodiment

FIG. 21A shows an example of the internal constitution of an adapter unit 123F of the rotating mechanism in the thirteenth embodiment. FIG. 21A shows an example in which a selector switch 83 for setting the installing orientation in the model identifying information setting circuit 70 by a manual operation. FIG. 21B shows the details of the installing orientation selector switch. FIG. 21C shows the details of the switching element. Whether the adapter unit 123F is mounted vertically or horizontally can be set by sliding an operating section 83a of the installing orientation selector switch 83 in the left direction or in the right direction as shown in FIG. 21B. The signal processing circuit 79 processes the model data in the data storage cell 78 (the ROM) selected by the switching element 73 and the installing orientation data set by the installing orientation selector switch 83 for transmitting the installing orientation data with the model data to the control device 20F. Other constitutions are the same as those of the seventh embodiment, and the same effect is provided.

Fourteenth Embodiment

FIG. 22A shows an example of the internal constitution of an adapter unit 123G of the rotating mechanism in the fourteenth embodiment, and FIG. 22B shows the details of the switching element in the adapter unit in FIG. 22A. A data storage section 84 having a ROM and a RAM, the power supply circuit 76, the signal processing circuit 79, and the switching element 73 are provided to the model identifying information setting circuit 70 as shown in FIG. 22A. The data stored in the ROM and the RAM of the data storage section 84 can be read from the control device 20F via the dedicated cable 30F, the connective wiring 75, and the signal processing circuit 79. The operation information can be written from the control device 20F in the RAM of the data storage section 84. In addition, a communication circuit 85 is provided besides the signal processing circuit 79. As a result, the data stored in the data storage section 84 by an external signal processing device not shown in the drawing can be read via the communication circuit 85.

As described above, the firmware for the upgrade of the control device 20F can be sent from the adapter unit 123G. Consequently, it becomes easy to optimize the control condition such as each type of setting information and the like by the control device 20F for each model of the turbo-molecular pump having the magnetic bearing main unit 10F. In addition, the data stored in the data storage section 84 can be read from the external signal processing device and thus can be used for various analytical processing of the turbo-molecular pump main body having the magnetic bearing main unit 10F. Other constitutions are the same as those of the seventh embodiment, and the same effect is provided. The internal constitution and the function of the adapter units 124 and 125 according to FIG. 10 and FIG. 11 also can be generally the same as the internal constitution and the function of the adapter units 123 and 123A to 123G.

Fifteenth Embodiment

The examples of the turbo-molecular pump having the magnetic bearing main unit 10 for supporting the rotating body 11F as the rotating machinery main unit by the magnetic levitation are described in the seventh to fourteenth embodiments. However, the present invention is not limited to the turbo-molecular pump but may be applicable to, for example, a gas circulating fan 120 of the excimer laser device in the constitution shown in FIG. 23.

FIG. 23 is a cross-sectional view showing the basic constitution of the gas circulating fan for circulating the excimer gas in the excimer laser device 100U. In FIG. 23, a fan 103 is disposed in a chamber 101, and the laser gas is filled in the chamber 101. The magnetic bearing main unit 10U for supporting a rotational shaft 102 of the fan 103 is provided to both sides of the chamber 101. A radial electromagnet 104 (a magnetic bearing), a radial displacement sensor 105, axial electromagnets 107 and 108 (magnetic bearings), an axial displacement sensor 109, a motor rotor 118, a motor stator 117, and a protective bearing 112 as the touchdown bearing for supporting the radial direction and the axial direction in protection of the rotational shaft 102 are provided respectively on the left side of FIG. 23.

On the other hand, a radial electromagnet 113 (a magnetic bearing), a radial displacement sensor 114, and a protective bearing 116 for enabling support only in the radial direction are provided on the right side of FIG. 23. The plug-in receptacle 122 is provided to a predefined position of the chamber 101, and an adapter unit 123H is provided between the plug-in receptacle 122 and the plug 131 connected with one end of the dedicated cable 30U. A model identification means for identifying the model of the gas circulating fan 120 having the magnetic bearing main unit having a radial magnetic bearing 104, axial magnetic bearings 107 and 108, and a radial magnetic bearing 113 is mounted on the adapter unit 123H. The control device 20U not shown in the drawing is connected with the other end of the dedicated cable 30U via the plug 132 and the plug-in receptacle 141, same as shown in FIG. 9.

The position of the rotational shaft 102 is detected by the axial displacement sensor 109, radial displacement sensors 105 and 114, and the position detection signal is transmitted to the control device 20U via the dedicated cable 30U. The control device 20F processes each position detection signal in the compensating circuit 54A as described above, amplifies the bearing drive power amplifier 55, and controls the radial magnetic bearing 104, the axial magnetic bearings 107 and 108, and the radial magnetic bearing 113 of the bearing section of the gas circulating fan 120. Consequently, the rotational shaft 102 is supported by the magnetic levitation in a predefined position. On the other hand, the driving current is supplied to the coil of the motor stator 117 from the inverter 61 for motor drive of the control device 20U. Consequently, the fan 103 rotates with the motor rotor 118 and agitates the laser gas in the chamber 101. It is possible to give the adapter unit 123H generally the same constitution and function as the internal constitutions and functions of the adapters 123 and 123A to 123G though not shown in the drawing. Naturally, the adapter unit 123H may be disposed in the same manner as the adapter units 124 and 125 as shown in FIG. 10 and FIG. 11.

Sixteenth Embodiment

The example in which the model identifying signal of the magnetic bearing main unit 10 is processed by the power line communication with alternating-current coupling from the magnetic bearing main unit 10 to the control device 20 is described in the fourth embodiment (see FIG. 5). In a sixteenth embodiment (see FIG. 24), an example in which the model identifying information means 70 is provided in the adapter unit 123K and the power line communication is executed with the alternating-current coupling from the adapter unit 123K to a control device 20K will be described. The embodiment is common with the tenth embodiment (see FIG. 16, FIG. 17A and FIG. 17B) in that the model identifying information setting circuit 70 as the model identifying information means is provided in the adapter unit 123K and in that the power line communication is executed with the alternating-current coupling. In the tenth embodiment, however, every rotating mechanism is concerned, the power line communication is executed with the alternating-current coupling with the signal wire from a sensor, and the frequency of the oscillation circuit 81 is selected with a selector switch 73. On the other hand, in the sixteenth embodiment, the rotating machinery main unit of the rotating mechanism is specified as the magnetic bearing main unit 10K, the power line communication is executed with the alternating-current coupling with the electricity supply line 30L, and any of method for selecting the frequency of the high-frequency oscillation circuit 34 may be used. There are differences as described above between the tenth embodiment and the sixteenth embodiment.

Figure 24:
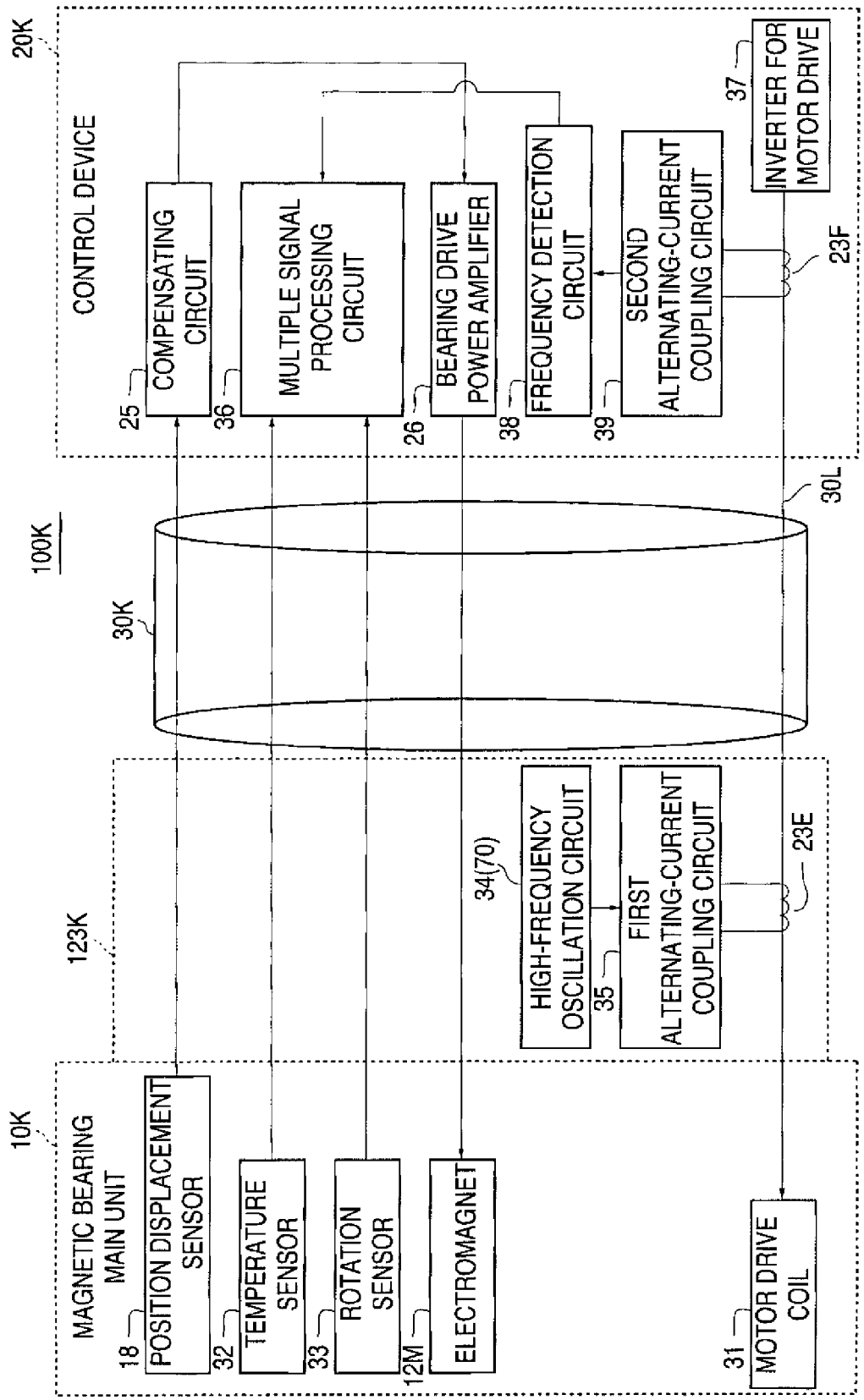
FIG. 24 is a block diagram showing an example of the circuit constitution of the rotating mechanism in the sixteenth embodiment.
Figure 25:
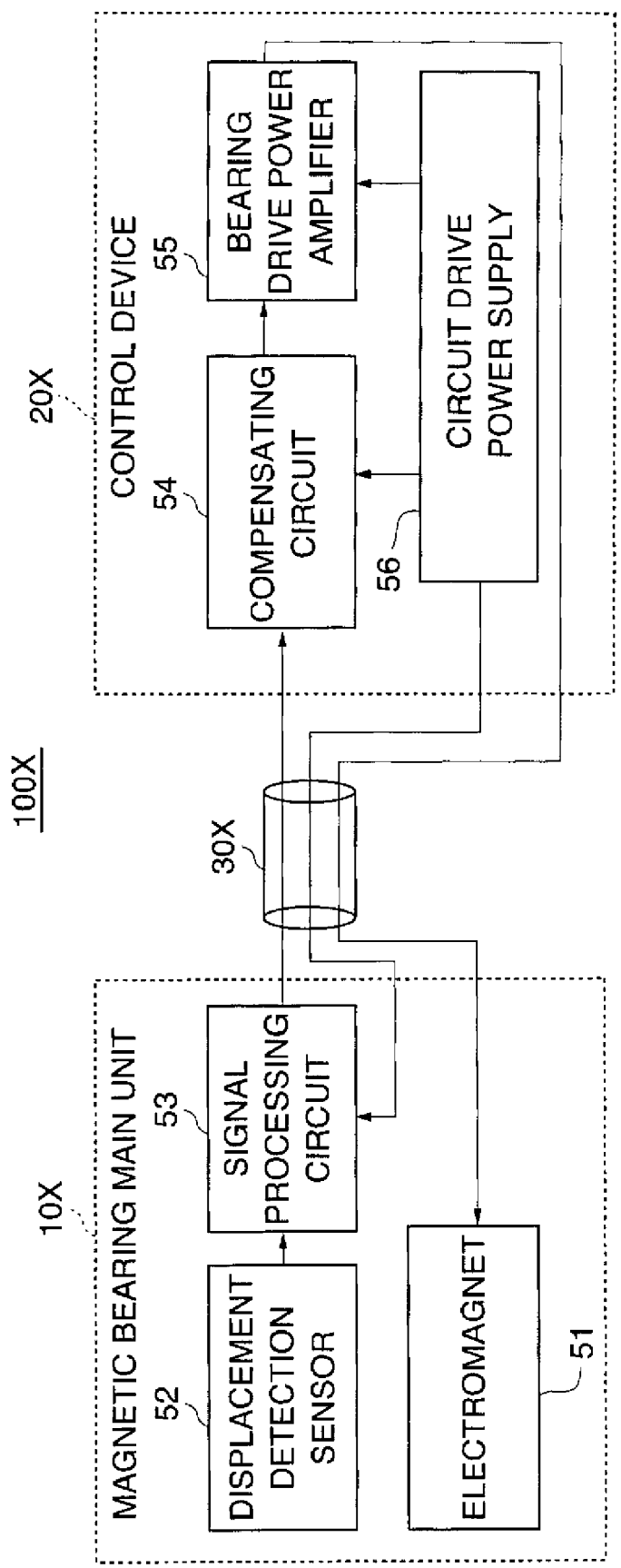
FIG. 25 shows an example of a block diagram of the conventional magnetic bearing device.
Figure 26:
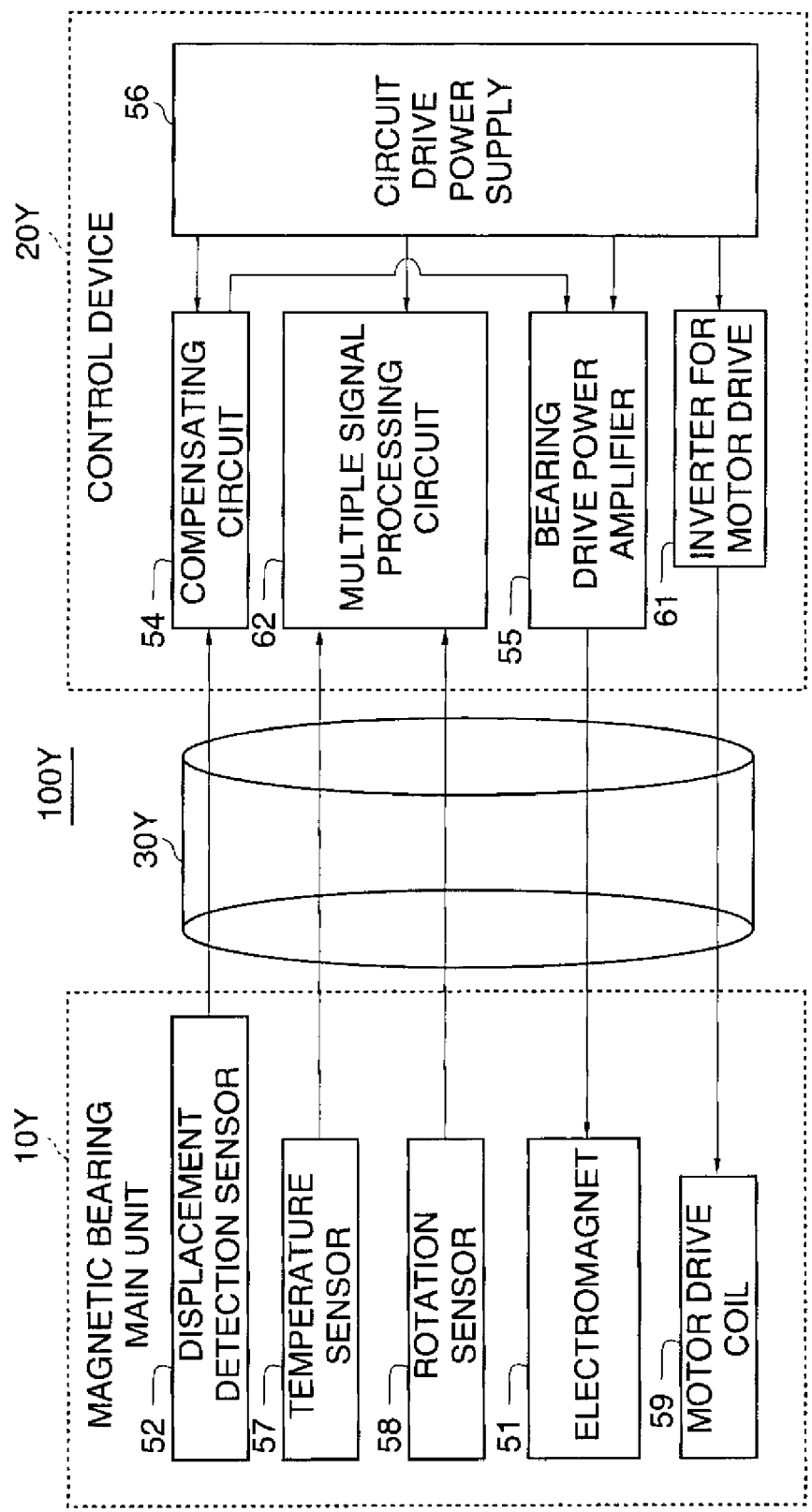
FIG. 26 shows an example of a block diagram of the magnetic bearing device for executing the conventional model determination.

FIG. 24 is a block diagram showing an example of the circuit constitution of a rotating mechanism 100K in the sixteenth embodiment. The adapter unit 123K is provided between a dedicated cable 30K and a magnetic bearing main unit 10K. In addition, the high-frequency oscillation circuit 34 provided in the magnetic bearing main unit 10 of the magnetic bearing device 100C in the fourth embodiment (see FIG. 5) as the carrier signal wave generation means for generating the carrier signal wave is provided, and the first alternating-current coupling circuit 35 (including the first alternating-current coupling section 23E) as the first alternating-current coupling section for alternating-current coupling the carrier signal wave generated by the carrier signal generation means with the electricity supply line 30L for transmitting the carrier signal wave to the control device 20 are transferred to the adapter unit 123K in the constitution. Specifically, the adapter unit 123K has the high-frequency oscillation circuit 34 and the first alternating-current coupling circuit 35 (including the first alternating-current coupling section 23E), and couples the signal from the high-frequency oscillation circuit 34 with the electricity supply line 30L to the motor driving coil 31 for driving the motor 14. On the other hand, the control device 20K has the inverter 37 for motor drive for supplying the electric power to the motor driving coil 31, the frequency detection circuit 38, and the second alternating-current coupling circuit 39 (including the second alternating-current coupling section 23F). Also, the control device 20K detects the signal of the high-frequency oscillation circuit 34 by the alternating-current coupling from the electricity supply line 30L from the inverter 37 for motor drive to the motor driving coil 31 for driving the motor 14. The high-frequency oscillation circuit 34 generates the high frequency signal of 100 kHz to 30 MHz higher, for example, than the alternating current frequency of 50 to 60 Hz. The first alternating-current coupling circuit 35 supplies the high frequency signal generated by the high-frequency oscillation circuit 34 to the first alternating-current coupling section 23E and alternating-current couples the high frequency signal with the electricity supply line 30L for transmitting the high frequency signal in the electricity supply line 30L. As the oscillation frequency of the high-frequency signal is changed according to the model, it is able to couple the high frequency signal directly with the electricity supply line 30L. It is not necessary to execute a modulation such as the AM modulation, the FM modulation, and the PM modulation. On the other hand, as the filter circuit for limiting the frequency range of the high-frequency signal to a predefined pass band is used, the frequency range of the carrier wave can be selected according to the model of the magnetic bearing main unit 10K. As a result, a multiplicity of models can be identified by one high-frequency oscillation means 34. As described above, the adapter unit 123K has the high-frequency oscillation circuit 34 as the model identifying information setting circuit 70 for identifying the model of the magnetic bearing main unit 10K and store the model identification information in this circuit 34.

An example in which the means of the alternating-current coupling is of the inductive coupling type is shown in FIG. 24. However, the electrostatic capacitance coupling type may be used. In addition, the adapter unit 123K may have the specific pulse oscillation circuit 41, the carrier wave generating circuit 42, and the AM/FM modulation circuit 43 in the magnetic bearing main unit 10 of the sixth embodiment (refer to FIG. 7) for identifying the model. In this case, the control device 20K has the demodulation circuit 44 and the pulse demodulation circuit 45. The above is described as one example and is interchangeable with the tenth embodiment in spite of the difference as described above. Accordingly, elimination or reduction of a signal wire in the dedicated cable is possible. In addition, the model identifying information means 70 (see FIG. 13A and FIG. 13B) may have a constitution in which the passive electronic component 72 corresponding to the model identification information on a rotating machinery main unit 10K connected by the passive component switching circuit 74 is selected. Further in addition, the model identifying information means 70 (see FIG. 14A and FIG. 14B) may have a constitution in which the constant current circuit 77 for making a setting to an arbitrary current value and the setting means 73 for setting the current value to an arbitrary value are provided. Still further in addition, the model identifying information means 70 (see FIG. 15A and FIG. 15B) may have a constitution in which the data storage cell 78 for storing a predefined data concerning the model of the rotating machinery main unit 10F, a communication circuit 79 (the signal processing circuit in the drawing), and a data switch means 73 are provided. Although the high-frequency signal is directly coupled with the electricity supply line 30L in the embodiment, the high-frequency signal may be coupled with a signal wiring (both of the control signal and the power supply signal are included in the signal from the bearing drive power amplifier 26 to the electromagnet 12M for magnetic bearing in FIG. 24).

Embodiments of the present invention are described above. However, the present invention is not limited to the embodiments above. It is clear that various modifications can be applied to the embodiments.

In the embodiments described above, the example of transmitting the amount of the positional displacement detected with the displacement detection sensor by the power line communication and the example of transmitting the model identifying signal of the magnetic bearing main unit by the power line communication are described separately. However, it is possible, for example, that both are carried by the power line communication together. In this case, the electricity supply line and the first and second alternating-current coupling sections may be commonly used for the power line communication or may be independently used. In this case, it is also possible that the power line communication is executed in both direction between the magnetic bearing main unit and the control device. In addition, the embodiment of the power line communication of the amount of the positional displacement and the embodiment of the power line communication of the model identifying signal can be varied.

The example in which the high-frequency oscillation circuit is used for the model identification of the magnetic bearing main unit and the example in which the pulse oscillation circuit is used for the model identification of the magnetic bearing main unit are separately described. However, both may be mounted and switched for use. The motor and the electricity supply line to the motor and the displacement detection sensor are not shown in FIG. 2 to FIG. 4. However, such electricity supply lines may be included in the dedicated cable. A monitor signal system such as a temperature sensor and a rotation sensor is not shown in the drawing. However, such a monitor signal may be transmitted by the power line communication. The system for transmitting the amount of the positional displacement detected with the displacement detection sensor by the power line communication is not shown in FIG. 5 to FIG. 7. However, such an amount may be transmitted by the power line communication.

As for the alternating-current coupling, the electricity supply line and the first and second alternating-current coupling sections may be commonly used for the power line communication or may be independently used. The same is applied to the alternating-current coupling section of the first and second electricity supply lines and the first to fourth alternating-current coupling sections. Either of the inductive coupling type or the electrostatic capacitance coupling type may be used for the method of the alternating-current coupling. When commonly used for the power line communication, the electricity supply line and the first and second alternating-current coupling sections may be used with time shearing method or may execute the transmission with carrier waves of a different frequency at the same time. The electricity supply line may supply a direct current electric power or may supply a low-frequency alternating current as is used for commerce. The power supply for the power supply is not limited to one but may be more than one. The dedicated cable is not limited to one and but may be more than one. The number of the bearing and the rotation drive motor, the number of its electromagnets, the number of the displacement detection sensors, and their positions may be variously modified according to a design. The connecting destination of the magnetic rotating body of the magnetic bearing main unit is not described specifically in the embodiments above. Typically, the connection is made with a rotational shaft of various types such as the rotational shaft of the turbo-molecular pump, the rotational shaft of the gas stir fan of the excimer laser, and the rotational shaft of the rolling mechanism of the semiconductor-production equipment, the rotational shaft of the rolling mechanism of the manipulator, and so forth. Especially, it is preferable to use a frictionless magnetic bearing for a rolling mechanism in a high vacuum.

It is possible to widely use for the rotating mechanism having the rotating machinery main unit for supporting the rotating body by the magnetic levitation with the magnetic bearing mechanism and controlling the rotating machinery main unit by changing the control condition according to each model of the rotating machinery main unit. In the examples according to the embodiments above, the rotating mechanism is the turbo-molecular pump, the rotating body is the rotating part of the turbo-molecular pump and the magnetic rotating body connected with the rotating part, and the rotating machinery main unit is a part excluding the rotating part of the turbo-molecular pump and the magnetic bearing main unit. However, the rotating mechanism may not be the turbo-molecular pump or the excimer laser. The rotating mechanism may have a rotating machinery main unit for supporting a rotating body by a mechanical bearing mechanism as used in a dry vacuum pump of a screw type, a root type, or the like or in a fluid mechanism such as a gas circulating fan and execute the control by changing the control condition according to each type of the model of the rotating machinery main unit.

INDUSTRIAL APPLICABILITY

The present invention is applied to a magnetic bearing device and a rotating mechanism.

DESCRIPTION OF REFERENCE NUMERALS AND SYMBOLS

10, 10K, 10X, 10Y: Magnetic bearing main unit
10F, 10U, 10Z: Rotating machinery main unit
11: Magnetic rotating body
11F, 11U, 11Z: Rotating body
11R: Rotational shaft
12A, 12B: Radial magnetic bearing
12M: Electromagnet for magnetic bearing
12Ax1, 12Ax2, 12Ay1, 12Ay2, 12Bx1, 12Bx2, 12By1, 12By2: Radial electromagnet
13: Axial magnetic bearing
13z1, 13z2: Axial electromagnet
14: Motor (stator)
14a, 14b, 14c: Electromagnet for motor
15: Rotor
16A, 16B: Radial magnetic bearing target
16C: Axial magnetic bearing target
17A, 17B: Radial displacement detection sensor target
17C: Axial displacement detection sensor target
18: Position displacement sensor
18A, 18B: Radial displacement detection sensor
18Ax, 18Ay, 18Bx, 18By: Radial displacement detection sensor
18C: Axial displacement detection sensor
20, 20F, 20K, 20X, 20Y, 20Z: Control device
21: Signal processing circuit
22: Carrier signal wave generation means (Modulation carrier circuit)
22A, 22B: First and second carrier signal wave generation means (First and Second Modulation Carrier Circuit)
23A-23E: First to fourth alternating-current coupling section
24: Carrier signal wave detecting means (Carrier wave demodulating circuit)
24A, 24B: First and second carrier signal wave detecting means (First and Second Carrier Wave Demodulating Circuit)
25: Control signal generation means (Compensating circuit)
26: Magnetic bearing drive current control section (Bearing drive power amplifier)
27: Power supply (Circuit drive power supply)
28: Analog-to-digital converter circuit
29: Digital-to-analog converter circuit
30, 30F, 30K, 30U, 30X, 30Y, 30Z: Dedicated cable
30a: Wiring (Core wire)
30L: Electricity supply line
30LA, 30LB: First and second electricity supply line
31: Motor drive coil
32: Temperature sensor
33: Rotation sensor
34: High-frequency oscillation means (High-frequency oscillation circuit)
35: First alternating-current coupling circuit
36: Property determination means (Multiple signal processing circuit)
37: Inverter for motor drive
38: Frequency detection circuit 39: Second alternating-current coupling circuit
41: Pulse oscillation circuit (Specific pulse oscillation circuit)
42: Carrier wave generating circuit
43: AM/FM modulation circuit
44: Demodulation circuit
45: Pulse period sensing means (Pulse demodulation circuit)
51: Electromagnet for magnetic bearing
52: Displacement detection sensor
52A: Displacement detection sensor section
53: Signal processing circuit
54, 54A: Compensating circuit
55: Bearing drive power amplifier
56: Circuit drive power supply
57: Temperature sensor
57A: Temperature sensor section
58: Rotation sensor
58A: Rotation sensor section
59: Motor driving coil
61: Inverter for motor drive
62, 62A: Multiple signal processing circuit (Control condition setting means)
70: Model identifying information setting circuit (Model identifying information means)
71: Relay Wiring
72: Passive electronic component
73: Switching element (Selector switch)
74: Passive component switching circuit
75: Connective Wiring
76: Power supply circuit
77: Constant current circuit
78: Data storage cell (ROM)
79: Signal processing circuit (Communication circuit)
80: Alternating-current coupling section
81: Oscillation circuit
82: Installing orientation detector
83: Installing orientation selector switch
84: Data storage section
85: Communication circuit
100, 100A-100E, 100X, 100Y: Magnetic bearing device
100F-100K, 100U, 100Z: Rotating mechanism
101: Chamber
102: Rotational shaft
103: Fan
104: Radial electromagnet (magnetic bearing)
105: Radial displacement sensor
107: Axial electromagnet (magnetic bearing)
108: Axial electromagnet (magnetic bearing)
109: Axial displacement sensor
111: Motor
112: Protective bearing
113: Radial electromagnet (magnetic bearing)
114: Radial displacement sensor
116: Protective bearing
117: Motor stator
118: Motor rotor
120: Gas circulating fan
121: Casing
122: Plug-in receptacle
123-125, 123A-123H, 123K: Adapter unit
131-132: Plug
141: Plug-in receptacle

What is claimed is:

1. A magnetic bearing device, comprising:
a magnetic bearing main unit having an electromagnet for generating a magnetism for magnetically levitating and rotatably supporting a magnetic rotating body and for functioning as a magnetic bearing;
a control device having a power supply for supplying an electric power to the magnetic bearing main unit and a control signal generation means for generating a control signal for controlling a levitation position of the magnetic rotating body by adjusting the magnetism; and
an electricity supply line for supplying the electric power from the control device to the magnetic bearing main unit,
wherein the magnetic bearing main unit has a carrier signal wave generation means for generating a carrier signal wave and a first alternating-current coupling section for alternating-current coupling the carrier signal wave generated by the carrier signal wave generation means with the electricity supply line for transmitting the carrier signal wave to the control device, and
the control device has a second alternating-current coupling section for separating the carrier signal wave alternating-current coupled from the electricity supply line and a carrier signal wave detecting means for detecting the carrier signal wave separated by the second alternating-current coupling section.

2. The magnetic bearing device according to claim 1,
wherein the magnetic bearing main unit has a displacement detection sensor for detecting the displacement of the magnetic rotating body, the carrier signal wave generation means has a modulation carrier circuit for generating a modulated wave as the carrier signal wave by modulating a carrier wave with the detection signal from the displacement detection sensor, and the first alternating-current coupling section alternating-current couples the modulated wave generated by the modulation carrier circuit with the electricity supply line for transmitting the modulated wave to the control device,
the control device has a magnetic bearing drive current control section for adjusting the magnetism of the electromagnet according to the control signal, the carrier signal wave detecting means has a carrier wave demodulating circuit for demodulating the detection signal from the modulated wave separated by the second alternating-current coupling section, the control signal generation means has a compensating circuit for generating a compensating signal as the control signal for correcting the displacement of the magnetic rotating body according to the detection signal demodulated by the carrier wave demodulating circuit and for supplying the compensating signal to the magnetic bearing drive current control section, and the magnetic bearing drive current control section adjusts the magnetism of the electromagnet according to the compensating signal and controls the levitation position of the magnetic rotating body so as to reduce the displacement.

3. The magnetic bearing device according to claim 2,
wherein the electromagnet includes a radial electromagnet for adjusting the position in the radial direction of the magnetic rotating body, the displacement detection sensor includes a radial displacement detection sensor for detecting the displacement in the radial direction of the magnetic rotating body, and the magnetic bearing drive current control section adjusts the magnetism of the radial electromagnet according to the detection signal of the radial displacement detection sensor, and/or
the electromagnet includes an axial electromagnet for adjusting the position in the axial direction of the magnetic rotating body, the displacement detection sensor includes an axial displacement detection sensor for detecting the displacement in the axial direction of the magnetic rotating body, and the magnetic bearing drive current control section adjusts the magnetism of the axial electromagnet according to the detection signal of the axial displacement detection sensor.

4. The magnetic bearing device according to claim 3, wherein the electricity supply line is a wiring for supplying an electric power to any of a motor, the radial electromagnet, the axial electromagnet, the radial displacement detection sensor, the axial displacement detection sensor, or an electric circuit.

5. The magnetic bearing device according to claim 2, wherein an amplitude modulation method, a frequency modulation method, a phase modulation method, a spread spectrum modulation method, or a combination thereof is used for the modulation in the modulation carrier circuit.

6. The magnetic bearing device according to claim 2, wherein a plurality of frequency ranges is used for the carrier wave.

7. The magnetic bearing device according to claim 2, wherein the magnetic bearing main unit has an analog-to-digital converter circuit for analog-to-digital converting the detection signal from the displacement detection sensor and for supplying the converted signal to the modulation carrier circuit, and the control device has a digital-to-analog converter circuit for digital-to-analog converting the detection signal demodulated by the carrier wave demodulating circuit and for supplying the converted signal to the compensating circuit.

8. The magnetic bearing device according to claim 2, wherein the magnetic bearing main unit has a signal processing circuit for processing the detection signal from the displacement detection sensor and for supplying the processed signal to the modulation carrier circuit or to the modulation carrier circuit via the analog-to-digital converter circuit.

9. The magnetic bearing device according to claim 2, wherein the magnetic bearing main unit detects a monitor signal such as a rotational speed or a temperature of the magnetic rotating body and the modulation carrier circuit modulates the carrier wave with the monitor signal and generates the modulated wave.

10. The magnetic bearing device according to claim 1, wherein the magnetic bearing main unit has a displacement detection sensor for detecting the displacement of the magnetic rotating body and a magnetic bearing drive current control section for adjusting the magnetism of the electromagnet according to the control signal, the carrier signal wave generation means has a modulation carrier circuit for generating a modulated wave as the carrier signal wave by modulating a carrier wave with the detection signal from the displacement detection sensor, and the first alternating-current coupling section alternating-current couples the modulated wave generated by the modulation carrier circuit with the electricity supply line for transmitting the modulated wave to the control device, in the control device, the carrier signal wave detecting means has a carrier wave demodulating circuit for demodulating the detection signal from the modulated wave separated by the second alternating-current coupling section, and the control signal generation means has a compensating circuit for generating a compensating signal as the control signal for correcting the displacement of the magnetic rotating body according to the detection signal demodulated by the carrier wave demodulating circuit and for supplying the compensating signal to the magnetic bearing drive current control section, and the magnetic bearing drive current control section adjusts the magnetism of the electromagnet according to the compensating signal and controls the levitation position of the magnetic rotating body so as to reduce the displacement.

11. The magnetic bearing device according to claim 1, wherein, in the magnetic bearing main unit, the carrier signal wave generation means has a high-frequency oscillation means for oscillating a high-frequency signal as the carrier signal wave, and the first alternating-current coupling section alternating-current couples the high-frequency signal oscillated by the high-frequency oscillation means with the electricity supply line as the carrier signal wave for transmitting the high-frequency signal to the control device, in the control device, the second alternating-current coupling section separates the high-frequency signal alternating-current coupled from the electricity supply line, and the carrier signal wave detecting means has a frequency detection circuit for detecting the frequency from the high-frequency signal separated by the second alternating-current coupling section, and the control device has a property determination means for identifying the property of the magnetic bearing main unit according to the frequency detected by the frequency detection circuit.

12. The magnetic bearing device according to claim 11, wherein the electricity supply line alternating-current coupled is a wiring for supplying an electric power to an electric circuit.

13. The magnetic bearing device according to claim 11, wherein the magnetic bearing main unit has a filter circuit for limiting the frequency range of the high-frequency signal from the high-frequency oscillation means in a predefined range for the passage.

14. The magnetic bearing device according to claim 1, wherein, in the magnetic bearing main unit, the carrier signal wave generation means has a pulse oscillation circuit for oscillating a pulse signal as the carrier signal wave, and the first alternating-current coupling section alternating-current couples the pulse signal oscillated by the pulse oscillation circuit with the electricity supply line as the carrier signal wave for transmitting the pulse signal to the control device, in the control device the second alternating-current coupling section separates the pulse signal alternating-current coupled from the electricity supply line, and the carrier signal wave detecting means has a pulse period sensing means for sensing the pulse period from the pulse signal separated by the second alternating-current coupling section, and the control device has a property determination means for identifying the property of the magnetic bearing main unit according to the pulse period sensed by the pulse period sensing means.

15. The magnetic bearing device according to claim 1, wherein the magnetic bearing main unit has a displacement detection sensor for detecting the displacement of the magnetic rotating body, the carrier signal wave generation means has a modulation carrier circuit for generating a modulated wave as the carrier signal wave by modulating a carrier wave with the detection signal from the displacement detection sensor, and the first alternating-current coupling section alternating-current couples the modulated wave generated by the modulation carrier circuit with the electricity supply line for transmitting the modulated wave to the control device, the control device has a magnetic bearing drive current control section for adjusting the magnetism of the electromagnet according to the control signal, the carrier signal wave detecting means has a carrier wave demodulating circuit for demodulating the detection signal from the modulated wave separated by the second alternating-current coupling section, the control signal generation means has a compensating circuit for generating a compensating signal as the control signal for correcting the displacement of the magnetic rotating body according to the detection signal demodulated by the carrier wave demodulating circuit and for supplying the compensating signal to the magnetic bearing drive current control section, and the magnetic bearing drive current control section adjusts the magnetism of the electromagnet according to the compensating signal and controls the levitation position of the magnetic rotating body so as to reduce the displacement, in the magnetic bearing main unit, furthermore, the carrier signal wave generation means has a high-frequency oscillation means for oscillating a high-frequency signal as the carrier signal wave, and the first alternating-current coupling section alternating-current couples the high-frequency signal oscillated by the high-frequency oscillation means with the electricity supply line as the carrier signal wave for transmitting the high-frequency signal to the control device, in the control device, the second alternating-current coupling section separates the high-frequency signal alternating-current coupled from the electricity supply line, and the carrier signal wave detecting means has a frequency detection circuit for detecting the frequency from the high-frequency signal separated by the second alternating-current coupling section, and the control device has a property determination means for identifying the property of the magnetic bearing main unit according to the frequency detected by the frequency detection circuit.

16. The magnetic bearing device according to claim 15, wherein the compensating circuit can set a parameter according to a model on the basis of the property of the magnetic bearing main unit identified by the property determination means when the compensating signal is generated.

17. The magnetic bearing device according to claim 1, wherein the magnetic bearing main unit has a displacement detection sensor for detecting the displacement of the magnetic rotating body, the carrier signal wave generation means has a modulation carrier circuit for generating a modulated wave as the carrier signal wave by modulating a carrier wave with the detection signal from the displacement detection sensor, and the first alternating-current coupling section alternating-current couples the modulated wave generated by the modulation carrier circuit with the electricity supply line for transmitting the modulated wave to the control device, the control device has a magnetic bearing drive current control section for adjusting the magnetism of the electromagnet according to the control signal, the carrier signal wave detecting means has a carrier wave demodulating circuit for demodulating the detection signal from the modulated wave separated by the second alternating-current coupling section, the control signal generation means has a compensating circuit for generating a compensating signal as the control signal for correcting the displacement of the magnetic rotating body according to the detection signal demodulated by the carrier wave demodulating circuit and for supplying the compensating signal to the magnetic bearing drive current control section, and the magnetic bearing drive current control section adjusts the magnetism of the electromagnet according to the compensating signal and controls the levitation position of the magnetic rotating body so as to reduce the displacement, in the magnetic bearing main unit, furthermore, the carrier signal wave generation means has a pulse oscillation circuit for oscillating a pulse signal as the carrier signal wave, and the first alternating-current coupling section alternating-current couples the pulse signal oscillated by the pulse oscillation circuit with the electricity supply line as the carrier signal wave for transmitting the pulse signal to the control device, in the control device, the second alternating-current coupling section separates the pulse signal alternating-current coupled from the electricity supply line, and the carrier signal wave detecting means has a pulse period sensing means for sensing the pulse period from the pulse signal separated by the second alternating-current coupling section, and the control device has a property determination means for identifying the property of the magnetic bearing main unit according to the pulse period sensed by the pulse period sensing means.

18. A rotation system, comprising:
the magnetic bearing device according to claim 1;
a magnetic rotating body magnetically levitated by the magnetic bearing device for a rotation; and
a rotor main unit connected with the magnetic rotating body for a rotation.

19. A turbo-molecular pump, comprising:
the rotation system according to claim 18.

20. A semiconductor-production equipment, comprising:
the rotation system according to claim 18.

21. A magnetic bearing device, comprising:
a magnetic bearing main unit having an electromagnet for generating a magnetism for magnetically levitating and rotatably supporting a magnetic rotating body and for functioning as a magnetic bearing;
a control device having a power supply for supplying an electric power to the magnetic bearing main unit and a control signal generation means for generating a control signal for controlling a levitation position of the magnetic rotating body by adjusting the magnetism; and
a first electricity supply line and a second electricity supply line different from each other for supplying the electric power from the control device to the magnetic bearing main unit;

wherein the magnetic bearing main unit has a first carrier signal wave generation means for generating a first carrier signal wave and a first alternating-current coupling section for alternating-current coupling the first carrier signal wave generated by the first carrier signal wave generation means with the first electricity supply line for transmitting the first carrier signal wave to the control device, the control device has a second alternating-current coupling section for separating the first carrier signal wave alternating-current coupled from the first electricity supply line and a first carrier signal wave detecting means for detecting the first carrier signal wave separated by the second alternating-current coupling section, the control device further has a second carrier signal wave generation means for generating a second carrier signal wave and a third alternating-current coupling section for alternating-current coupling the second carrier signal wave generated by the second carrier signal generation means with the second electricity supply line for transmitting the second carrier signal wave to the magnetic bearing main unit, and the magnetic bearing main unit further has a fourth alternating-current coupling section for separating the second carrier signal wave alternating-current coupled from the second electricity supply line and a second carrier signal wave detecting means for detecting the second carrier signal wave separated by the fourth alternating-current coupling section.

22. The magnetic bearing device according to claim 21, wherein the magnetic bearing main unit has a displacement detection sensor for detecting the displacement of the magnetic rotating body and a magnetic bearing drive current control section for adjusting the magnetism of the electromagnet according to the control signal, the first carrier signal wave generation means has a first modulation carrier circuit for generating a first modulated wave as the first carrier signal wave by modulating a first carrier wave with the detection signal from the displacement detection sensor, and the first alternating-current coupling section alternating-current couples the first modulated wave with the first electricity supply line for transmitting the first modulated wave to the control device, in the control device, the first carrier signal wave detecting means has a first carrier wave demodulating circuit for demodulating the detection signal from the first modulated wave separated by the second alternating-current coupling section, and the control signal generation means has a compensating circuit for generating a compensating signal as the control signal for correcting the displacement of the magnetic rotating body according to the detection signal demodulated by the first carrier wave demodulating circuit, in the control device, furthermore, the second carrier signal wave generation means has a second modulation carrier circuit for generating a second modulated wave as the second carrier signal wave by modulating a second carrier wave with the compensating signal from the compensating circuit, and the third alternating-current coupling section alternating-current couples the second modulated wave with the second electricity supply line for transmitting the second modulated wave to the magnetic bearing main unit, in the magnetic bearing main unit, furthermore, the second carrier signal wave detecting means has a second carrier wave demodulating circuit for demodulating the compensating signal from the second modulated wave separated by the fourth alternating-current coupling section and for supplying the compensating signal to the magnetic bearing drive current control section, and the magnetic bearing drive current control section adjusts the magnetism of the electromagnet according to the compensating signal and controls the levitation position of the magnetic rotating body so as to reduce the displacement.

23. The magnetic bearing device according to claim 21, wherein, in the magnetic bearing main unit, the first carrier signal wave generation means has a high-frequency oscillation means for oscillating a high-frequency signal as the carrier signal wave, and the first alternating-current coupling section alternating-current couples the high-frequency signal oscillated by the high-frequency oscillation means with the first electricity supply line as the carrier signal wave for transmitting the high-frequency signal to the control device, in the control device, the second alternating-current coupling section for separating the high-frequency signal alternating-current coupled from the first electricity supply line, and the first carrier signal wave detecting means has a frequency detection circuit for detecting the frequency from the high-frequency signal separated by the second alternating-current coupling section, and the control device has a property determination means for identifying the property of the magnetic bearing main unit according to the frequency detected by the frequency detection circuit.

24. The magnetic bearing device according to claim 21, wherein, in the magnetic bearing main unit, the first carrier signal wave generation means has a pulse oscillation circuit for oscillating a pulse signal as the carrier signal wave, and the first alternating-current coupling section alternating-current couples the pulse signal oscillated by the pulse oscillation circuit with the first electricity supply line as the carrier signal for transmitting the pulse signal to the control device, in the control device, the second alternating-current coupling section separates the pulse signal alternating-current coupled from the first electricity supply line, and the first carrier signal wave detecting means has a pulse period sensing means for sensing the pulse period from the pulse signal separated by the second alternating-current coupling section, and the control device has a property determination means for identifying the property of the magnetic bearing main unit according to the pulse period detected by the pulse period sensing means.

25. A rotation system, comprising:
the magnetic bearing device according to claim 21;
a magnetic rotating body magnetically levitated by the magnetic bearing device for a rotation; and
a rotor main unit connected with the magnetic rotating body for a rotation.

26. A turbo-molecular pump, comprising:
the rotation system according to claim 25.

27. A semiconductor-production equipment, comprising:
the rotation system according to claim 25.

* * * * *